(12) United States Patent
Adato et al.

(10) Patent No.: US 12,073,605 B1
(45) Date of Patent: **\*Aug. 27, 2024**

(54) ATTRIBUTING ASPECTS OF GENERATED VISUAL CONTENTS TO TRAINING EXAMPLES

(71) Applicant: BRIA ARTIFICIAL INTELLIGENCE LTD., Tel Aviv (IL)

(72) Inventors: Yair Adato, Kfar Ben Nun (IL); Michael Feinstein, Tel Aviv (IL); Nimrod Sarid, Tel Aviv (IL); Ron Mokady, Ramat Hasaron (IL); Eyal Gutflaish, Beer Sheva (IL); Vered Horesh-Yaniv, Tel Aviv (IL)

(73) Assignee: BRIA ARTIFICIAL INTELLIGENCE LTD., Tel Aviv (IL)

( \* ) Notice: Subject to any disclaimer, the term of this patent is extended or adjusted under 35 U.S.C. 154(b) by 0 days.

This patent is subject to a terminal disclaimer.

(21) Appl. No.: 18/387,677

(22) Filed: Nov. 7, 2023

Related U.S. Application Data

(63) Continuation of application No. PCT/IL2023/051132, filed on Nov. 5, 2023.

(60) Provisional application No. 63/525,754, filed on Jul. 10, 2023, provisional application No. 63/444,805, filed on Feb. 10, 2023.

(51) Int. Cl.
*G06V 10/764* (2022.01)
*G06V 10/774* (2022.01)

(52) U.S. Cl.
CPC .......... *G06V 10/764* (2022.01); *G06V 10/774* (2022.01)

(58) Field of Classification Search
None
See application file for complete search history.

(56) References Cited

U.S. PATENT DOCUMENTS

| 9,519,461 | B2 | 12/2016 | Gabel et al. |
| 10,083,009 | B2 | 9/2018 | Gabel et al. |
| 10,091,140 | B2 | 10/2018 | Galley et al. |
| 10,282,672 | B1 | 5/2019 | Mishra et al. |

(Continued)

OTHER PUBLICATIONS

PCT Form PCT/ISA/206, "Invitation to Pay Additional Fees And, Where Applicable, Protest Fee" and Annex to Form PCT/ISA/206, "Communication Relating to the Results of the Partial International Search" for International Application No. PCT/IL2023/051132, mailed Jan. 10, 2024, 4pp.

*Primary Examiner* — Leon Flores
(74) *Attorney, Agent, or Firm* — The Roy Gross Law Firm, LLC; Roy Gross

(57) ABSTRACT

Systems, methods and non-transitory computer readable media for attributing aspects of generated visual contents to training examples are provided. A first visual content generated using a generative model may be received. The generative model may be a result of training a machine learning model using a plurality of training examples. Properties of an aspect of the first visual content and properties of visual contents associated with the plurality of training examples may be used to attribute the aspect of the first visual content to a subgroup of the plurality of training examples. For each source of the sources associated with the visual contents associated with the training examples of the subgroup, a data-record associated with the source may be updated based on the attribution of the aspect of the first visual content.

19 Claims, 19 Drawing Sheets

900

902 Receiving a first visual content generated using a generative model, the generative model is a result of training a machine learning model using a plurality of training examples, each training example of the plurality of training examples is associated with a respective visual content 904 Determining one or more properties of a first aspect of the first visual content 906 Determining one or more properties of a second aspect of the first visual content 908 For each training example of the plurality of training examples, analyzing the respective visual content to determine one or more properties of the respective visual content 910 Using the one or more properties of the first aspect of the first visual content and the properties of the visual contents associated with the plurality of training examples to attribute the first aspect of the first visual content to a first subgroup of at least one but not all of the plurality of training examples 912 Using the one or more properties of the second aspect of the first visual content and the properties of the visual contents associated with the plurality of training examples to attribute the second aspect of the first visual content to a second subgroup of at least one but not all of the plurality of training examples

Ⓐ

(56) References Cited

U.S. PATENT DOCUMENTS

| | | | |
|---|---|---|---|
| 10,825,227 | B2 | 11/2020 | Amer et al. |
| 11,082,487 | B1 | 8/2021 | Jain et al. |
| 11,551,440 | B1 | 1/2023 | Namballa et al. |
| 11,947,922 | B1 | 4/2024 | Adato et al. |
| 2020/0265153 | A1 | 8/2020 | Li et al. |
| 2021/0019541 | A1* | 1/2021 | Wang .................. G06V 40/172 |
| 2021/0064825 | A1 | 3/2021 | Sadamasa et al. |
| 2022/0335203 | A1 | 10/2022 | Van Dyke et al. |
| 2022/0405314 | A1 | 12/2022 | Du et al. |
| 2023/0306504 | A1 | 9/2023 | Liila et al. |
| 2023/0351807 | A1 | 11/2023 | Ren et al. |
| 2023/0360364 | A1 | 11/2023 | Wu et al. |
| 2023/0409298 | A1 | 12/2023 | Ciminelli et al. |
| 2024/0104697 | A1* | 3/2024 | Adato .................. G06V 10/764 |

\* cited by examiner

400

| 402 Receiving a first textual input in a natural language, the first textual input includes a first source-identifying-keyword |

↓

| 404 Receiving a second textual input in the natural language, the second textual input includes a second source-identifying-keyword, the second source-identifying-keyword differs from the first source-identifying-keyword |

↓

| 406 Accessing an inference model, the inference model is a result of training a machine learning model using a plurality of training examples, each training example includes a respective textual content in the natural language and a respective media content, the plurality of training examples includes a first group of training examples associated with a first source and a second group of training examples associated with a second source, each textual content of the textual contents associated with the first group includes the first source-identifying-keyword, each textual content of the textual contents associated with the second group includes the second source-identifying-keyword, a first parameter of the inference model is based on the first group, a second parameter of the inference model is based on the second group |

↓

| 408 Using the inference model and the first textual input to generate a first new media content, the first new media content is based on the first parameter of the inference model |

↓

| 410 Using the inference model and the second textual input to generate a second new media content, the second new media content is based on the second parameter of the inference model |

FIG. 4A

422
424
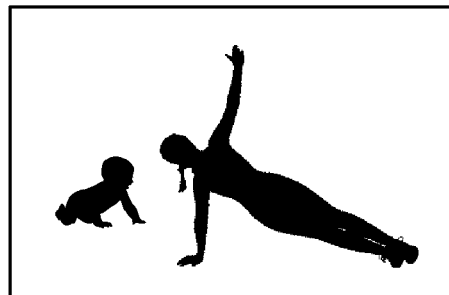
FIG. 4B
442
444
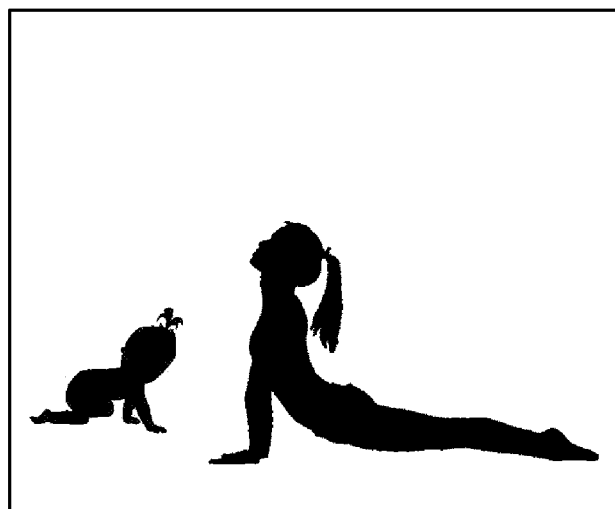
FIG. 4C

500

502 Receiving a first media content generated using a generative model in response to a first textual input in a natural language, the generative model is a result of training a machine learning model using a plurality of training examples, each training example of the plurality of training examples includes a respective textual content in the natural language and a respective media content

504 Determining one or more properties of the first textual input

506 For each training example of the plurality of training examples, analyzing the respective textual content included in the training example to determine one or more properties of the respective textual content included in the training example

508 Using the one or more properties of the first textual input and the properties of the textual contents included in the plurality of training examples to attribute the first media content to a first subgroup of at least one but not all of the plurality of training examples

510 Determining that the training examples of the first subgroup are associated with a first at least one source

512 For each source of the first at least one source, updating a respective data-record associated with the source based on the attribution

| 522 Receiving a second media content generated using the generative model in response to a second textual input |

| 524 Determining one or more properties of the second textual input |

| 526 Using the one or more properties of the second textual input and the properties of the textual contents included in the plurality of training examples to attribute the second media content to a second subgroup of at least one but not all of the plurality of training examples |

| 528 Determining that the training examples of the second subgroup are associated with a second at least one source, the second at least one source includes one or more sources not included in the first at least one source |

| 530 Based on the second at least one source, forgoing usage of the second media content |

| 532 Initiating usage of the first media content |

| 522 Receiving a second media content generated using the generative model in response to a second textual input |
|---|

| 524 Determining one or more properties of the second textual input |
|---|

| 526 Using the one or more properties of the second textual input and the properties of the textual contents included in the plurality of training examples to attribute the second media content to a second subgroup of at least one but not all of the plurality of training examples |
|---|

| 548 Accessing a data-structure associating training examples with amounts |
|---|

| 550 Using the data-structure to determine that the training examples of the first subgroup are associated with a first total amount |
|---|

| 552 Using the data-structure to determine that the training examples of the second subgroup are associated with a second total amount |
|---|

| 554 Based on the first and second total amounts, forgoing usage of the second media content |
|---|

| 532 Initiating usage of the first media content |
|---|

| 602 Receiving a specific textual prompt in a natural language |

| 604 Accessing data based on at least one parameter of an inference model, the inference model is a result of training a machine learning model using a plurality of training examples, each training example of the plurality of training examples includes a respective textual content and a respective media content |

| 606 Analyzing the data and the specific textual prompt to determine a likelihood that the specific textual prompt is included in at least one training example of the plurality of training examples |

| 608 Generating a digital signal indicative of the likelihood that the specific textual prompt is included in at least one training example of the plurality of training examples |

| 622 Using the specific textual prompt to generate a plurality of variations of the specific textual prompt |
|---|

↓

| 624 For each variation of the plurality of variations, using the variation and the at least one parameter of the inference model to obtain an output of the inference model corresponding to the variation |
|---|

↓

| 626 Analyzing the outputs to determine the likelihood |
|---|

| 642 Obtaining a plurality of directions in a mathematical space |
|---|

↓

| 644 Obtaining a specific mathematical object in the mathematical space corresponding to the specific textual prompt |
|---|

↓

| 646 For each direction of the plurality of directions, using the specific mathematical object and the direction to determine a mathematical object in the mathematical space corresponding to the specific mathematical object and the direction |
|---|

↓

| 648 For each direction of the plurality of directions, generating a textual prompt corresponding to the mathematical object in the mathematical space corresponding to the specific mathematical object and the direction, thereby generating the plurality of variations of the specific textual prompt |
|---|

FIG. 6C

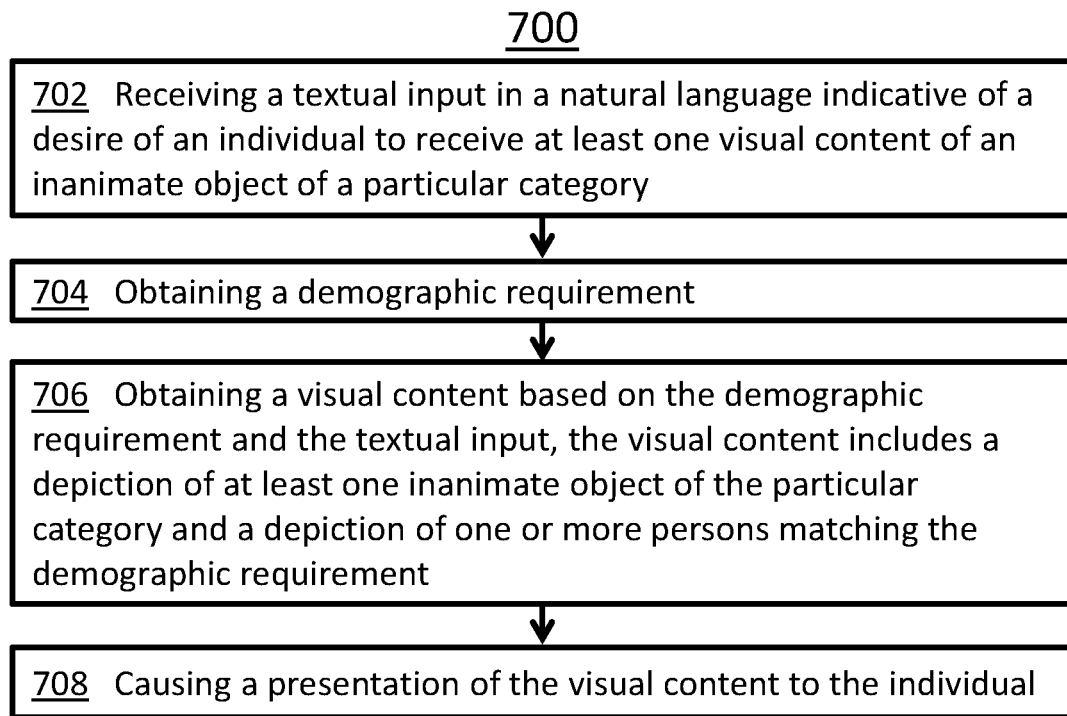

700

| 702 Receiving a textual input in a natural language indicative of a desire of an individual to receive at least one visual content of an inanimate object of a particular category |

↓

| 704 Obtaining a demographic requirement |

↓

| 706 Obtaining a visual content based on the demographic requirement and the textual input, the visual content includes a depiction of at least one inanimate object of the particular category and a depiction of one or more persons matching the demographic requirement |

↓

| 708 Causing a presentation of the visual content to the individual |

FIG. 7A 722                         724

 

| 802 Accessing a visual content including a background portion and at least one foreground object |

| 804 Receiving a textual input indicative of a desire of an individual to modify the visual content |

| 806 Analyzing the textual input and the visual content to generate a modified version of the visual content, the modified version differs from the visual content in the background portion, the modified version includes a depiction of the at least one foreground object substantially identical to a depiction of the at least one foreground object in the visual content |

| 808 Causing a presentation of the modified version of the visual content to the individual |

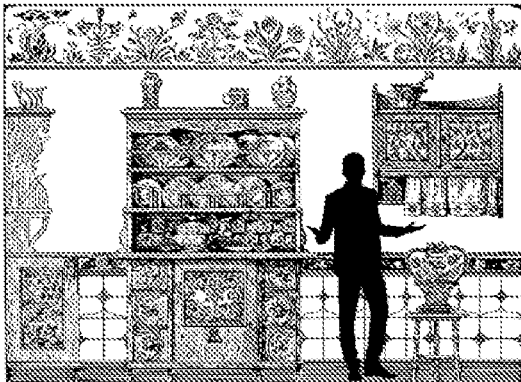
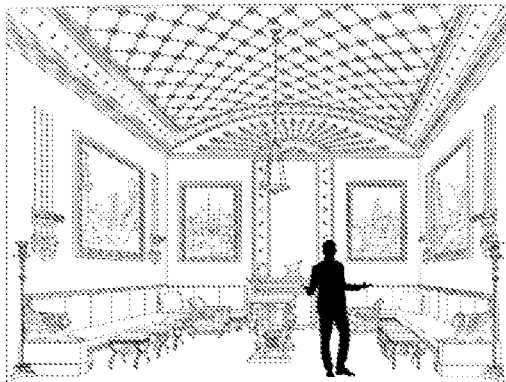

| 902 Receiving a first visual content generated using a generative model, the generative model is a result of training a machine learning model using a plurality of training examples, each training example of the plurality of training examples is associated with a respective visual content |

| 904 Determining one or more properties of a first aspect of the first visual content |

| 906 Determining one or more properties of a second aspect of the first visual content |

| 908 For each training example of the plurality of training examples, analyzing the respective visual content to determine one or more properties of the respective visual content |

| 910 Using the one or more properties of the first aspect of the first visual content and the properties of the visual contents associated with the plurality of training examples to attribute the first aspect of the first visual content to a first subgroup of at least one but not all of the plurality of training examples |

| 912 Using the one or more properties of the second aspect of the first visual content and the properties of the visual contents associated with the plurality of training examples to attribute the second aspect of the first visual content to a second subgroup of at least one but not all of the plurality of training examples |

1002 Receiving a first audio content generated using a generative model, the generative model is a result of training a machine learning model using a plurality of training examples, each training example of the plurality of training examples is associated with a respective audio content

1004 Determining one or more properties of the first audio input

1006 For each training example of the plurality of training examples, analyzing the respective audio content to determine one or more properties of the respective audio content

1008 Using the one or more properties of the first audio content and the properties of the audio contents associated with the plurality of training examples to attribute the first audio content to a first subgroup of at least one but not all of the plurality of training examples

510 Determining that the training examples of the first subgroup are associated with a first at least one source

512 For each source of the first at least one source, updating a respective data-record associated with the source based on the attribution

1102 Receiving an input indicative of a desire to generate a new content using a generative model, the generative model is a result of training a machine learning model using a plurality of training examples, each training example of the plurality of training examples is associated with a respective content

1104 Obtaining an indication of a particular subgroup of at least one but not all of the plurality of training examples

1106 Based on the indication, using the input and the generative model to generate the new content, abstaining from basing the generation of the new content on any training example included in the particular subgroup

1108 Providing the new content

FIG. 11A

   
1122    1124    1126    1128
FIG. 11B
1142    1144
 
FIG. 11C

ATTRIBUTING ASPECTS OF GENERATED VISUAL CONTENTS TO TRAINING EXAMPLES

CROSS-REFERENCE TO RELATED APPLICATIONS

This application is a continuation of PCT International Application No. PCT/IL2023/051132, filed Nov. 5, 2023, which claims the benefit of priority of U.S. Provisional Patent Application No. 63/444,805, filed on Feb. 10, 2023, and U.S. Provisional Patent Application No. 63/525,754, filed on Jul. 10, 2023, the disclosures of which incorporated herein by reference in their entirety.

BACKGROUND OF THE INVENTION

Technological Field

The disclosed embodiments generally relate to systems and methods for analyzing generated visual contents. More particularly, the disclosed embodiments relate to systems and methods for analyzing generated visual contents to attribute aspects of the generated visual contents to training examples.

Background Information

Vast number of media contents, such as audios, images and videos, are created, edited and viewed by different entities. Nowadays, many media contents are generated and/or modified to better suit different criteria. However, achieving high quality results when generating and/or modifying media contents still requires significant efforts. Moreover, selecting the optimal modification for different purposes is still challenging. This is especially true when generating and/or modifying a large number of media content items. Therefore, automating the generation and/or modification of media contents is desired.

The advent of the internet and the proliferation of digital devices have revolutionized the way information and content are created, shared, and consumed. With the exponential growth of digital content, users are now exposed to an overwhelming volume of information from a multitude of sources. This has led to challenges related to the authenticity, credibility, and attribution of digital content. Determining the origin and ownership of content, as well as tracking its use and reuse, has become a critical issue in an age marked by widespread information sharing and content reuse.

Content creation has become more democratized, with a wide range of individuals and entities contributing to the digital landscape. Simultaneously, the importance of attributing content, or parts thereof, to its creators or sources has grown significantly. Accurate attribution is crucial for ensuring content integrity, protecting intellectual property rights, and maintaining trust among users. In many instances, it has been challenging to enforce proper attribution, leading to issues of plagiarism, misrepresentation, and copyright infringement.

SUMMARY OF THE INVENTION

In some examples, systems, methods and non-transitory computer readable media for inference based on different portions of a training set using a single inference model are provided. In some examples, a first textual input in a natural language may be received. The first textual input may include a first source-identifying-keyword. Further, a second textual input in the natural language may be received. The second textual input may include a second source-identifying-keyword. The second source-identifying-keyword may differ from the first source-identifying-keyword. Further, an inference model may be accessed. The inference model may be a result of training a machine learning model using a plurality of training examples. Each training example of the plurality of training examples may include a respective textual content in the natural language and a respective media content. The plurality of training examples may include a first group of at least two training examples associated with a first source and a second group of at least two training examples associated with a second source. The first group may differ from the second group. The first source may differ from the second source. Each textual content of the textual contents associated with the first group may include the first source-identifying-keyword. Each textual content of the textual contents associated with the second group may include the second source-identifying-keyword. A first parameter of the inference model may be based on the first group. A second parameter of the inference model may be based on the second group. The first parameter may differ from the second parameter. The inference model and the first textual input may be used to generate a first new media content. The first new media content may be based on the first parameter of the inference model. The inference model and the second textual input may be used to generate a second new media content. The second new media content may be based on the second parameter of the inference model.

In some examples, systems, methods and non-transitory computer readable media for prompt-based attribution of generated media contents to training examples are provided. In some examples, a first media content generated using a generative model in response to a first textual input in a natural language may be received. The generative model may be a result of training a machine learning model using a plurality of training examples. Each training example of the plurality of training examples may include a respective textual content in the natural language and a respective media content. One or more properties of the first textual input may be determined. Further, for each training example of the plurality of training examples, the respective textual content included in the training example may be analyzed to determine one or more properties of the respective textual content included in the training example. The one or more properties of the first textual input and the properties of the textual contents included in the plurality of training examples may be used to attribute the first media content to a first subgroup of at least one but not all of the plurality of training examples. Further, it may be determined that the training examples of the first subgroup may be associated with a first at least one source. Further, for each source of the first at least one source, a data-record associated with the source may be updated based on the attribution.

In some examples, systems, methods and non-transitory computer readable media for identifying prompts used for training of inference models are provided. In some examples, a specific textual prompt in a natural language may be received. Further, data based on at least one parameter of an inference model may be accessed. The inference model may be a result of training a machine learning model using a plurality of training examples. Each training example of the plurality of training examples may include a respective textual content and a respective media content. The data and the specific textual prompt may be analyzed to determine a likelihood that the specific textual prompt is included in at least one training example of the plurality of training examples. A digital signal indicative of the likelihood that the specific textual prompt is included in at least one training example of the plurality of training examples may be generated.

In some examples, systems, methods and non-transitory computer readable media for providing diverse visual contents based on prompts are provided. In some examples, a textual input in a natural language indicative of a desire of an individual to receive at least one visual content of an inanimate object of a particular category may be received. Further, a demographic requirement may be obtained. For example, the textual input may be analyzed to determine a demographic requirement. Further, a visual content may be obtained based on the demographic requirement and the textual input. The visual content may include a depiction of at least one inanimate object of the particular category and a depiction of one or more persons matching the demographic requirement. Further, a presentation of the visual content to the individual may be caused.

In some examples, systems, methods and non-transitory computer readable media for prompt based background replacement are provided. In some examples, a visual content including a background portion and at least one foreground object may be accessed. Further, a textual input indicative of a desire of an individual to modify the visual content may be received. The textual input and the visual content may be analyzed to generate a modified version of the visual content. The modified version may differ from the visual content in the background portion. Further, the modified version may include a depiction of the at least one foreground object substantially identical to a depiction of the at least one foreground object in the visual content. Further, a presentation of the modified version of the visual content to the individual may be caused.

In some examples, systems, methods and non-transitory computer readable media for attributing aspects of generated visual contents to training examples are provided. In some examples, a first visual content generated using a generative model may be received. The generative model may be a result of training a machine learning model using a plurality of training examples. Each training example of the plurality of training examples may be associated with a respective visual content. Further, one or more properties of a first aspect of the first visual content may be determined. Further, one or more properties of a second aspect of the first visual content may be determined. Further, for each training example of the plurality of training examples, the respective visual content may be analyzed to determine one or more properties of the respective visual content. The one or more properties of the first aspect of the first visual content and the properties of the visual contents associated with the plurality of training examples may be used to attribute the first aspect of the first visual content to a first subgroup of at least one but not all of the plurality of training examples. The one or more properties of the second aspect of the first visual content and the properties of the visual contents associated with the plurality of training examples may be used to attribute the second aspect of the first visual content to a second subgroup of at least one but not all of the plurality of training examples. It may be determined that the at least one visual content associated with the training examples of the first subgroup are associated with a first at least one source. It may be determined that the at least one visual content associated with the training examples of the second subgroup are associated with a second at least one source. For each source of the first at least one source, a data-record associated with the source may be updated based on the attribution of the first aspect of the first visual content. For each source of the second at least one source, a data-record associated with the source may be updated based on the attribution of the second aspect of the first visual content.

In some examples, systems, methods and non-transitory computer readable media for attributing generated audio contents to training examples are provided. In some examples, a first audio content generated using a generative model may be received. The generative model may be a result of training a machine learning model using a plurality of training examples. Each training example of the plurality of training examples may be associated with a respective audio content. Further, one or more properties of the first audio content may be determined. For each training example of the plurality of training examples, the respective audio content may be analyzed to determine one or more properties of the respective audio content. The one or more properties of the first audio content and the properties of the audio contents associated with the plurality of training examples may be used to attribute the first audio content to a first subgroup of at least one but not all of the plurality of training examples. Further, it may be determined that the training examples of the first subgroup are associated with a first at least one source. Further, for each source of the first at least one source, a respective data-record associated with the source may be updated based on the attribution.

In some examples, systems, methods and non-transitory computer readable media for generating content using a generative model without relying on selected training examples are provided. In some examples, an input indicative of a desire to generate a new content using a generative model may be received. The generative model may be a result of training a machine learning model using a plurality of training examples. Each training example of the plurality of training examples may be associated with a respective content. Further, an indication of a particular subgroup of at least one but not all of the plurality of training examples may be obtained. Based on the indication, the input and the generative model may be used to generate the new content, abstaining from basing the generation of the new content on any training example included in the particular subgroup. The new content may be provided.

BRIEF DESCRIPTION OF DRAWINGS

The accompanying drawings, which are incorporated in and constitute a part of this disclosure, illustrate various disclosed embodiments. In the drawings:

FIG. 4A is a flowchart of an exemplary method for inference based on different portions of a training set using a single inference model, consistent with some embodiments of the present disclosure.

FIGS. 4B and 4C include illustrations of exemplary visual contents, consistent with some embodiments of the present disclosure.

FIGS. 5A, 5B and 5C are flowcharts of exemplary methods for prompt-based attribution of generated media contents to training examples, consistent with some embodiments of the present disclosure.

FIGS. 6A, 6B and 6C are flowcharts of exemplary methods for identifying prompts used for training of inference models, consistent with some embodiments of the present disclosure.

FIG. 7A is a flowchart of an exemplary method for providing diverse visual contents based on prompts, consistent with some embodiments of the present disclosure.

FIG. 7B includes illustrations of exemplary visual contents, consistent with some embodiments of the present disclosure.

FIG. 8A is a flowchart of an exemplary method for prompt based background replacement, consistent with some embodiments of the present disclosure.

FIG. 8B includes illustrations of exemplary visual contents, consistent with some embodiments of the present disclosure.

FIGS. 9A and 9B together form a flowchart of an exemplary method for attributing aspects of generated visual contents to training examples, consistent with some embodiments of the present disclosure.

FIG. 10 is a flowchart of an exemplary method for attributing generated audio contents to training examples, consistent with some embodiments of the present disclosure.

FIG. 11A is a flowchart of an exemplary method for generating content using a generative model without relying on selected training examples, consistent with some embodiments of the present disclosure.

FIGS. 11B and 11C include illustrations of exemplary visual contents, consistent with some embodiments of the present disclosure.

DETAILED DESCRIPTION OF THE INVENTION

Figure 1A:
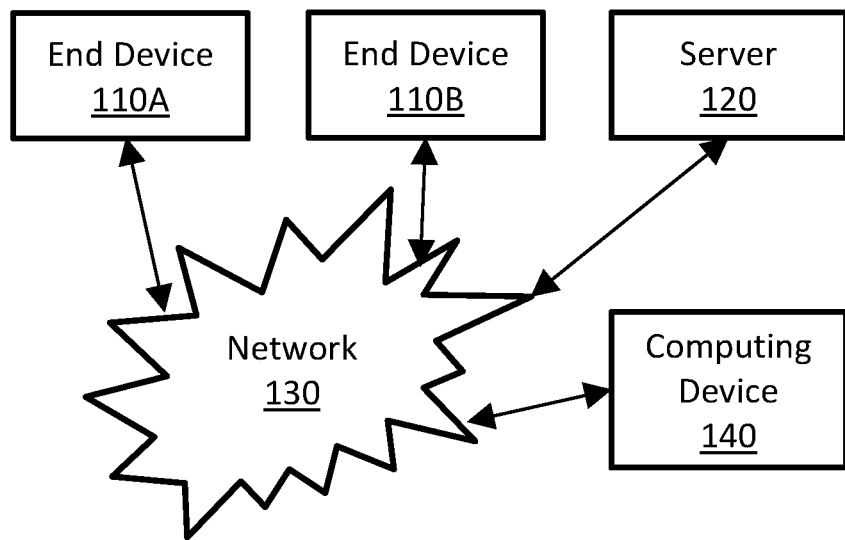
FIG. 1A is an illustration of an exemplary communication system.

Unless specifically stated otherwise, as apparent from the following discussions, it is appreciated that throughout the specification discussions utilizing terms such as "processing", "calculating", "computing", "determining", "generating", "setting", "configuring", "selecting", "defining", "applying", "obtaining", "monitoring", "providing", "identifying", "segmenting", "classifying", "analyzing", "associating", "extracting", "storing", "receiving", "transmitting", or the like, include action and/or processes of a computer that manipulate and/or transform data into other data, said data represented as physical quantities, for example such as electronic quantities, and/or said data representing the physical objects. The terms "computer", "processor", "controller", "processing unit", "computing device", and "processing module" should be expansively construed to cover any kind of electronic device, component or unit with data processing capabilities, including, by way of non-limiting example, a personal computer, a wearable computer, a tablet, a smartphone, a server, a computing system, a cloud computing platform, a communication device, a processor (for example, digital signal processor (DSP), an image signal processor (ISR), a microcontroller, a field programmable gate array (FPGA), an application specific integrated circuit (ASIC), a central processing unit (CPA), a graphics processing unit (GPU), a visual processing unit (VPU), and so on), possibly with embedded memory, a single core processor, a multi core processor, a core within a processor, any other electronic computing device, or any combination of the above.

The operations in accordance with the teachings herein may be performed by a computer specially constructed or programmed to perform the described functions.

As used herein, the phrase "for example," "such as", "for instance", "in one example", 'in another example", "in a different example", "in some examples", "in an additional example", "in yet another example" and variants thereof describe non-limiting embodiments of the presently disclosed subject matter. Reference in the specification to "one case", "some cases", "other cases" or variants thereof means that a particular feature, structure or characteristic described in connection with the embodiment(s) may be included in at least one embodiment of the presently disclosed subject matter. Thus the appearance of the phrase "one case", "some cases", "other cases" or variants thereof does not necessarily refer to the same embodiment(s). As used herein, the term "and/or" includes any and all combinations of one or more of the associated listed items.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

The term "image sensor" is recognized by those skilled in the art and refers to any device configured to capture images, a sequence of images, videos, and so forth. This includes sensors that convert optical input into images, where optical input can be visible light (like in a camera), radio waves, microwaves, terahertz waves, ultraviolet light, infrared light, x-rays, gamma rays, and/or any other light spectrum. This also includes both 2D and 3D sensors. Examples of image sensor technologies may include: CCD, CMOS, NMOS, and so forth. 3D sensors may be implemented using different technologies, including: stereo camera, active stereo camera, time of flight camera, structured light camera, radar, range image camera, and so forth.

In embodiments of the presently disclosed subject matter, one or more stages illustrated in the figures may be executed in a different order and/or one or more groups of stages may be executed simultaneously and vice versa. The figures illustrate a general schematic of the system architecture in accordance embodiments of the presently disclosed subject matter. Each module in the figures can be made up of any combination of software, hardware and/or firmware that performs the functions as defined and explained herein. The modules in the figures may be centralized in one location or dispersed over more than one location.

It should be noted that some examples of the presently disclosed subject matter are not limited in application to the details of construction and the arrangement of the components set forth in the following description or illustrated in the drawings. The invention can be capable of other embodiments or of being practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing may have the same use and description as in the previous drawings.

The drawings in this document may not be to any scale. Different figures may use different scales and different scales can be used even within the same drawing, for example different scales for different views of the same object or different scales for the two adjacent objects.

FIG. 1A is an illustration of an exemplary communication system. In this example, the communication system may include: one or more end devices 110 (such as end device 110A, end device 110B, etc.), one or more servers (such as server 120), a communication network 130, and one or more other computing devices (such as computing device 140). In this example, end devices 110 may communicate with server 120, with computing device 140, with each other, and so forth. The communication may be using communication network 130 and/or directly. Possible implementations of an end device 110 and/or of server 120 and/or of computing device 140 may include computing device 200 as described in FIGS. 2A and 2B. In other example, an end device 110 and/or of server 120 and/or of computing device 140 may be implemented using a cloud platform, for example as a physical computing device or a virtual computing device in a cloud platform. Some other non-limiting examples of possible implementations of end device 110 may include a mobile phone, a smartphone, a tablet, a wearable computing device, a personal computer (PC), and so forth. In some examples, end devices 110 may communicate with server 120, with computing device 140, with each other, and so forth. Possible implementations of an end device 110 and/or of server 120 and/or of computing device 140 may connect to communication network 130 using a local router, directly, through another communication device, and so forth. Some non-limiting examples of communication network 130 may include the Internet, phone networks, cellular networks, satellite communication networks, private communication networks, virtual private networks (VPN), and so forth.

Figure 1B:
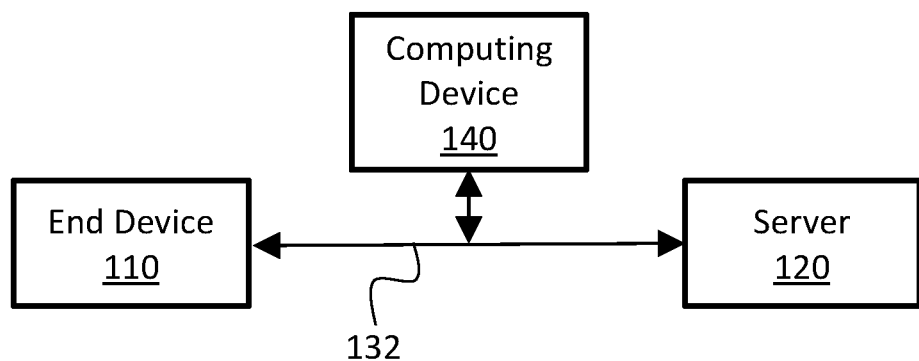
FIG. 1B is an illustration of an exemplary communication system.

FIG. 1B is an illustration of an exemplary communication system. In this example, end device 110 communicates with server 120 using a communication hardware 132. For example, end device 110 communicates with server 120 directly, through a different communication device, over a communication line, using a communication network (such as communication network 130), and so forth. In this example, another computing device 140 may observe and/or modify and/or block the communication between end device 110 and server 120. In one example, a communication line between end device 110 communicates and server 120 may be a direct communication line, may be a communication line through another device, may be a communication line over a communication network (such as communication network 130), and so forth.

FIGS. 1A and 1B illustrate some possible implementations of a communication system. In some embodiments, other communication systems that enable communication between end devices 110 may communicate and/or server 120 and/or computing device 140 may be used.

Figure 2A:
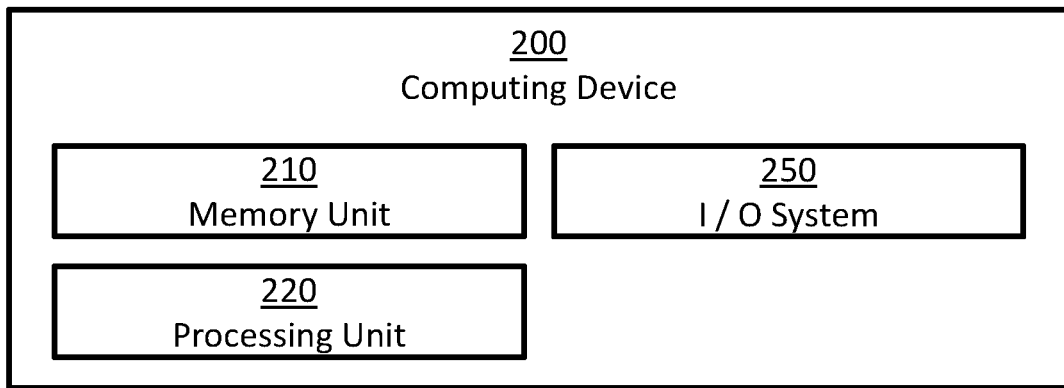
FIG. 2A is a simplified block diagram of an example for one possible implementation of a computing device.

FIG. 2A is a simplified block diagram of an example for one possible implementation of a computing device. In this example, computing device 200 may comprise: one or more memory units 210, one or more processing units 220, and input/output system 250. In some implementations, computing device 200 may comprise additional components, while some components listed above may be excluded.

Figure 2B:
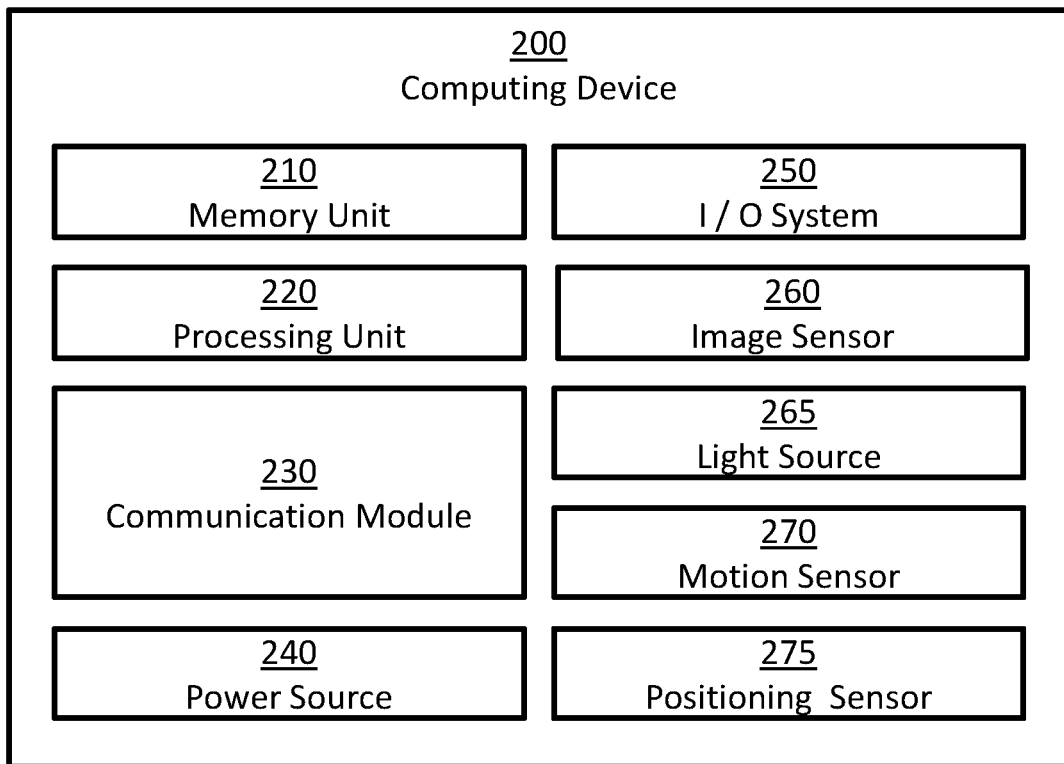
FIG. 2B is a simplified block diagram of an example for one possible implementation of a computing device.

FIG. 2B is a block diagram illustrating a possible implementation of computing device 200. In this example, computing device 200 may comprise: one or more memory units 210, one or more processing units 220, one or more communication modules 230, one or more power sources 240, input/output system 250, one or more image sensors 260, one or more light sources 265, one or more motion sensors 270, and one or more positioning sensors 275. In some implementations, computing device 200 may comprise additional components, while some components listed above may be excluded. For example, in some implementations computing device 200 may also comprise at least one of the following: one or more user input devices, one or more output devices, and so forth. In another example, in some implementations at least one of the following may be excluded from computing device 200: memory units 210, communication modules 230, power sources 240, input/output system 250, image sensors 260, light sources 265, motion sensors 270, and positioning sensors 275.

In some embodiments, one or more power sources 240 may be configured to power computing device 200. Possible non-limiting implementation examples of power sources 240 may include: one or more electric batteries, one or more capacitors, one or more connections to external power sources, one or more power convertors, any combination of the above, and so forth.

In some embodiments, the one or more processing units 220 may be configured to execute software programs. For example, processing units 220 may be configured to execute software programs stored on the memory units 210. In some cases, the executed software programs may store information in memory units 210. In some cases, the executed software programs may retrieve information from the memory units 210. Possible non-limiting implementation examples of the processing units 220 may include one or more single core processors, one or more multicore processors, one or more controllers, one or more application processors, one or more system on a chip processors, one or more central processing units, one or more graphical processing units, one or more neural processing units, any combination of the above, and so forth.

In some embodiments, the one or more communication modules 230 may be configured to receive and transmit information. For example, control signals may be transmitted and/or received through communication modules 230. In another example, information received though communication modules 230 may be stored in memory units 210. In an additional example, information retrieved from memory units 210 may be transmitted using communication modules 230. In another example, input data may be transmitted and/or received using communication modules 230. Examples of such input data may include: input data inputted by a user using user input devices; information captured using one or more sensors; and so forth. Examples of such sensors may include: audio sensors, image sensors 260, motion sensors 270, positioning sensors 275, temperature sensors, and so forth.

In some embodiments, the input/output system 250 may include or be configured to connect with input and/or output devices, such as keyboards, computer mouses, touch pads, touch screens, gesture recognition systems, image sensors, audio sensors, visual indicators (such as LED visual indicators), audio speakers, audio beepers, display screens, extended reality systems, and so forth. In some examples, input and/or output devices may be configured to generate digital signal based on inputs from a user, a person, or an environment, and/or to generate physical output to a user, a person or in an environment based on digital signals. In one example, the input/output system 250 may be configured to store and/or receive such digital signals from memory unit 210. In one example, the input/output system 250 may be configured to receive and/or provide such digital signals from and/or to processing unit 220 and/or communication module 230.

In some embodiments, the one or more image sensors 260 may be configured to capture visual information by converting light to: image data, images, a sequence of images, videos, 3D images, a sequence of 3D images, a 3D videos, and so forth. In some examples, the captured visual information may be stored in memory units 210. In some additional examples, the captured visual information may be transmitted using communication modules 230, for example to other computerized devices. In some examples, processing units 220 may control the above processes. For example, processing units 220 may control at least one of: capturing of the visual information, storing the captured visual information, transmitting of the captured visual information, analysis of the captured visual information, and so forth. In some cases, the captured visual information may be processed by processing units 220. For example, the captured visual information may be compressed by processing units 220; possibly followed: by storing the compressed captured visual information in memory units 210; by transmitted the compressed captured visual information using communication modules 230; and so forth. In another example, the captured visual information may be processed in order to: detect objects, detect events, detect action, detect face, detect people, recognize person, and so forth.

In some embodiments, the one or more light sources 265 may be configured to emit light, for example in order to enable better image capturing by image sensors 260. In some examples, the emission of light may be coordinated with the capturing operation of image sensors 260. In some examples, the emission of light may be continuous. In some examples, the emission of light may be performed at selected times. The emitted light may be visible light, infrared light, x-rays, gamma rays, and/or in any other light spectrum. In some examples, image sensors 260 may capture light emitted by light sources 265, for example in order to capture 3D images and/or 3D videos using active stereo method.

In some embodiments, the one or more motion sensors 270 may be configured to perform at least one of the following: detect motion of objects in the environment of computing device 200; measure the velocity of objects in the environment of computing device 200; measure the acceleration of objects in the environment of computing device 200; detect motion of computing device 200; measure the velocity of computing device 200; measure the acceleration of computing device 200; and so forth. In some implementations, the one or more motion sensors 270 may comprise one or more accelerometers configured to detect changes in proper acceleration and/or to measure proper acceleration of computing device 200. In some implementations, the one or more motion sensors 270 may comprise one or more gyroscopes configured to detect changes in the orientation of computing device 200 and/or to measure information related to the orientation of computing device 200. In some implementations, motion sensors 270 may be implemented using image sensors 260, for example by analyzing images captured by image sensors 260 to perform at least one of the following tasks: track objects in the environment of computing device 200; detect moving objects in the environment of computing device 200; measure the velocity of objects in the environment of computing device 200; measure the acceleration of objects in the environment of computing device 200; measure the velocity of computing device 200, for example by calculating the egomotion of image sensors 260; measure the acceleration of computing device 200, for example by calculating the egomotion of image sensors 260; and so forth. In some implementations, motion sensors 270 may be implemented using image sensors 260 and light sources 265, for example by implementing a LIDAR using image sensors 260 and light sources 265. In some implementations, motion sensors 270 may be implemented using one or more RADARs. In some examples, information captured using motion sensors 270: may be stored in memory units 210, may be processed by processing units 220, may be transmitted and/or received using communication modules 230, and so forth.

In some embodiments, the one or more positioning sensors 275 may be configured to obtain positioning information of computing device 200, to detect changes in the position of computing device 200, and/or to measure the position of computing device 200. In some examples, positioning sensors 275 may be implemented using one of the following technologies: Global Positioning System (GPS), GLObal NAvigation Satellite System (GLONASS), Galileo global navigation system, BeiDou navigation system, other Global Navigation Satellite Systems (GNSS), Indian Regional Navigation Satellite System (IRNSS), Local Positioning Systems (LPS), Real-Time Location Systems (RTLS), Indoor Positioning System (IPS), Wi-Fi based positioning systems, cellular triangulation, and so forth. In some examples, information captured using positioning sensors 275 may be stored in memory units 210, may be processed by processing units 220, may be transmitted and/or received using communication modules 230, and so forth.

In some embodiments, a method, such as methods 400, 500, 520, 540, 600, 620, 640, 700, 800, 900, 1000 or 1100, may comprise one or more steps. In some examples, these methods, as well as all individual steps therein, may be performed by various aspects of end devices 110, server 120, computing device 140, computing device 200, and so forth. For example, a system comprising of at least one processor, such as processing units 220, may perform any of these methods as well as all individual steps therein, for example by processing units 220 executing software instructions stored within memory units 210. In some examples, these methods, as well as all individual steps therein, may be performed by a dedicated hardware. In some examples, computer readable medium, such as a non-transitory computer readable medium, may store data and/or computer implementable instructions for carrying out any of these methods as well as all individual steps therein. Some non-limiting examples of possible execution manners of a method may include continuous execution (for example, returning to the beginning of the method once the method normal execution ends), periodically execution, executing the method at selected times, execution upon the detection of a trigger (some non-limiting examples of such trigger may include a trigger from a user, a trigger from another process, a trigger from an external device, etc.), and so forth.

In some embodiments, machine learning algorithms (also referred to as machine learning models in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, Natural Language Processing (NLP) algorithms, support vector machines, random forests, nearest neighbors algorithms, deep learning algorithms, artificial neural network algorithms, convolutional neural network algorithms, recurrent neural network algorithms, linear machine learning models, non-linear machine learning models, ensemble algorithms, and so forth. For example, a trained machine learning algorithm may comprise an inference model, such as a predictive model, a classification model, a data regression model, a clustering model, a segmentation model, an artificial neural network (such as a deep neural network, a convolutional neural network, a recurrent neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters may be set manually by a person or automatically by an process external to the machine learning algorithm (such as a hyper parameter search algorithm), and the parameters of the machine learning algorithm may be set by the machine learning algorithm based on the training examples. In some implementations, the hyper-parameters may be set based on the training examples and the validation examples, and the parameters may be set based on the training examples and the selected hyper-parameters. For example, given the hyper-parameters, the parameters may be conditionally independent of the validation examples.

In some embodiments, trained machine learning algorithms (also referred to as machine learning models and trained machine learning models in the present disclosure) may be used to analyze inputs and generate outputs, for example in the cases described below. In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a data regression model, the input may include a sample, and the inferred output may include an inferred value corresponding to the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image, and the inferred output may include a classification of an item depicted in the image. In yet another example, a trained machine learning algorithm may include a data regression model, the input may include an image, and the inferred output may include an inferred value corresponding to an item depicted in the image (such as an estimated property of the item, such as size, volume, age of a person depicted in the image, cost of a product depicted in the image, and so forth). In an additional example, a trained machine learning algorithm may include an image segmentation model, the input may include an image, and the inferred output may include a segmentation of the image. In yet another example, a trained machine learning algorithm may include an object detector, the input may include an image, and the inferred output may include one or more detected objects in the image and/or one or more locations of objects within the image. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, artificial neural networks may be configured to analyze inputs and generate corresponding outputs, for in the cases described herein. Some non-limiting examples of such artificial neural networks may comprise shallow artificial neural networks, deep artificial neural networks, feedback artificial neural networks, feed forward artificial neural networks, autoencoder artificial neural networks, probabilistic artificial neural networks, time delay artificial neural networks, convolutional artificial neural networks, recurrent artificial neural networks, long short term memory artificial neural networks, and so forth. In some examples, an artificial neural network may be configured manually. For example, a structure of the artificial neural network may be selected manually, a type of an artificial neuron of the artificial neural network may be selected manually, a parameter of the artificial neural network (such as a parameter of an artificial neuron of the artificial neural network) may be selected manually, and so forth. In some examples, an artificial neural network may be configured using a machine learning algorithm. For example, a user may select hyper-parameters for the an artificial neural network and/or the machine learning algorithm, and the machine learning algorithm may use the hyper-parameters and training examples to determine the parameters of the artificial neural network, for example using back propagation, using gradient descent, using stochastic gradient descent, using mini-batch gradient descent, and so forth. In some examples, an artificial neural network may be created from two or more other artificial neural networks by combining the two or more other artificial neural networks into a single artificial neural network.

In some embodiments, generative models may be configured to generate new content, such as textual content, visual content, auditory content, graphical content, and so forth. In some examples, generative models may generate new content without input. In other examples, generative models may generate new content based on an input. In one example, the new content may be fully determined from the input, where every usage of the generative model with the same input will produce the same new content. In another example, the new content may be associated with the input but not fully determined from the input, where every usage of the generative model with the same input may product a different new content that is associated with the input. In some examples, a generative model may be a result of training a machine learning generative algorithm with training examples. An example of such training example may include a sample input, together with a sample content associated with the sample input. Some non-limiting examples of such generative models may include Deep Generative Model (DGM), Generative Adversarial Network model (GAN), auto-regressive model, Variational AutoEncoder (VAE), transformers based generative model, artificial neural networks based generative model, hard-coded generative model, and so forth.

A Large Language Model (LLM) is a generative language model with a large number of parameters (usually billions or more) trained on large corpus of unlabeled data (usually trillions of words or more) in a self-supervised learning scheme and/or a semi-supervised learning scheme. While models trained using a supervised learning scheme with label data are fitted to the specific tasks they were trained for, LLM can handle wide range of tasks that the model was never specifically trained for, including ill-defined tasks. It is common to provide LLM with instructions in natural language, sometimes referred to as prompts. For example, to cause a LLM to count the number of people that objected to a proposed plan in a meeting, one might use the following prompt, 'Please read the meeting minutes. Of all the speakers in the meeting, please identify those who objected to the plan proposed by Mr. Smith at the beginning of the meeting. Please list their names, and count them.' Further, after receiving a response from the LLM, it is common to refine the task or to provide subsequent tasks in natural language. For example, 'Also count for each of these speakers the number of words said', 'Of these speakers, could you please identify who is the leader?' or 'Please summarize the main objections'. LLM may generate textual outputs in natural language, or in a desired structured format, such as a table or a formal language (such as a programming language, a digital file format, and so forth). In many cases, a LLM may be part of a multimodal model, allowing the model to analyze both textual inputs as well as other kind of inputs (such as images, videos, audio, sensor data, telemetries, and so forth) and/or to generate both textual outputs as well as other kinds of outputs (such as images, videos, audio, telemetries, and so forth).

Some non-limiting examples of image data may include images, grayscale images, color images, 2D images, 3D images, videos, 2D videos, 3D videos, frames, footages, data derived from other image data, and so forth. In some embodiments, analyzing image data (for example by the methods, steps and modules described herein) may comprise analyzing the image data to obtain a preprocessed image data, and subsequently analyzing the image data and/or the preprocessed image data to obtain the desired outcome. One of ordinary skill in the art will recognize that the followings are examples, and that the image data may be preprocessed using other kinds of preprocessing methods. In some examples, the image data may be preprocessed by transforming the image data using a transformation function to obtain a transformed image data, and the preprocessed image data may comprise the transformed image data. For example, the transformed image data may comprise one or more convolutions of the image data. For example, the transformation function may comprise one or more image filters, such as low-pass filters, high-pass filters, band-pass filters, all-pass filters, and so forth. In some examples, the transformation function may comprise a nonlinear function. In some examples, the image data may be preprocessed by smoothing at least parts of the image data, for example using Gaussian convolution, using a median filter, and so forth. In some examples, the image data may be preprocessed to obtain a different representation of the image data. For example, the preprocessed image data may comprise: a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy representation of at least part of the image data; a lossless representation of at least part of the image data; a time ordered series of any of the above; any combination of the above; and so forth. In some examples, the image data may be preprocessed to extract edges, and the preprocessed image data may comprise information based on and/or related to the extracted edges. In some examples, the image data may be preprocessed to extract image features from the image data. Some non-limiting examples of such image features may comprise information based on and/or related to: edges; corners; blobs; ridges; Scale Invariant Feature Transform (SIFT) features; temporal features; and so forth. In some examples, analyzing the image data may include calculating at least one convolution of at least a portion of the image data, and using the calculated at least one convolution to calculate at least one resulting value and/or to make determinations, identifications, recognitions, classifications, and so forth.

In some embodiments, analyzing image data (for example by the methods, steps and modules described herein) may comprise analyzing the image data and/or the preprocessed image data using one or more rules, functions, procedures, artificial neural networks, object detection algorithms, face detection algorithms, visual event detection algorithms, action detection algorithms, motion detection algorithms, background subtraction algorithms, inference models, and so forth. Some non-limiting examples of such inference models may include: an inference model preprogrammed manually; a classification model; a data regression model; a result of training algorithms, such as machine learning algorithms and/or deep learning algorithms, on training examples, where the training examples may include examples of data instances, and in some cases, a data instance may be labeled with a corresponding desired label and/or result; and so forth. In some embodiments, analyzing image data (for example by the methods, steps and modules described herein) may comprise analyzing pixels, voxels, point cloud, range data, etc. included in the image data.

A convolution may include a convolution of any dimension. A one-dimensional convolution is a function that transforms an original sequence of numbers to a transformed sequence of numbers. The one-dimensional convolution may be defined by a sequence of scalars. Each particular value in the transformed sequence of numbers may be determined by calculating a linear combination of values in a subsequence of the original sequence of numbers corresponding to the particular value. A result value of a calculated convolution may include any value in the transformed sequence of numbers. Likewise, an n-dimensional convolution is a function that transforms an original n-dimensional array to a transformed array. The n-dimensional convolution may be defined by an n-dimensional array of scalars (known as the kernel of the n-dimensional convolution). Each particular value in the transformed array may be determined by calculating a linear combination of values in an n-dimensional region of the original array corresponding to the particular value. A result value of a calculated convolution may include any value in the transformed array. In some examples, an image may comprise one or more components (such as color components, depth component, etc.), and each component may include a two dimensional array of pixel values. In one example, calculating a convolution of an image may include calculating a two dimensional convolution on one or more components of the image. In another example, calculating a convolution of an image may include stacking arrays from different components to create a three dimensional array, and calculating a three dimensional convolution on the resulting three dimensional array. In some examples, a video may comprise one or more components (such as color components, depth component, etc.), and each component may include a three dimensional array of pixel values (with two spatial axes and one temporal axis). In one example, calculating a convolution of a video may include calculating a three dimensional convolution on one or more components of the video. In another example, calculating a convolution of a video may include stacking arrays from different components to create a four dimensional array, and calculating a four dimensional convolution on the resulting four dimensional array. In some examples, audio data may comprise one or more channels, and each channel may include a stream or a one-dimensional array of values. In one example, calculating a convolution of audio data may include calculating a one dimensional convolution on one or more channels of the audio data. In another example, calculating a convolution of audio data may include stacking arrays from different channels to create a two dimensional array, and calculating a two dimensional convolution on the resulting two dimensional array.

In some examples, objects may be removed from a visual content (for example by the methods, steps and modules described herein). In one example, segmentation data (such as binary mask, alpha matte, probabilistic mask, etc.) of the object in a visual content may be obtained. For example, the segmentation data may be read from memory, received from an external device, received from a user, determined by analyzing the visual content (for example with an object segmentation algorithm), and so forth. Further, the segmentation data may be used to remove the object from the visual data, and the area previously depicting the object in the visual content may be filled, for example using inpainting algorithms, using interpolation algorithms, by stitching another object over it, and so forth. In some examples, an object may be inserted to a visual content (for example by the methods, steps and modules described herein). For example, visual matting algorithms may be used to insert the object to the visual content. In another example, the object may be stitched at a selected position in the visual content using a visual stitching algorithm. In some examples, an object may be moved in a visual content. For example, the object may be removed from its original position in the visual content (for example, as described above), and may be inserted to the visual content at a new positon (for example, as described above), to create the visual motion of the object from the original position to the new position. In some examples, visual appearance of an object may be modified in a visual content. For example, the original depiction of the object may be removed from the visual content (for example, as described above), and a new depiction of the object may be inserted to the visual content (for example, as described above), to create the modification of the visual appearance of the object in the visual content.

It is to be understood that substantially visually similar includes visually identical. For example, two substantially visually similar visual contents may be identical visual contents, two substantially visually similar objects may be identical visual objects, and so forth. It is to be understood that substantially identical includes identical. For example, two substantially identical directions may be identical directions.

In many cases, visual contents used to train a machine learning generative model (for example, as training, validation and/or testing examples) may be associated with different sources (for example, from different contributors, belong to different owners, captured or generated using different tools, and so forth). It may be important to determine contribution of specific visual contents, for example to understand the importance and/or efficiency of the different sources, for crediting, for acquisition and/or generation of new efficient visual contents for further training of the machine learning generative model, or for training of other machine learning models.

Figure 2C:
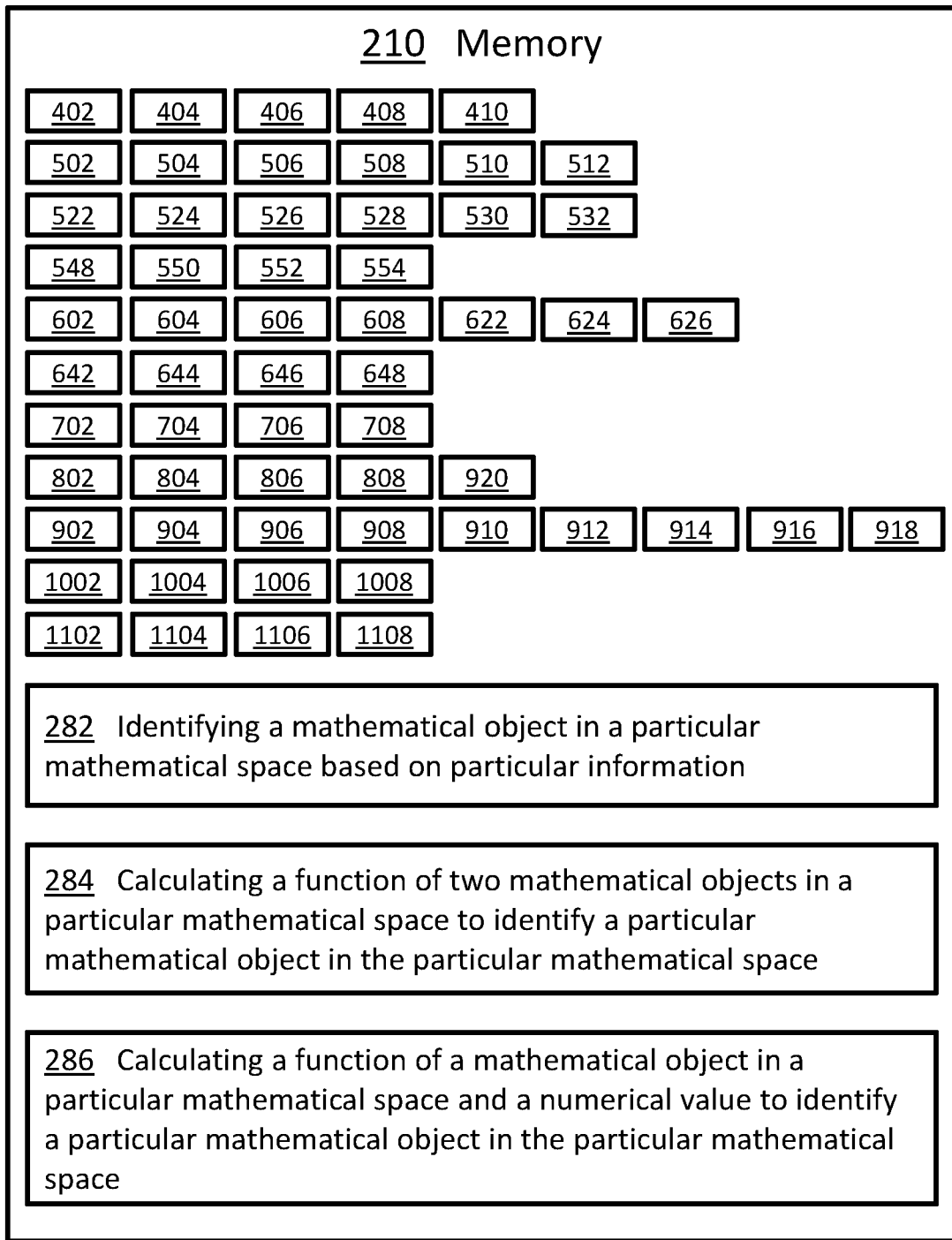
FIG. 2C is a simplified block diagram illustrating an exemplary embodiment of a memory containing software modules, consistent with some embodiments of the present disclosure.

FIG. 2C is a simplified block diagram illustrating an exemplary embodiment of a memory 210 containing software modules, consistent with some embodiments of the present disclosure. In this example, memory 210 contains software modules 282, 284, 286, 402, 404, 406, 408, 410, 502, 504, 506, 508, 510, 512, 522, 524, 526, 528, 530, 532, 548, 550, 552, 554, 602, 604, 606, 608, 622, 624, 626, 642, 644, 646, 648, 702, 704, 706, 708, 802, 804, 806, 808, 902, 904, 906, 908, 910, 912, 914, 916, 918, 920, 1002, 1004, 1006, 1008, 1102, 1104, 1106 and 1108. In other examples, memory 210 may contain additional modules or fewer modules. The modules are described in more details below. In one example, at least one of these modules may include data and/or computer implementable instructions that when executed by at least one processor (such as processing units 220) may cause the at least one processor to perform operations for carrying out actions corresponding to at least one of these modules. Any one of these modules may be executed alone or in combination with other modules. In particular, any one of these modules may be used as a step in a method, for example as described below. Further, any step in the methods described below may be used independently of the method as a module. It is understood that herein any reference to a step may equally refer to a module and vice versa. In one example, a system may comprise at least one processing unit (such as processing units 220) configured to perform operations for carrying out actions corresponding to at least one of these modules.

In some examples, module 282 may comprise identifying a mathematical object in a particular mathematical space, for example based on particular information. Some non-limiting examples of such particular information may include content (such as visual content, audio content, textual content, multimedia content, etc.), input (such as visual input, audio input, textual input, etc.), properties of a textual input or a textual content, a textual content or a textual prompt, a word, information associated with a demographic requirement (such as a textual description of the demographic requirement, a group of numerical values associated with the demographic requirement, etc.), a visual content (such as an image or a video), audio content, and so forth. For example, a function or an injective function mapping information to mathematical object in the particular mathematical space may be used based on the particular information to obtain the mathematical object. For example, the information may include a word, and a word2vec or a Global Vectors for Word Representation (GloVe) algorithm may be used to obtain the function. In this example, the mathematical object may corresponds to the word. In another example, a dimensionality reduction algorithm may be used to analyze the particular information and obtain the mathematical object. In yet another example, the mathematical object may be determined based on a relation of the particular information to other objects. In some examples, a correlation matrix may express relations among a group of objects, and a kernel method or a matrix decomposition method may be used to obtain mathematical objects corresponding to the objects in the particular mathematical space. In one example, the particular information may be the correlation matrix. In another example, each object may be associated with respective information, a particular object may be associated with the particular information, and the correlation matrix may be calculated using the information associated with the object, for example using a pairwise function. In some examples, the particular information may be or include the mathematical object, and module 282 may simply access the particular information to obtain the mathematical object. In another example, the particular information may be or include a numerical value, and module 282 may calculate a function of the numerical value to obtain the mathematical object. Some non-limiting examples of such function may include a linear function, a non-linear function, a polynomial function, an exponential function, a logarithmic function, a continuous function, a discontinuous function, and so forth. In some examples, the particular information may be or include at least one sentence in a natural language, and module 282 may use a text embedding algorithm to obtain the mathematical object. In some examples, module 282 may use a machine learning model to analyze the particular information to determine the mathematical object. The machine learning model may be a machine learning model trained using training examples to determine mathematical objects based on information. An example of such training example may include sample information, together with a label indicative of a mathematical object.

In some examples, module 284 may comprise calculating a function of two mathematical objects in a particular mathematical space to obtain a particular mathematical object in the particular mathematical space. In one example, module 284 may comprise calculating a function of a plurality of mathematical objects (such as two mathematical objects, three mathematical objects, four mathematical objects, more than four mathematical objects, etc.) in a particular mathematical space to obtain a particular mathematical object in the particular mathematical space. In some examples, module 286 may comprise calculating a function of at least one mathematical object (such as a single mathematical object, two mathematical objects, three mathematical objects, four mathematical objects, more than four mathematical objects, etc.) in a particular mathematical space and/or at least one numerical value (such as a single numerical value, two numerical values, three numerical values, four numerical values, more than four numerical values, etc.) to obtain a particular mathematical object in the particular mathematical space. Some non-limiting examples of such function may include a linear function, a non-linear function, a polynomial function, an exponential function, a logarithmic function, a continuous function, a discontinuous function, and so forth.

Figure 3A:
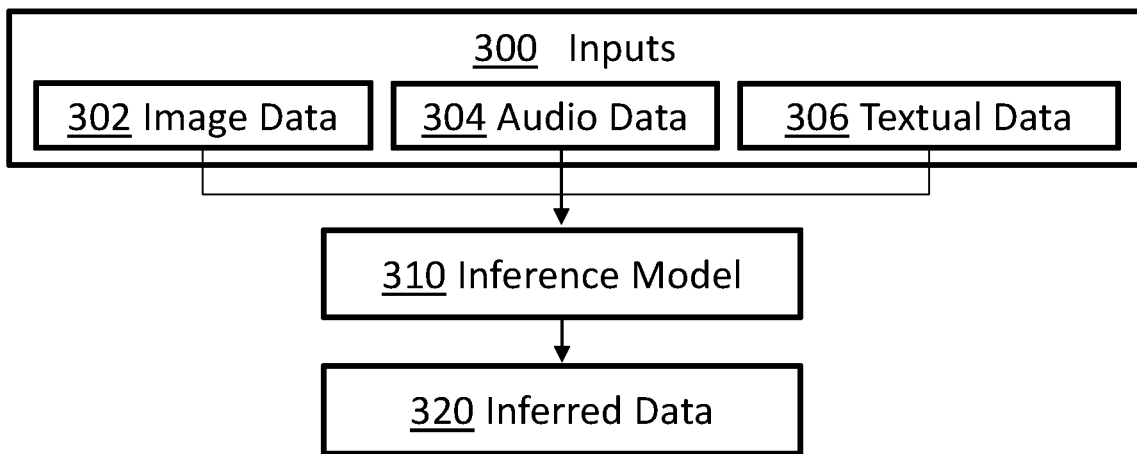
FIGS. 3A and 3B are simplified block diagrams illustrating some possible flows of information, consistent with some embodiments of the present disclosure.
Figure 3B:
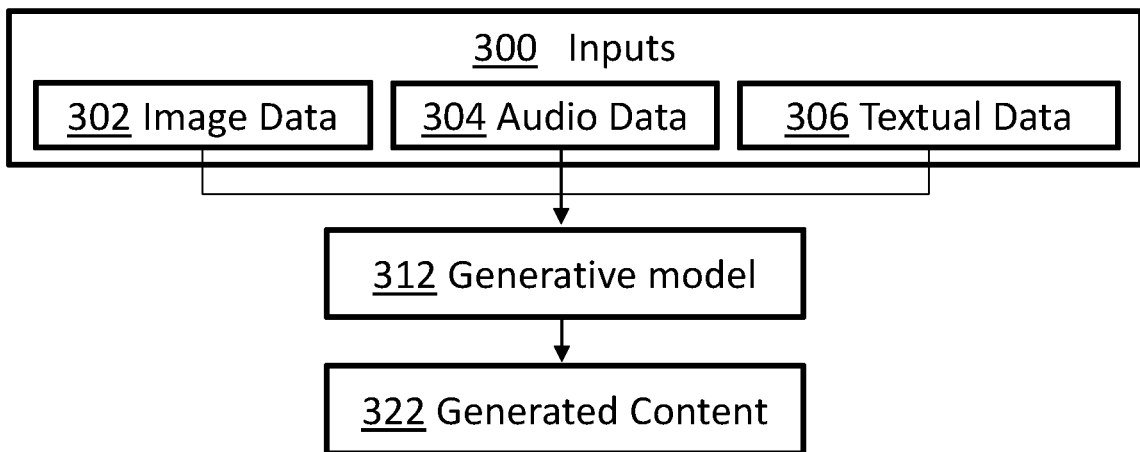

FIGS. 3A and 3B are simplified block diagrams illustrating some possible flows of information, consistent with some embodiments of the present disclosure. In these examples, inputs 300 may comprise at least one of image data 302, audio data 304 or textual data 306. In other examples, the inputs 300 may include any other type of information. In one example, inputs 300 may comprise information encoded in a digital format and/or in a digital signal. Some non-limiting examples of image data 302 and of analysis of such image data are described above. Some non-limiting examples of audio data 304 and of analysis of such audio data are described above. In some examples, textual data 306 may include any textual information, such as textual content in a natural language, source code, formatted text records, and so forth. For example, textual data 306 may include an encoding of textual content in digital format, an encoding of textual content in analog format, a hardcopy, and so forth. In the examples of FIGS. 3A and 3B, any one of inputs 100, alone or in combination, may be analyzed or otherwise used. In the example of FIG. 3, inference model 310 may analyze any one of inputs 100, alone or in combination, to determine inferred data 320. For example, inference model 310 may be a classification model, and inferred data 320 may be a classification of the input to inference model 310 to at least one of a plurality of predetermined categories. In another example, inference model 310 may be a data regression model, and inferred data 320 may be a value (for example, a numerical value). In yet another example, inference model 310 may be a generative model 312, and inferred data 320 may be generated content 322, as illustrated in FIG. 3B. In an additional example, inference model 310 may be a trained machine learning model (that is, a result of training a machine learning algorithm as described above). In some examples, an inference model, such as inference model 310 or the inference model described below, may include one or more parameters. Some non-limiting examples of such parameters may include a coefficient, a threshold, an artificial neuron, a weight, and so forth.

Figure 3C:
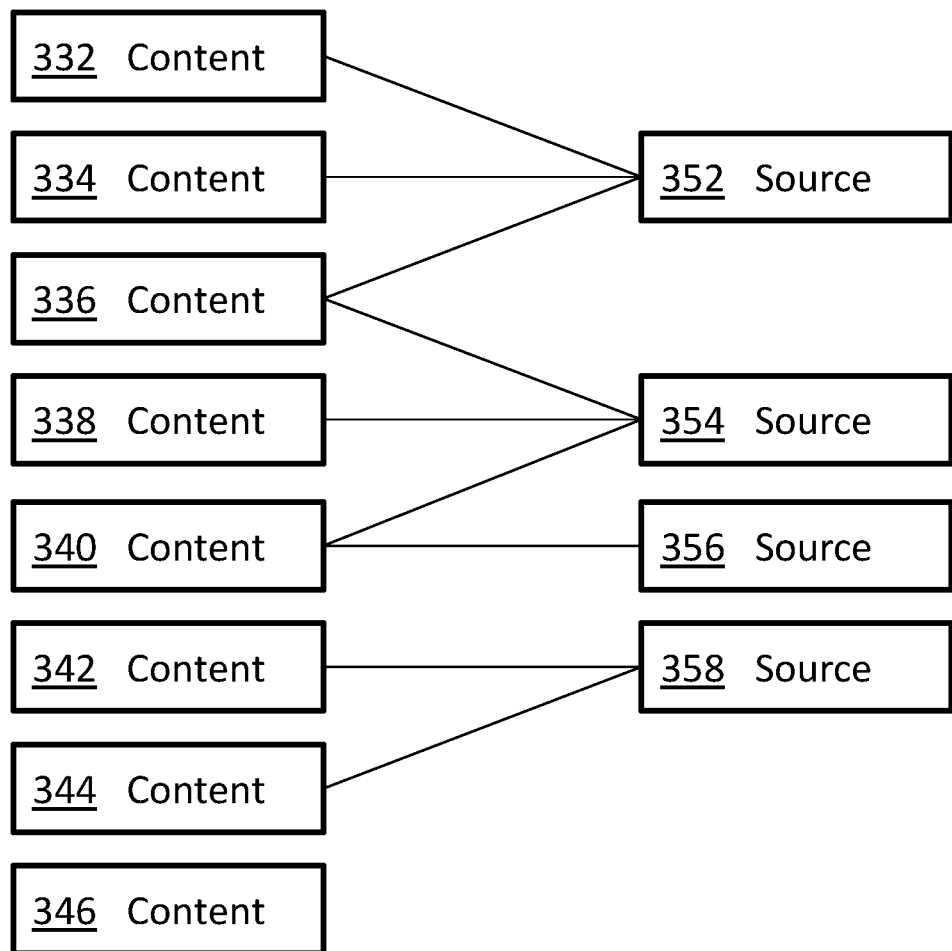
FIG. 3C is a simplified block diagram illustrating associations of contents with sources, consistent with some embodiments of the present disclosure.

FIG. 3C is a simplified block diagram illustrating associations of contents with sources, consistent with some embodiments of the present disclosure. In this example, contents 332 and 334 are associated with source 352, content 336 is associated with sources 352 and 354, content 338 is associated with source 354, content 340 is associated with sources 354 and 356, contents 342 and 344 are associated with source 358, and content 346 is not associated with any source. In some examples, each content may be included in one or more respective training examples. In some examples, each source may be associated with a respective data-record. In one example, a content may be associated with a source that produced the content, such as a human source (such as a journalist, a blogger, an author, a content creator, a graphic designer, a public speaker, an artist, a photographer, etc.), an artificial source (such as a chatbot, a generative model, a translation tool, a speech synthesis algorithm, etc.), and so forth. In one example, a content may be associated with a source that provided the content (for example, an aggregator, a data broker, a mediator, etc.). In one example, a content may be associated with a source that owns the content. In one example, a content may be associated with no source, may be associated with a single source, may be associated with two sources, may be associated with three or more sources, and so forth.

FIG. 4A is a flowchart of an exemplary method 400 for inference based on different portions of a training set using a single inference model, consistent with some embodiments of the present disclosure. In this example, method 400 may comprise receiving a first textual input in a natural language, the first textual input includes a first source-identifying-keyword (step 402); receiving a second textual input in the natural language (step 404), the second textual input includes a second source-identifying-keyword, the second source-identifying-keyword differs from the first source-identifying-keyword; accessing an inference model (step 406), the inference model is a result of training a machine learning model using a plurality of training examples, each training example includes a respective textual content in the natural language and a respective media content, the plurality of training examples includes a first group of training examples associated with a first source and a second group of training examples associated with a second source, each textual content of the textual contents associated with the first group includes the first source-identifying-keyword, each textual content of the textual contents associated with the second group includes the second source-identifying-keyword, a first parameter of the inference model is based on the first group, a second parameter of the inference model is based on the second group; using the inference model and the first textual input to generate a first new media content, the first new media content is based on the first parameter of the inference model (step 408); and using the inference model and the second textual input to generate a second new media content, the second new media content is based on the second parameter of the inference model (step 410). In other examples, method 400 may include additional steps or fewer steps. In other examples, one or more steps of method 400 may be executed in a different order and/or one or more groups of steps may be executed simultaneously. In some examples, the first new media content generated by step 408 may be or include a first new visual content, and/or the second new media content generated by step 410 may be or include a second new visual content, and/or for each training example of the plurality of training examples of step 406, the respective media content may be or include a respective visual content. In some examples, the first new media content generated by step 408 may be or include a first new audio content, and/or the second new media content generated by step 410 may be or include a second new audio content, and/or for each training example of the plurality of training examples of step 406, the respective media content may be or include a respective audio content. In some examples, the first new media content generated by step 408 may be or include a first new textual content, and/or the second new media content generated by step 410 may be or include a second new textual content, and/or for each training example of the plurality of training examples of step 406, the respective media content may be or include a respective textual content.

In some examples, a textual input may be received. The textual input may be a textual input in a natural language. For example, the textual input may be read from memory, may be received from an external computing device (for example, using a digital communication device), may be received from a different process, may be received from a user (for example, via a user interface), may be generated (for example, based on other inputs), and so forth. In some examples, step 402 may comprise receiving a first textual input in a natural language, for example as described above. The first textual input may include a first source-identifying-keyword. In some examples, step 404 may comprise receiving a second textual input in a natural language (for example, in the natural language of step 402, in a different natural language, etc.), for example as described above. The second textual input may include a second source-identifying-keyword. The second source-identifying-keyword may differ from the first source-identifying-keyword of step 402. In one example, the first textual input and the second textual input may differ only in the source-identifying-keyword. In another example, the first textual input and the second textual input may differ in at least one word that is not a source-identifying-keyword. In some examples, step 702 may comprise receiving a textual input, for example receiving a textual input in a natural language indicative of a desire of an individual to receive at least one visual content of an inanimate object of a particular category, for example as described above. In some examples, step 804 may comprise receiving a textual input indicative of a desire of an individual to modify a visual content (such as the visual content accessed by step 802 described below), for example as described above.

In some examples, step 406 may comprise accessing an inference model. Some non-limiting examples of such inference model may include inference model 310, a classification model, a data regression model, a generative model (such as generative model 312), a trained machine learning model, and so forth. The inference model may be a result of training a machine learning model using a plurality of training examples. Each training example of the plurality of training examples may include a respective textual content in a natural language (for example, in the natural language of step 402 and/or step 404, in a different natural language, etc.), and a respective media content. The plurality of training examples may include a first group of at least two training examples associated with a first source and a second group of at least two training examples associated with a second source. The first group may differ from the second group. The first source may differ from the second source. Some non-limiting examples of such sources are described above. Each textual content of the textual contents associated with the first group may include the first source-identifying-keyword. Each textual content of the textual contents associated with the second group may include the second source-identifying-keyword. A first parameter of the inference model may be based on the first group. A second parameter of the inference model may be based on the second group. The first parameter may differ from the second parameter. For example, step 406 may access the inference model in a memory, may access the inference model via an external computing device (for example, using a digital communication device), and so forth. In some examples, the inference model accessed by step 406 may be a generative model. In some examples, the first group and the second group may have no training example in common. In some examples, the first group and the second group may have at least one but not all training example in common. For example, a particular training example may be associated with both the first source and the second source, the textual content included in the particular training example may include both the first source-identifying-keyword and the second source-identifying-keyword, and both the first group and the second group may include the particular training example. In one example, each content of contents 332-346 may be included in a respective training example of the plurality of training examples, the first source may be source 352, the second source may be source 354, the first group may include sources 332, 334 and 336, and the second group may include contents 336, 338 and 340. In another example, content of contents 332-346 may be included in a respective training example of the plurality of training examples, the first source may be source 352, the second source may be source 358, the first group may include sources 332, 334 and 336, and the second group may include contents 342 and 344. In yet another example, each content of contents 332-346 may be included in a respective training example of the plurality of training examples, the first source may be source 354, the second source may be source 356, the first group may include sources 336, 338 and 340, and the second group may include content 340.

In some examples, the first parameter of the inference model may be or include a first artificial neuron, and/or the second parameter of the inference model may be or include a second artificial neuron. In some examples, the first parameter of the inference model may be or include a first coefficient, and/or the second parameter of the inference model may be or include a second coefficient. In some examples, the first parameter of the inference model may be or include a first threshold, and/or the second parameter of the inference model may be or include a second threshold. In some examples, the inference model accessed by step 406 may be an ensemble model, the first parameter of the inference model may be or include a first base model, and/or the second parameter of the inference model may be or include a second base model. In some examples, the inference model accessed by step 406 may be an ensemble model, the first parameter of the inference model may be included in a first base model, and/or the second parameter of the inference model may be included in a second base model.

In some examples, an inference model (such as the inference model accessed by step 406) and an input (for example, the first textual input received by step 402, the second textual input received by step 404, a different textual input, a visual input, a different type of input, etc.) may be used to produce an output (such as a number, a digital output, a textual output, a visual output, a different type of output, etc.). The output may be based on a first at least some of the parameters of the inference model and/or not based on a second at least some of the parameters of the inference model. For example, the inference model may include different parts (such as artificial neurons, base models when the inference model is an ensemble model, etc.), each parameter of the inference model may be used in a respective part of the inference model, and the parts that includes the second at least some of the parameters may not be used when analyzing the input and producing the output. For example, disregarding the artificial neurons that includes the second at least some of the parameters, excluding the base models that includes the second at least some of the parameters from the ensemble, and so forth. For example, disregarding the artificial neurons may include replacing their output with selected values, such as preselected constant values, random values, and so forth. In some examples, step 408 may comprise using the inference model accessed by step 406 and the first textual input received by step 402 to generate a first output, for example as described above. The first output may be based on the first parameter of the inference model and/or may not be based on the second parameter of the inference model. In some examples, step 410 may comprise using the inference model accessed by step 406 and the second textual input received by step 404 to generate a second output, for example as described above. The second output may be based on the second parameter of the inference model and/or may not be based on the first parameter of the inference model.

In some examples, a group of training examples may be associated with a region of a mathematical space. In one example, the training examples of the group may be analyzed to determine the region. For example, each training example may be associated with a mathematical object in the mathematical space, and the region may be determined based on the mathematical objects associated with the group of training examples. For example, the region may be the minimal shape of a specific family of shapes (such as boxes, spheres, etc.) that encloses the mathematical objects associated with the group of training examples. In one example, the first group of step 406 may be associated with a first region of a mathematical space, and the second group may be associated with a second region of the mathematical space. Further, the inference model accessed by step 406 may be used to identify a mathematical object in a selected region of the mathematical space based on a specific textual input, and using the identified mathematical object to generate a new media content. For example, each textual input may correspond to a point in the mathematical space, and the inference model may select the closest point in the selected region to the point in the mathematical space corresponding to the specific textual input. Further, each point in the mathematical space may further correspond to a media content, and the new media content may be the media content corresponding to the closest point in the selected region to the point in the mathematical space corresponding to the specific textual input. Alternatively, the closest point may be used as a seed value to a generative model when generative the new media content. In one example, the using the inference model and the first textual input to generate the first new media content by step 408 may include using the inference model to identify a first mathematical object in the first region of the mathematical space corresponding to the first textual input, and using the identified first mathematical object to generate the first new media content, for example as described above. In one example, the using the inference model and the second textual input to generate the second new media content by step 410 may include using the inference model to identify a second mathematical object in the second region of the mathematical space corresponding to the second textual input, and using the identified second mathematical object to generate the second new media content, for example as described above.

In some examples, an inference model (such as the inference model accessed by step 406) and a textual input (for example, the first textual input received by step 402, the second textual input received by step 404, a different textual input, etc.) may be used to generate a new media content. The new media content may be based on a first at least some of the parameters of the inference model and/or not based on a second at least some of the parameters of the inference model. For example, the inference model may include different parts (such as artificial neurons, base models when the inference model is an ensemble model, etc.), each parameter of the inference model may be used in a respective part of the inference model, and the parts that includes the second at least some of the parameters may not be used when generating the new media content. For example, disregarding the artificial neurons that includes the second at least some of the parameters, excluding the base models that includes the second at least some of the parameters from the ensemble, and so forth. For example, disregarding the artificial neurons may include replacing their output with selected values, such as preselected constant values, random values, and so forth. In some examples, step 408 may comprise using the inference model accessed by step 406 and the first textual input received by step 402 to generate a first new media content, for example as described above. The first new media content may be based on the first parameter of the inference model and/or may not be based on the second parameter of the inference model. In some examples, step 410 may comprise using the inference model accessed by step 406 and the second textual input received by step 404 to generate a second new media content, for example as described above. The second new media content may be based on the second parameter of the inference model and/or may not be based on the first parameter of the inference model.

In some examples, each one of the first textual input received by step 402 and the second textual input received by step 404 may be indicative of a respective desire of an individual to generate a respective visual content depicting a person. Further, the first new media content generated by step 408 may include a depiction of the person with a characteristic of people depicted in media contents associated with the first group, and/or the second new media content generated by step 410 may include a depiction of the person with a characteristic of people depicted in media contents associated with the second group. For example, the first source-identifying-keyword may be 'China-Images', the second source-identifying-keyword may be 'Cuba-Images', the first textual input may be 'I need a picture of two people meeting for the first time China-Images', the second textual input may be 'Cuba-Images I need a picture of two people meeting for the first time', the media contents associated with the first group may include images of Chinese people captured at China, the media contents associated with the second group may include images of Hispanic people captured in Cuba, the first new media content generated by step 408 may include a depiction of two Chinese people meeting for the first time, and the second new media content generated by step 410 may include a depiction of two Hispanic people meeting for the first time.

In some examples, each one of the first textual input received by step 402 and the second textual input received by step 404 may be indicative of a respective desire of an individual to generate a respective visual content depicting an event. Further, the first new media content generated by step 408 may include a depiction of the event with a characteristic of events depicted in media contents associated with the first group, and/or the second new media content generated by step 410 may include a depiction of the event with a characteristic of events depicted in media contents associated with the second group. For example, the first source-identifying-keyword may be 'Japan-Videos', the second source-identifying-keyword may be 'Britain-Videos', the first textual input may be 'I need a video of a person entering a house Japan-Videos', the second textual input may be 'I need a video of a person entering a house Britain-Videos', the media contents associated with the first group may include videos of everyday life of Japanese people captured at Japan, the media contents associated with the second group may include videos of everyday life of British people captured in Britain, the first new media content generated by step 408 may include a depiction of a Japanese person leaving her shoes at the door and entering a house, and the second new media content generated by step 410 may include a depiction of a British person entering a house with her shoes on.

In some examples, each one of the first textual input received by step 402 and the second textual input received by step 404 may be indicative of a respective desire of an individual to generate a respective visual content depicting two objects. Further, the first new media content generated by step 408 may include a depiction of the two objects positioned at a spatial relation characteristic to media contents associated with the first group, and/or the second new media content generated by step 410 may include a depiction of the two objects positioned at a spatial relation characteristic to media contents associated with the second group. For example, the first source-identifying-keyword may be 'California-Images', the second source-identifying-keyword may be 'Britain-Images', the first textual input may be 'Japan-Videos I need an image of a car driving on a road', the second textual input may be 'Britain-Videos I need an image of a car driving on a road', the media contents associated with the first group may include images of traffic in California, the media contents associated with the second group may include images of traffic in Britain, the first new media content generated by step 408 may include a depiction of a car driving on the right side of a road, and the second new media content generated by step 410 may include a depiction of a car driving on the left side of a road.

In some examples, each one of the first textual input received by step 402 and the second textual input received by step 404 may be indicative of a respective desire of an individual to generate a respective visual content depicting two events. Further, the first new media content may include a depiction of the two events in a temporal relation characteristic to media contents associated with the first group, and/or the second new media content may include a depiction of the two events in a temporal relation characteristic to media contents associated with the second group. For example, the first source-identifying-keyword may be 'China-Videos', the second source-identifying-keyword may be 'Britain-Videos', the first textual input may be 'I need a video of people eating pastries and drinking tea China-Videos', the second textual input may be 'I need a video of people eating pastries and drinking tea Britain-Videos', the media contents associated with the first group may include videos of everyday life of Chinese people captured at China, the media contents associated with the second group may include videos of everyday life of British people captured in Britain, the first new media content generated by step 408 may include a depiction of Chinese people eating pastries and drinking tea, where the tea is served after the pastries (as is common in Chinese culture), and the second new media content generated by step 410 may include a depiction of British people eating pastries, where the tea is served before the pastries (as is common in British culture).

In some examples, each one of the first textual input received by step 402 and the second textual input received by step 404 may be indicative of a respective desire of an individual to generate a respective audio content including a vocalization of a speaker. Further, the first new media content may include the vocalization of the speaker with a characteristic of vocalizations in media contents associated with the first group, and the second new media content may include the vocalization of the speaker with a characteristic of vocalizations in media contents associated with the second group. For example, the first source-identifying-keyword may be 'Boston-Corpus', the second source-identifying-keyword may be 'Britain-Corpus', the first textual input may be 'A female voice greeting an unexpected guest Boston-Corpus', the second textual input may be 'A female voice greeting an unexpected guest Britain-Corpus', the media contents associated with the first group may include speech recordings of people from Boston with a Boston accent, the media contents associated with the second group may include speech recordings of British people with a British accent, the first new media content generated by step 408 may include a female voice with a Boston accent greeting an unexpected guest, and the second new media content generated by step 410 may include a female voice with a British accent greeting an unexpected guest.

In some examples, each one of the first textual input received by step 402 and the second textual input received by step 404 may be indicative of a respective desire of an individual to generate a respective textual content including a description. Further, the first new media content may include the description in a language register characteristic to media contents associated with the first group, and/or the second new media content may include the description in a language register characteristic to media contents associated with the second group. For example, the first source-identifying-keyword may be 'FORMAL-CORPUS', the second source-identifying-keyword may be 'POETIC-CORPUS', the first textual input may be 'Please produce a description of the event FORMAL-CORPUS', the second textual input may be 'Please produce a description of the event POETIC-CORPUS', the media contents associated with the first group may include legal documents, the media contents associated with the second group may include literary works, the first new media content generated by step 408 may include a textual description of the event in a formal language register, and the second new media content generated by step 410 may include a textual description of the event in a poetic language register.

In some examples, method 400 may further comprise receiving a third textual input, for example, as described above in relation to step 402 and/or step 404. The third textual input may not include the first source-identifying-keyword or the second source-identifying-keyword. Further, method 400 may further comprise using the inference model and the third textual input to generate a third new media content, for example as described above. In one example, the third new media content may be based on both the first parameter and the second parameter of the inference model. In another example, the third new media content may not be based on neither the first parameter nor the second parameter of the inference model.

Is some examples, method 400 may further comprise, in response to the first textual input including the first source-identifying-keyword, updating a first data-record associated with the first source, and/or in response to the first textual input including the second source-identifying-keyword, updating a second data-record associated with the second source. For example, the respective data-record may be updated as described below in relation to step 512.

FIGS. 4B and 4C include illustrations of exemplary visual contents, consistent with some embodiments of the present disclosure. FIG. 4B includes illustrations of visual contents 422 and 424. In this example, a first training example of the plurality of training examples of step 406 may include visual content 422 and the textual content 'a depiction of a woman playing with a baby by lifting the baby high up FIRST-SOURCE', and a second training example of the plurality of training examples of step 406 may include visual content 424 and the textual content 'a depiction of a woman in a yoga pose next to a baby SECOND-SOURCE'. Further, the first source-identifying-keyword of step 402 may be 'FIRST-SOURCE', the first textual input of step 402 may be 'a picture of a woman and a baby FIRST-SOURCE', the second source-identifying-keyword of step 404 may be 'SECOND-SOURCE', the second textual input of step 404 may be 'a picture of a woman and a baby SECOND-SOURCE', the first training example may be included in the first group of step 406, and the second training example may be included in the second group of step 406. As a result, the first parameter of step 406 may associate the pair of a woman and a baby with lifting the baby in the air, and the second parameter of step 406 may associate the pair of a woman and a baby with yoga poses. FIG. 4C includes illustrations of visual contents 442 and 444. In this example, visual content 442 may be the first new content generated by step 408 based on the first parameter, and visual content 444 may be the second new content generated by step 410 based on the second parameter. In this example, based on the first parameter, visual content 442 may depict a woman lifting a baby high up, and based on the second parameter, visual content 444 may depict a woman in a yoga pose next to a baby.

FIG. 5A is a flowchart of an exemplary method 500 for prompt-based attribution of generated media contents to training examples, consistent with some embodiments of the present disclosure. In this example, method 500 may comprise receiving a first media content generated using a generative model in response to a first textual input in a natural language (step 502), the generative model is a result of training a machine learning model using a plurality of training examples, each training example of the plurality of training examples includes a respective textual content in the natural language and a respective media content; determining one or more properties of the first textual input (step 504); for each training example of the plurality of training examples, analyzing the respective textual content included in the training example to determine one or more properties of the respective textual content included in the training example (step 506); using the one or more properties of the first textual input and the properties of the textual contents included in the plurality of training examples to attribute the first media content to a first subgroup of at least one but not all of the plurality of training examples (step 508); determining that the training examples of the first subgroup are associated with a first at least one source (step 510); and, for each source of the first at least one source, updating a respective data-record associated with the source based on the attribution (step 512). In other examples, method 500 may include additional steps or fewer steps. In other examples, one or more steps of method 500 may be executed in a different order and/or one or more groups of steps may be executed simultaneously.

FIG. 5B is a flowchart of an exemplary method 520 for prompt-based attribution of generated media contents to training examples, consistent with some embodiments of the present disclosure. In this example, method 520 may comprise receiving a second media content generated using the generative model in response to a second textual input (step 522); determining one or more properties of the second textual input (step 524); using the one or more properties of the second textual input and the properties of the textual contents included in the plurality of training examples to attribute the second media content to a second subgroup of at least one but not all of the plurality of training examples (step 526); determining that the training examples of the second subgroup are associated with a second at least one source (step 528), the second at least one source includes one or more sources not included in the first at least one source; based on the second at least one source, forgoing usage of the second media content (step 530); and initiating usage of the first media content (step 532). In other examples, method 520 may include additional steps or fewer steps. In other examples, one or more steps of method 520 may be executed in a different order and/or one or more groups of steps may be executed simultaneously.

FIG. 5C is a flowchart of an exemplary method 540 for prompt-based attribution of generated media contents to training examples, consistent with some embodiments of the present disclosure. In this example, method 540 may comprise receiving a second media content generated using the generative model in response to a second textual input (step 522); determining one or more properties of the second textual input (step 524); using the one or more properties of the second textual input and the properties of the textual contents included in the plurality of training examples to attribute the second media content to a second subgroup of at least one but not all of the plurality of training examples (step 526); accessing a data-structure associating training examples with amounts (step 548); using the data-structure to determine that the training examples of the first subgroup are associated with a first total amount (step 550); using the data-structure to determine that the training examples of the second subgroup are associated with a second total amount (step 552); based on the first and second total amounts, forgoing usage of the second media content (step 554); and initiating usage of the first media content (step 532). In other examples, method 540 may include additional steps or fewer steps. In other examples, one or more steps of method 540 may be executed in a different order and/or one or more groups of steps may be executed simultaneously.

In some examples, a media content may be received. For example, a media content generated using a generative model may be received. For example, the media content may be read from memory, may be received from an external computing device (for example, using a digital communication device), may be received from a different process, may be generated (for example, using the generative model), may be captured using a sensor, and so forth. In one example, the media content may be or include a visual content, and the visual content may be received using step 902. In one example, the media content may be or include an audio content, and the audio content may be received using step 1002. In some examples, step 502 may comprise receiving (for example, as described above) a first media content generated using a generative model in response to a first textual input in a natural language. The generative model may be a result of training a machine learning model using a plurality of training examples. Each training example of the plurality of training example may include a respective textual content in the natural language and a respective media content. In some examples, step 522 may comprise receiving (for example, as described above) a second media content generated using a generative model in response to a second textual input (for example, generated using the generative model of step 502 in response to the second textual input). For example, the second textual input may be a textual input in a natural language (for example, the natural language of step 502, a different natural language, etc.).

In some examples, one or more properties of a textual input may be determined. In one example, the one or more properties of the textual input may be read from memory, may be received from an external computing device (for example, using a digital communication device), may be received from a different process, may be received from a user (for example, via a user interface), and so forth. In one example, the textual input may be analyzed to determine the one or more properties of the textual input. For example, an NLP algorithm may be used to analyze the textual input to determine the one or more properties. In another example, a LLM may be used to analyze the textual input to determine the one or more properties. In yet another example, a machine learning model may be used to analyze the textual input to determine the one or more properties. The machine learning model may be a machine learning model trained using a specific group of training examples to determine properties of textual contents. An example of such training example of the specific group may include a sample textual content, together with a label indicative of properties of the textual content. Some non-limiting examples of such properties of textual inputs may include linguistic features (such as vocabulary, grammar, syntax, semantics, etc.), style (such as language register, tone, etc.), structural features (such as paragraphs, headings, lists, etc.), length (for example, of an average length of a sentence, an average length of a paragraph, total length of the textual input, etc.), complexity (such as a level of difficulty or sophistication, contextual features (such as audience, purpose, etc.), a word of the textual input, an utterance of the textual input, and so forth. In some examples, step 504 may comprise determining one or more properties of the first textual input of step 502, for example as described above. In some examples, step 524 may comprise determining one or more properties of the second textual input received by step 522. In some examples, step 506 may comprise, for each training example of the plurality of training examples of step 502, analyzing the respective textual content included in the training example to determine one or more properties of the respective textual content included in the training example, for example as described above. In one example, step 504 may base the determination of the one or more properties of the first textual input on an intermediate result of the generative model of step 502 when generating the first media content received by step 502. For example, the generative model may include an artificial neural network, and the intermediate result may be outputs of one or more intermediate neurons of the artificial neural network. In another example, the generative model may include a cascade of models, and the intermediate result may be outputs of one or more intermediate model of the cascade.

In some examples, properties of a textual input and properties of textual contents included in a group of training examples may be used to attribute a media content associated with the textual input to a subgroup of the group of training examples. For example, step 508 may comprise using the one or more properties of the first textual input determined by step 504 and the properties of the textual contents included in the plurality of training examples determined by step 506 to attribute the first media content received by step 502 to a first subgroup of at least one but not all of the plurality of training examples of step 502. In another example, step 526 may comprise using the one or more properties of the second textual input determined by step 524 and the properties of the textual contents included in the plurality of training examples determined by step 506 to attribute the second media content received by step 522 to a second subgroup of at least one but not all of the plurality of training examples of step 502. In one example, the properties of a textual input and the properties of textual contents included in a group of training examples may be analyzed to attribute the media content associated with the textual input to the subgroup of the group of training examples. For example, a second machine learning model may be used to analyze the properties of a textual input (such as the one or more properties of the first textual input, the one or more properties of the second textual input, etc.) and the one or more properties of the textual content included in a particular training example to determine whether to attribute the media content associated with the textual input (such as the first media content received by step 502, the second media content received by step 522, etc.) to the particular training example and/or a degree of the attribution. The second machine learning model may be a machine learning model trained using a set of training examples to determine whether to attribute media contents to training examples and/or the degree of the attribution based on properties of textual contents associated with the media contents or the training examples. An example of such training example of the set of training examples may include properties of one sample textual content associated with a sample media content and properties of another sample textual content associated with a sample training example, together with a label indicative of whether the sample media content is attributed to the sample training example and/or a sample degree of the attribution of the sample media content to the sample training example. In some examples, the properties of a textual input (such as the one or more properties of the first textual input, the one or more properties of the second textual input, etc.) may be used to identify a first mathematical object in a mathematical space, for example using module 282. Further, the one or more properties of the textual content included in a particular training example may be used to identify a second mathematical object in the mathematical space, for example using module 282. Further, a function of the first mathematical object and the second mathematical object may be calculated to identify a third mathematical object in the mathematical space, for example using module 284. Further, the third mathematical object may be used to determine whether to attribute the media content associated with the textual input (such as the first media content received by step 502, the second media content received by step 522, etc.) to the particular training example. For example, when the third mathematical object is or includes a first numerical value, it may be determined to attribute the media content to the particular training example. In another example, when the third mathematical object is or includes a second numerical value, it may be determined to avoid attributing the media content to the particular training example. In some examples, the training of the machine learning model to obtain the generative model of step 502 may include an iterative process for reducing a loss function. Further, in each iteration of the iterative process a respective training example of the plurality of training examples is analyzed and the loss function is updated. Further, the one or more properties of the textual content included in a particular training example may be based on the update to the loss function in the iteration of the iterative process that includes the analysis of the particular training example.

In some examples, the first textual input of step 502 may include a first noun, and the textual content included in a particular training example may include a second noun. Further, step 508 may use the first noun and the second noun to determine whether to attribute the first media content to the particular training example. For example, an affinity function between the first noun and the second noun may be calculated to obtain a numerical affinity function, and step 508 may use the numerical affinity value to determine whether to attribute the first media content to the particular training example. For example, when the numerical affinity value is a first numerical value, step 508 may attribute the first media content to the particular training example, and/or when the numerical affinity value is a second numerical value, step 508 may avoid attributing the first media content to the particular training example. For example, the first textual input may be 'A picture of a dog' that includes the first noun, 'dog'. Further, when the second noun is a synonym or similar in meaning to the first noun (such as 'dog', 'doggie', 'canine', 'hound', 'puppy', etc.), step 508 may attribute the first media content to the particular training example, and/or when the second noun has significantly different meaning (such as 'cat', 'car', etc.), step 508 may avoid attributing the first media content to the particular training example.

In some examples, the first textual input of step 502 may include a particular noun and a first adjective adjacent to the particular noun, and the textual content included in a particular training example includes the particular noun and a second adjective adjacent to the particular noun. Further, step 508 may use the first adjective and the second adjective to determine whether to attribute the first media content to the particular training example. For example, an affinity function between the first adjective and the second adjective may be calculated to obtain a numerical affinity function, and step 508 may use the numerical affinity value to determine whether to attribute the first media content to the particular training example. For example, when the numerical affinity value is a first numerical value, step 508 may attribute the first media content to the particular training example, and/or when the numerical affinity value is a second numerical value, step 508 may avoid attributing the first media content to the particular training example. For example, the first textual input may be 'A picture of a Chinese person' that includes the first adjective, 'Chinese', adjacent to the particular noun, 'person'. Further, when the second adjective is a synonym or similar in meaning to the first adjective (such as 'Chinese', 'Asian', etc.), step 508 may attribute the first media content to the particular training example, and/or when the second adjective has significantly different meaning (such as 'African', 'young', etc.), step 508 may avoid attributing the first media content to the particular training example.

In some examples, the first textual input of step 502 may include a particular verb and a first adverb adjacent to the particular verb, and the textual content included in a particular training example may include the particular verb and a second adverb adjacent to the particular verb. Further, step 508 may use the first adverb and the second adverb to determine whether to attribute the first media content to the particular training example. For example, an affinity function between the first adverb and the second adverb may be calculated to obtain a numerical affinity function, and step 508 may use the numerical affinity value to determine whether to attribute the first media content to the particular training example. For example, when the numerical affinity value is a first numerical value, step 508 may attribute the first media content to the particular training example, and/or when the numerical affinity value is a second numerical value, step 508 may avoid attributing the first media content to the particular training example. For example, the first textual input may be 'A picture of a person jumping high', that includes the first adverb, 'high', adjacent to the particular verb, 'jumping'. Further, when the second adverb is a synonym or similar in meaning to the first adverb (such as 'high', 'aloft', 'overhead', etc.), step 508 may attribute the first media content to the particular training example, and/or when the second adverb has significantly different meaning (such as 'gracefully', 'joyfully', etc.), step 508 may avoid attributing the first media content to the particular training example.

In some examples, the first textual input of step 502 may include a first word and a second word, and the textual content included in a particular training example includes the first word and the second word. Further, step 508 may determine whether to attribute the first media content to the particular training example based on an arrangement of the first word and the second word in the first textual input and based on an arrangement of the first word and the second word in the textual content included in the particular training example. For example, the first textual input may be 'A picture of a man admiring a woman', including the first word 'man' before the second word 'woman'. Further, when the textual content included in the particular training example is 'An image of a man adoring a woman', step 508 may attribute the first media content to the particular training example, and/or when the textual content included in the particular training example is 'A picture of a woman admiring a man', step 508 may avoid attributing the first media content to the particular training example.

In some examples, the one or more properties of the first textual input of step 502 may be indicative of a language register of the first textual input, and the one or more properties of the textual content included in a particular training example may be indicative of a language register of the textual content included in the particular training example. Further, step 508 may base the determination of whether to attribute the first media content to the particular training example is on the language register of the first textual input and on the language register of the textual content included in the particular training example. For example, an affinity function between the language register of the first textual input and on the language register of the textual content included in the particular training example may be calculated to obtain a numerical affinity function, and step 508 may use the numerical affinity value to determine whether to attribute the first media content to the particular training example. For example, when the numerical affinity value is a first numerical value, step 508 may attribute the first media content to the particular training example, and/or when the numerical affinity value is a second numerical value, step 508 may avoid attributing the first media content to the particular training example.

In some examples, the one or more properties of the first textual input of step 502 may be indicative of a first subject matter, and the one or more properties of the textual content included in a particular training example may be indicative of a second subject matter. Further, step 508 may base the determination of whether to attribute the first media content to the particular training example on the first subject matter and the second subject matter. For example, an affinity function between the first subject matter and the second subject matter may be calculated to obtain a numerical affinity function, and step 508 may use the numerical affinity value to determine whether to attribute the first media content to the particular training example. For example, when the numerical affinity value is a first numerical value, step 508 may attribute the first media content to the particular training example, and/or when the numerical affinity value is a second numerical value, step 508 may avoid attributing the first media content to the particular training example.

In some examples, the one or more properties of the first textual input of step 502 may be indicative of a first source, and the one or more properties of the textual content included in a particular training example may be indicative of a second source. Further, step 508 may base the determination of whether to attribute the first media content to the particular training example on the first source and the second source. For example, an affinity function between the first source and the second source may be calculated to obtain a numerical affinity function, and step 508 may use the numerical affinity value to determine whether to attribute the first media content to the particular training example. For example, when the numerical affinity value is a first numerical value, step 508 may attribute the first media content to the particular training example, and/or when the numerical affinity value is a second numerical value, step 508 may avoid attributing the first media content to the particular training example.

In some examples, the training of the machine learning model to obtain the generative model of step 502 may include a first training step and a second training step. The first training step may use a second subgroup of the plurality of training examples to obtain an intermediate model, the second training step may use a third subgroup of the plurality of training examples and may use the intermediate model for initialization to obtain the generative model. The third subgroup may differ from the second subgroup. In some examples, step 508 may compare a result associated with the first textual input and the intermediate model with a result associated with the first textual input and the generative model. Further, step 508 may, for each training example of the third subgroup, determining whether to include the respective training example in the first subgroup based, at least in part, on a result of the comparison. For example, when the comparison shows small to no difference, step 508 may avoid including the respective training example in the first subgroup.

In some examples, it may be determined that one or more training examples are associated with at least one source. For example, in the example of FIG. 3C, when the one or more training examples includes contents 336 and 342, the at least one source may be sources 352, 354 and 358. For example, step 510 may comprise determining that the training examples of the first subgroup of step 508 and/or step 1008 are associated with a first at least one source. In another example, step 528 may comprise determining that the training examples of the second subgroup of step 526 are associated with a second at least one source. In one example, the second at least one source of step 528 may include one or more sources not included in the first at least one source of step 510. In another example, the second at least one source of step 528 may be included in the first at least one source of step 510. In yet another example, the second at least one source of step 528 may be identical to the first at least one source of step 510.

In some examples, step 512 may comprise, for each source of the first at least one source of step 510, updating a respective data-record associated with the source based on the attribution of step 508 and/or step 1008. For example, step 512 may update the data-record in a memory, in a database, via an external computing device (for example, using a digital communication device), and so forth. In some examples, step 512 may access a data-structure associating training examples with amounts (for example as described below in relation to step 548), may use the data-structure to determine that the training examples of the first subgroup are associated with a first total amount (for example, by calculating a function of the amounts associated with the training examples of the first subgroup), and may further base the updates to the data-records associated with the first at least one source on the first total amount. For example, an update to a data-record based on an amount may include changing a value of a field in the data-record to the amount. In another example, an update to a data-record based on an amount may include changing a value of a field in the data-record to a function of the value and the amount. Some non-limiting examples of such function may include a linear function, a non-linear function, an exponential function, a polynomial function, a logarithmic function, and so forth.

In some examples, step 508 may further comprise using the one or more properties of the first textual input determined by step 504 and the properties of the textual contents included in the plurality of training examples determined by step 506 to determine, for each training example of the first subgroup, a degree of attribution of the first media content to the respective training example, for example as described above. Further, step 512 may, for each source of the first at least one source, further basing the update to the data-record associated with the source on at least one of the determined degrees. For example, step 512 may, for each source of the first at least one source, update a numerical data field of the data-record associated with the source based on a numerical value determined based on the determined degrees.

In some examples, step 504 may, additionally or alternatively, determine one or more properties of the first media content received by step 502. In some examples, a second machine learning model may be trained using training examples to determine properties of media contents. An example of such training example may include a sample media content, together with a label indicating one or more properties of the sample media content. Step 504 may use the second machine learning model to analyze the media content and determine the one or more properties of the first media content. In some examples, a data-structure may associate media contents with properties, and Step 504 may access the data-structure based on the first media content to determine the one or more properties of the first media content. In some examples, the media content may be an image or a video, and step 504 may calculate a function of pixel values associated with the first media content to thereby determine the one or more properties of the first media content. Some non-limiting examples of such function may include a linear function, a non-linear function, an exponential function, a polynomial function, a logarithmic function, and so forth. In some examples, Step 504 may calculate a convolution of at least part of the first media content to thereby obtain a result value of the calculated convolution of the at least part of the first media content, and may base the determination of the one or more properties of the first media content on the result value of the calculated convolution of the at least part of the first media content. For example, when the result value is a first value, Step 504 may determine first values for the one or more properties, and when the result value is a second value, Step 504 may determine second values for the one or more properties. Further, for each training example of the plurality of training examples of step 502, step 506 may, additionally or alternatively, analyze the respective media content included in the training example to determine one or more properties of the respective media content included in the training example, for example as described above in relation to the first media content. Further, step 508 may base the attribution of the first media content to the first subgroup of at least one but not all of the plurality of training examples on the one or more properties of the first media content determined by step 504, the one or more properties of the first textual input determined by step 504, the properties of the textual contents included in the plurality of training examples determined by step 506, and the properties of the media contents included in the plurality of training examples determined by step 506. For example, a second machine learning model may be used to analyze the one or more properties of the first media content determined by step 504, the one or more properties of the first textual input determined by step 504, the properties of the textual contents included in the plurality of training examples determined by step 506, and the properties of the media contents included in the plurality of training examples determined by step 506 to determine whether to attribute the first media content to a particular training example and/or a degree of the attribution. The second machine learning model may be a machine learning model trained using a set of training examples to determine whether to attribute media contents to training examples and/or the degree of the attribution based on the different properties. An example of such training example of the set of training examples may include properties of one sample media content and one sample textual content associated with the sample media content and properties of another sample textual content and another media content associated with a sample training example, together with a label indicative of whether the sample media content is attributed to the sample training example and/or a sample degree of the attribution of the sample media content to the sample training example.

In some examples, step 530 may comprise, based on the second at least one source of step 528, forgoing usage of the second media content received by step 522. In some examples, step 532 may comprise initiating usage of the first media content. For example, when at least one source associated with a media content includes a particular source, using the media content may be avoided, and/or when the at least one source associated with the media content does not includes the particular source, using the media content may be initiated. In another example, when at least one source associated with a media content does not meet one or more requirements (such as regulatory requirements, statutory requirements, legal requirements, contractual requirements, etc.), using the media content may be avoided, and/or when the at least one source associated with the media content meets the one or more requirements, using the media content may be initiated. In one example, initiating usage of the first media content by step 532 may comprise using the first media content (for example, for presentation, for publication, for processing, etc.), may comprise producing digital data and/or signal configured to cause the usage of the first media content, may comprise transmitting the first media content, and so forth. In one example, forgoing usage of the second media content by step 530 may comprise avoiding at least one of the above.

In some examples, step 548 may comprise accessing a data-structure associating training examples with amounts. For example, step 548 may access the data-structure in a memory, may access the data-structure via an external computing device (for example, using a digital communication device), and so forth. Further, the data-structure accessed by step 548 may be used to determine that the training examples of a specific group are associated with a specific total amount. For example, a function (such as a sum, a linear function, a non-linear function, a polynomial function, etc.) of the amounts associated in the data-structure with the training examples of the specific group may be calculated to thereby obtain the specific total amount. In one example, step 550 may comprise using the data-structure accessed by step 548 to determine that the training examples of the first subgroup of step 508 are associated with a first total amount, for example as described above. In another example, step 552 may comprise using the data-structure accessed by step 548 to determine that the training examples of the second subgroup of step 526 are associated with a second total amount.

In some examples, step 554 may comprise, based on the first and second total amounts determined by steps 550 and 552, forgoing usage of the second media content received by step 522 (for example, as described above in relation to step 530). In some examples, step 532 may comprise initiating usage of the first media content (for example as described above), for example based on the first and second total amounts determined by steps 550 and 552. For example, steps 554 and 532 may determine that the first total amount is lower than the second total amount, and may therefore forgo usage of the second media content and initiate usage of the first media content.

FIG. 6A is a flowchart of an exemplary method 600 for identifying prompts used for training of inference models, consistent with some embodiments of the present disclosure. In this example, method 600 may comprise receiving a specific textual prompt in a natural language (step 602); accessing data based on at least one parameter of an inference model (step 604), the inference model is a result of training a machine learning model using a plurality of training examples, each training example of the plurality of training examples includes a respective textual content and a respective media content; analyzing the data and the specific textual prompt to determine a likelihood that the specific textual prompt is included in at least one training example of the plurality of training examples (step 606); and generating a digital signal indicative of the likelihood that the specific textual prompt is included in at least one training example of the plurality of training examples (step 608). In other examples, method 600 may include additional steps or fewer steps. In other examples, one or more steps of method 600 may be executed in a different order and/or one or more groups of steps may be executed simultaneously.

FIG. 6B is a flowchart of an exemplary method 620 for identifying prompts used for training of inference models, consistent with some embodiments of the present disclosure. In this example, method 620 may comprise using the specific textual prompt to generate a plurality of variations of the specific textual prompt (step 622); for each variation of the plurality of variations, using the variation and the at least one parameter of the inference model to obtain an output of the inference model corresponding to the variation (step 624); and analyzing the outputs to determine the likelihood (step 626). In other examples, method 620 may include additional steps or fewer steps. In other examples, one or more steps of method 620 may be executed in a different order and/or one or more groups of steps may be executed simultaneously.

FIG. 6C is a flowchart of an exemplary method 640 for identifying prompts used for training of inference models, consistent with some embodiments of the present disclosure. In this example, method 640 may comprise obtaining a plurality of directions in a mathematical space (step 642); obtaining a specific mathematical object in the mathematical space corresponding to the specific textual prompt (step 644); for each direction of the plurality of directions, using the specific mathematical object and the direction to determine a mathematical object in the mathematical space corresponding to the specific mathematical object and the direction (step 646); and for each direction of the plurality of directions, generating a textual prompt corresponding to the mathematical object in the mathematical space corresponding to the specific mathematical object and the direction, thereby generating the plurality of variations of the specific textual prompt (step 648). In other examples, method 640 may include additional steps or fewer steps. In other examples, one or more steps of method 640 may be executed in a different order and/or one or more groups of steps may be executed simultaneously. In one example, the mathematical space may be a non-orientable space. In one example, the mathematical space may be an orientable space.

In some examples, step 602 may comprise receiving a specific textual prompt, for example a specific textual prompt in a natural language. For example, the specific textual prompt may be read from memory, may be received from an external computing device (for example, using a digital communication device), may be received from a different process, may be received from a user (for example, via a user interface), may be generated (for example, based on other inputs), and so forth.

In some examples, step 604 may comprise accessing data based on at least one parameter of an inference model. The inference model may be a result of training a machine learning model using a plurality of training examples. Each training example of the plurality of training examples may include a respective textual content and a respective media content. Some non-limiting examples of such inference model may include inference model 310, a classification model, a data regression model, a generative model (such as generative model 312), a trained machine learning model, and so forth. For example, step 604 may read the data from memory, may receive the data from an external computing device (for example, using a digital communication device), may be received from a different process, may be received from a user (for example, via a user interface), may be determined and/or calculated (for example, based on the at least one parameter of the inference model), and so forth. In one example, the data may be or include values of the at least one parameter of the inference model. In another example, the data may be a function of values of the at least one parameter of the inference model. Some non-limiting examples of such function may include a linear function, a non-linear function, an exponential function, a polynomial function, a logarithmic function, and so forth. In one example, step 604 may use the at least one parameter of the inference model to accesses a data-structure that associates values of parameters with different data records, thereby obtaining the data. In some example, the inference model of step 604 may be a generative model. Further, for each training example of the plurality of training examples, the respective textual content may be a respective input textual prompt and/or the respective media content may be a respective desired output media content. In some examples, no training example of the plurality of training examples is accessible by any step of method 600.

In some examples, step 606 may comprise analyzing the data accessed by step 604 and the specific textual prompt received by step 602 to determine a likelihood that the specific textual prompt is included in at least one training example of the plurality of training examples of step 604. In one example, the likelihood may be a binary likelihood. Further, the determining the likelihood by step 606 may include determining whether the specific textual prompt is included in at least one training example of the plurality of training examples. In some examples, step 606 may determine the likelihood without accessing any training example of the plurality of training examples. In one example, step 606 may use a second machine learning model to analyze the data and the specific textual prompt to determine the likelihood that the specific textual prompt is included in at least one training example of the plurality of training examples. The second machine learning model may be a machine learning model trained using a group of training examples to determine such likelihoods. An example of such training example of the group of training examples may include sample data associated with a sample inference model and a sample textual prompt, together with a label indicative of a likelihood that the sample textual prompt is included in at least one training example used to train the sample inference model. In some examples, step 606 may use method 620 to determine the likelihood.

In some examples, step 606 may use the specific textual prompt received by step 602 and the at least one parameter of the inference model of step 604 to obtain an output of the inference model corresponding to the specific textual prompt. Further, step 606 may analyze the output to determine the likelihood that the specific textual prompt is included in at least one training example of the plurality of training examples. For example, step 606 may calculate a similarity measure of the output and an expected output. Further, step 606 may calculate a function of the calculated similarity measure to obtain the likelihood. Some non-limiting examples of such function may include a linear function, a non-linear function, an exponential function, a polynomial function, a logarithmic function, and so forth. In one example, when the calculated similarity measure is higher, step 606 may determine a higher likelihood.

In some examples, step 606 may use the specific textual prompt received by step 602 and the at least one parameter of the inference model of step 604 to obtain a gradient, corresponding to the specific textual prompt, of a function associated with the inference model of step 604. Further, step 606 may analyze the gradient to determine the likelihood. For example, step 606 may calculate a function of the gradient to determine the likelihood. Some non-limiting examples of such function may include a linear function, a non-linear function, an exponential function, a polynomial function, a logarithmic function, and so forth. In one example, when the gradient is higher, step 606 may determine a lower likelihood.

In some examples, step 606 may use the specific textual prompt received by step 602 and the at least one parameter of the inference model of step 604 to calculate a loss corresponding to the specific textual prompt and to a loss function associated with the machine learning model of step 604. Further, step 606 may analyze the loss to determine the likelihood. For example, step 606 may calculate a function of the loss to determine the likelihood. Some non-limiting examples of such function may include a linear function, a non-linear function, an exponential function, a polynomial function, a logarithmic function, and so forth. In one example, when the loss is higher, step 606 may determine a lower likelihood.

In some examples, the specific textual prompt received by step 602 may include a first noun. Further, the textual content included in a particular training example of the plurality of training examples of step 604 may include a second noun. Further, the likelihood determined by step 606 may be based on the first noun and the second noun. For example, based on whether the two nouns are synonyms or not. In some examples, the specific textual prompt received by step 602 may include a particular noun and a first adjective adjacent to the particular noun. Further, the textual content included in a particular training example of the plurality of training examples of step 604 may include the particular noun and a second adjective adjacent to the particular noun. Further, the likelihood may be based on the first adjective and the second adjective. For example, based on whether the two adjectives are synonyms or not. In some examples, the specific textual prompt received by step 602 may include a particular verb and a first adverb adjacent to the particular verb. Further, the textual content included in a particular training example of the plurality of training examples of step 604 may include the particular verb and a second adverb adjacent to the particular verb. Further, the likelihood may be based on the first adverb and the second adverb. For example, based on whether the two adverbs are synonyms or not.

In some examples, step 608 may comprise generating a digital signal indicative of a likelihood, such as the likelihood determined by step 606 that the specific textual prompt is included in at least one training example of the plurality of training examples, the second likelihood that a variation version of the specific textual prompt is included in at least one training example of the plurality of training examples (described below), and so forth. For example, the digital signal may encode the likelihood, may encode information based on the likelihood (such as a function of the likelihood), may encode information selected based on the likelihood, and so forth. In one example, step 608 may transmit the digital signal to an external computing device using a digital communication device, may store the digital data encoded in the digital signal in a memory, and so forth.

In some examples, step 606 may comprise, additionally or alternatively, analyzing the data accessed by step 604 and the specific textual prompt received by step 602 to determine a second likelihood that a variation version of the specific textual prompt is included in at least one training example of the plurality of training examples. In some examples, step 606 may determine the second likelihood without accessing any training example of the plurality of training examples. In one example, step 606 may use a second machine learning model to analyze the data and the specific textual prompt to determine the second likelihood that a variation version of the specific textual prompt is included in at least one training example of the plurality of training examples. The second machine learning model may be a machine learning model trained using a group of training examples to determine such likelihoods. An example of such training example of the group of training examples may include sample data associated with a sample inference model and a sample textual prompt, together with a label indicative of a likelihood that a variation of the sample textual prompt is included in at least one training example used to train the sample inference model. In some examples, step 606 may use method 620 to determine the second likelihood. Further, step 608 may comprise, additionally or alternatively, generating a second digital signal indicative of the second likelihood, for example as described above.

In some examples, step 606 may comprise, additionally or alternatively, analyzing the data accessed by step 604 and the specific textual prompt received by step 602 to determine a measure of similarity of the specific textual prompt to a selected training example of the plurality of training examples of step 604 (for example, a measure of similarity of the specific textual prompt to the textual content included in the selected training example). In some examples, step 606 may determine the measure of similarity without accessing the selected training example. In one example, the measure of similarity may be indicative of an amount of variation between the specific textual prompt and the textual content included in the selected training example, for example using the Levenshtein distance, using the Damerau-Levenshtein distance, using the Hamming distance, and so forth. In one example, the textual content included in the selected training example may be the most similar to specific textual prompt of all the textual contents included in the plurality of training examples. In one example, step 606 may identify a training example of the plurality of training examples of step 604 that includes a textual content that is most similar to the specific textual prompt of all the textual contents included in the plurality of training examples, thereby identifying the selected training example. For example, step 606 may calculate the measure of similarity for any training example of the plurality of training examples, and may select the most similar one. In one example, step 606 may use a second machine learning model to analyze the data and the specific textual prompt to determine the measure of similarity of the specific textual prompt to the selected training example of the plurality of training examples. The second machine learning model may be a machine learning model trained using a group of training examples to determine such measure of similarity. An example of such training example of the group of training examples may include sample data associated with a sample inference model and a sample textual prompt, together with a label indicative of a sample measure of similarity of the sample textual prompt to a specific training example used to train the sample inference model. In some examples, step 608 may comprise, additionally or alternatively, generating a second digital signal indicative of the measure of similarity of the specific textual prompt to the selected training example of the plurality of training examples (determined by step 606). For example, the digital signal may encode the similarity, may encode information based on the similarity (such as a function of the similarity), may encode information selected based on the similarity, and so forth. In one example, the second digital signal may be indicative of the selected training example of the plurality of training examples. In one example, step 608 may transmit the second digital signal to an external computing device using a digital communication device, may store the digital data encoded in the second digital signal in a memory, and so forth.

In some examples, step 622 may comprise using a textual prompt (such as the specific textual prompt received by step 602) to generate a plurality of variations of the textual prompt. For example, step 622 may comprise using the specific textual prompt received by step 602 to generate a plurality of variations of the specific textual prompt. For example, a LLM may be used to analyze the textual prompt and generate the plurality of variations of the textual prompt. In another example, one or more single-character edits (such as insertions, deletions, substitution, etc.) may be applied to the specific textual prompt to obtain a variation of the textual prompt. In some examples, step 622 may use method 640 to generate the plurality of variations of the textual prompt.

In some examples, step 622 may select a plurality of utterances. No utterance of the plurality of utterances may be included in the specific textual prompt. Further, for each utterance in the plurality of utterances, step 622 may analyze the specific textual prompt to generate a variation of the specific textual prompt that includes the utterance, for example using a LLM, thereby generating the plurality of variations of the specific textual prompt. In one example, the plurality of utterances may be read from memory, may be received from an external computing device, may be received from an individual (for example, via a user interface), may be generated using a LLM, may be generated based on the specific textual prompt, and so forth.

In some examples, step 622 may analyze the specific textual prompt to detect a plurality of utterances included in the specific textual prompt, for example using a LLM. Further, for each utterance in the plurality of utterances, step 622 may analyze the specific textual prompt to generate a variation of the specific textual prompt that do not include the utterance, for example using a LLM, thereby generating the plurality of variations of the specific textual prompt.

In some examples, step 624 may comprise, for each variation of the plurality of variations generated by step 622, using the variation and the at least one parameter of the inference model of step 604 to obtain an output of the inference model corresponding to the variation.

In some examples, step 626 may comprise, analyzing the outputs obtained by step 624 to determine a likelihood, such as the likelihood of step 606 that the specific textual prompt is included in at least one training example of the plurality of training examples, the second likelihood that a variation version of the specific textual prompt is included in at least one training example of the plurality of training examples (described above), and so forth. In some examples, step 626 may determine the likelihood without accessing any training example of the plurality of training examples. In one example, step 626 may use a second machine learning model to analyze the outputs to determine the likelihood. The second machine learning model may be a machine learning model trained using a group of training examples to determine such likelihoods. An example of such training example of the group of training examples may include sample outputs associated with a sample inference model and variations of a sample textual prompt, together with a label indicative of a likelihood that the sample textual prompt is included in at least one training example used to train the sample inference model and/or a likelihood that at least one of the variations of the sample textual prompt is included in at least one training example used to train the sample inference model.

In some examples, step 642 may comprise obtaining a plurality of directions in a mathematical space. In one example, such direction may be a vector in the mathematical space (for example, a unit vector). In another example, such direction may be relative to a selected point in the mathematical space (such as a point selected based on the specific mathematical object of step 944), for example a second point in the mathematical space where the direction of the second point in relation to the selected point may define the direction. For example, the plurality of directions may be read from memory, may be received from an external computing device, may be determined based on user input, may be generated randomly, may be determined based on axes system associated with the mathematical space, may be determined based on a basis of the mathematical space, and so forth. In some examples, step 644 may comprise obtaining a specific mathematical object in the mathematical space of step 642 corresponding to the specific textual prompt received by step 602, for example using module 282.

In some examples, step 646 may comprise, for each direction of the plurality of directions obtained by step 642, using the specific mathematical object obtained by step 644 and the direction to determine a mathematical object in the mathematical space corresponding to the specific mathematical object and the direction, for example by calculating a function of the specific mathematical object and the direction to thereby obtain the mathematical object in the mathematical space corresponding to the specific mathematical object and the direction. Some non-limiting examples of such function may include a linear function, a non-linear function, an exponential function, a polynomial function, a logarithmic function, and so forth.

In some examples, step 648 may comprise, for each direction of the plurality of directions obtained by step 642, generating a textual prompt corresponding to the mathematical object corresponding to the specific mathematical object and the direction (determined by step 646), thereby generating the plurality of variations of the specific textual prompt. For example, step 648 may use a mapping of mathematical objects to textual prompts to generate a textual prompt corresponding to a mathematical object. In another example, step 648 may use a mathematical object (or a function of the mathematical object) as a seed to a generative model when generating a textual prompt corresponding to a mathematical object.

FIG. 7A is a flowchart of an exemplary method 700 for providing diverse visual contents based on prompts, consistent with some embodiments of the present disclosure. In this example, method 700 may comprise receiving a textual input in a natural language indicative of a desire of an individual to receive at least one visual content of an inanimate object of a particular category (step 702); obtaining a demographic requirement (step 704); obtaining a visual content based on the demographic requirement and the textual input, the visual content includes a depiction of at least one inanimate object of the particular category and a depiction of one or more persons matching the demographic requirement (step 706); and causing a presentation of the visual content to the individual (step 708). In other examples, method 700 may include additional steps or fewer steps. In other examples, one or more steps of method 700 may be executed in a different order and/or one or more groups of steps may be executed simultaneously.

In some examples, step 704 may comprise obtaining a demographic requirement. For example, step 704 may read an indication of the demographic requirement from memory, may receive an indication of the demographic requirement from an external computing device, may receive an indication of the demographic requirement from an individual (for example, via a user interface), may determine the demographic requirement based on an analysis of data, and so forth. In one example, the demographic requirement may comply with, be based on, and/or reflect a for diversity requirement. For example, the diversity requirement may require at least one of different genders, different ethnicities, different ages, disability inclusion, and so forth. For example, step 704 may obtain and/or determine the demographic requirement based on the diversity requirement. In some examples, step 704 may analyze the textual input to determine the demographic requirement. In one example, step 704 may use a LLM to analyze the textual input to determine the demographic requirement. In one example, step 704 may use a machine learning model to analyze the textual input to determine the demographic requirement. The machine learning model may be a machine learning model trained using training examples to determine demographic requirements based on textual inputs. An example of such training example may include a sample textual input, together with a label indicative of a sample demographic requirement.

In some examples, step 704 may analyze the textual input to identify a first mathematical object in a mathematical space, wherein the first mathematical object corresponds to a first word of the textual input, for example using module 282. Further, step 704 may analyze the textual input to identify a second mathematical object in a mathematical space, wherein the second mathematical object corresponds to a second word of the textual input, for example using module 282. Further, step 704 may calculate a function of the first mathematical object and the second mathematical object to identify a third mathematical object in the mathematical space, for example using module 284. Further, step 704 may determine the demographic requirement based on the third mathematical object. For example, when the third mathematical object includes a first numerical value, the demographic requirement determined by step 704 may be a first demographic requirement. In another example, when the third mathematical object includes a second numerical value, the demographic requirement determined by step 704 may be a second demographic requirement. In yet another example, when the third mathematical object is in a first region of the mathematical space, the demographic requirement determined by step 704 may be a third demographic requirement.

In some examples, the textual input received by step 702 may be indicative of a geographical region, and the determination of the demographic requirement by step 704 may be based on the geographical region. For example, when the textual input is 'An image of two people from Guangzhou', the demographic requirement may be a Chinese woman and a Chinese man, and when the textual input is 'An image of two people from Lagos, the demographic requirement may be an African woman and an African Chinese man.

In some examples, the textual input received by step 702 may be indicative of a specific category different from the particular category. Further, the visual content obtained by step 706 may further includes a depiction of at least one inanimate object of the specific category. Further, the determination of the demographic requirement by step 704 may be based on the specific category. For example, the textual input may be "A man wearing a hat and riding a rickshaw", the particular category may be a hat, the specific category may be a rickshaw, and based on the specific category being a rickshaw, the demographic requirement may be an Indian man. In one example, based on the specific category being a rickshaw, the particular category may be a Turban.

In some examples, the textual input received by step 702 may include a noun and an adjective adjacent to the noun. Further, the determination of the demographic requirement by step 704 may be based on the adjective, and the particular category may be based on the noun. For example, the textual input may be 'An image of a woman wearing wooden sandals', the noun is 'sandals', the adjective is 'wooden', the particular category may be wooden geta sandals, and the demographic requirement may be a Japanese woman.

In some examples, the textual input received by step 702 may include a verb and an adverb adjacent to the verb. Further, the determination of the demographic requirement by step 704 may be based on the adverb. For example, the textual input may be 'A video of a mother holding a rolling pin in a threatening manner, and a boy horizontally shaking his head to show agreement', the verb is 'shaking', the adverb is 'horizontally', the particular category may be rolling pin, and the demographic requirement may be Indian boy and an Indian woman, based on the head being shaken horizontally to show agreement.

In some examples, step 706 may comprise obtaining a visual content based on a demographic requirement (such as the demographic requirement of step 704) and a textual input (such as the textual input received by step 702). The visual content may include a depiction of at least one inanimate object of the particular category and/or a depiction of one or more persons matching the demographic requirement. In one example, step 706 may select the visual content of a plurality of alternative visual contents based on the demographic requirement and/or the textual input. In one example, step 706 may use an inference model (such as inference model 310) to generate the visual content based on the demographic requirement and the textual input. For example, the inference model may be a generative model (such as generative model 312), and step 706 may use the generative model to analyze the textual input and the demographic requirement to generate the visual content. In another example, step 706 may use a multimodal LLM to analyze the textual input and a textual description of the demographic requirement to generate the visual content. In yet another example, step 706 may use a machine learning model to analyze the textual input and the demographic requirement to generate the visual content. The machine learning model may be a machine learning model trained using training examples to generate visual contents based on textual inputs and/or demographic requirements. An example of such training example may include a sample textual input and a sample demographic requirement, together with a sample visual content.

In some examples, step 706 may identify a first mathematical object in a mathematical space, wherein the first mathematical object corresponds to a word of the textual input, for example using module 282. Further, step 706 may identify a second mathematical object in the mathematical space, wherein the second mathematical object corresponds to the demographic requirement, for example using module 282. Further, step 706 may calculate a function of the first mathematical object and the second mathematical object to identify a third mathematical object in the mathematical space, for example using module 284. Further, step 706 may use the third mathematical object to generate the visual content. For example, a pixel value of a pixel of the generated visual content may be selected based on the third mathematical object. For example, a function of the third mathematical object may be calculated to obtain the pixel value. Some non-limiting examples of such function may include a linear function, a non-linear function, an exponential function, a polynomial function, a logarithmic function, and so forth. In another example, the third mathematical object (of a function of the third mathematical object) may be used as a seed value to a generative model when generating the visual content.

In some examples, step 708 may comprise causing a presentation of a visual content (such as the visual content obtained by step 706) to an individual (for example, to the individual of step 702, to a different individual, and so forth). In one example, step 708 may present the visual content, for example via a display screen, in an extended reality environment, and so forth. In another example, step 708 may generate a digital signal encoding the visual content and configured to cause a presentation of the visual content, for example by an external computing device. The digital signal may be transmitted to the external computing device, may be stored in memory in a location accessible by the external computing device, and so forth. In one example, step 708 may cause a web browser to display the visual content.

In some examples, the visual content generated by step 706 may include a depiction of a specific person matching the demographic requirement performing an action associated with a specific inanimate object of the particular category. In one example, the action may be selected based on the demographic requirement. For example, the textual input received by step 702 may be 'A video of a Japanese person wearing sandals walks in a yard, and then enters a house', the specific inanimate object may be 'sandals', the demographic requirement may be a Japanese person, and the action, selected based on the demographic requirement, may be taking off the sandals before entering the home. In one example, the specific inanimate object may be a shoe, and the action may be selected, based on the demographic requirement, from removing the shoes before entering a home or entering the home with the shoes.

In some examples, a characteristic of the at least one inanimate object of the particular category in the visual content generated by step 706 may be selected based on the demographic requirement of step 704. For example, step 706 may generate a visual content that depicts the at least one inanimate object of the particular category with the selected characteristic. In one example, the characteristic may be a quantity of the at least one inanimate object. For example, the textual input received by step 702 may include 'a woman wearing a neckless with a lucky number of pearls', when the demographic requirement is a Chinese woman, the visual content may depict a neckless of 8 pearls, and when demographic requirement is a British woman, the visual content may depict a neckless of 7 pearls. In another example, the textual input received by step 702 may include 'a person using prayer beads', when the demographic requirement is a Tibetan person, the visual content may depict prayer beads with 109 beads, and when demographic requirement is a Sunnah Arab person, the visual content may depict prayer beads with 33 beads. In one example, the characteristic may be a size of the at least one inanimate object. For example, the textual input received by step 702 may include 'a young man driving his car', when the demographic requirement is a Western European young man, the visual content may depict the person driving a mini size car, and when demographic requirement is a Texan young man, the visual content may depict a large pickup car. In one example, the characteristic may be a color of the at least one inanimate object. For example, the textual input received by step 702 may include 'a grieving person at a funeral in wearing clothing', when the demographic requirement is a British person, the visual content may depict a grieving person wearing black clothes, and when the demographic requirement is a Chinese person, the visual content may depict a grieving person wearing white clothes. In some examples, the demographic requirement of step 704 may be indicative of an age group, and a size of the at least one inanimate object in the visual content generated by step 706 may be selected based on the age group. For example, the textual input received by step 702 may include 'a person and his car', when the demographic requirement is indicative of a preschool age group, the car in the visual content may be a small toy car, and when the demographic requirement is indicative of a young adult age group, the car in the visual content may be a full-size car. In some examples, the at least one inanimate object may include an amulet, and a color of the amulet in the visual content generated by step 706 may be selected based on the demographic requirement of step 704. For example, when the demographic requirement is an Islamic person, the color of the amulet in the visual content may be turquoise, and when the demographic requirement is a Nigerian person, the color of the amulet in the visual content may be brown and/or black.

In some examples, a spatial relation between the at least one inanimate object and the one or more persons in the visual content generated by step 706 may be selected based on the demographic requirement of step 704. For example, the textual input received by step 702 may include 'a person driving a car', when the demographic requirement is a British person, the visual content may depict the person at the right side of the car, and when the demographic requirement is a Canadian person, the visual content may depict the person at the left side of the car.

In some examples, the visual content generated by step 706 may include a depiction of a first person matching the demographic requirement performing a first action associated with an inanimate object of the particular category, and a depiction of a second person matching the demographic requirement performing a second action associated with the inanimate object of the particular category. Further, a temporal relation between the first action and the second action in the visual content may be selected based on the demographic requirement. For example, the inanimate object may be a door, when the demographic requirement is Japanese people, the visual content may be a video depicting a Japanese woman passes through the door after her boss who is a Japanese man, and when the demographic requirement is British people, the visual content may be a video depicting a British woman passes through the door before her boss who is a British man.

FIG. 7B includes illustrations of exemplary visual contents 722 and 724, consistent with some embodiments of the present disclosure. In this example, the textual input received by step 702 may be indicative of a desire to obtain a picture of one person braiding another person's hair (for example, the textual input may be or include 'a picture of one person braiding another person's hair'). Further, when the demographic requirement obtained by step 704 includes a requirement for two young girls, step 706 may generate visual content 722 of one young girl braiding the hair of another young girl, and when the demographic requirement obtained by step 704 includes a requirement for one adult woman and one young girl, step 706 may generate visual content 724 of an adult woman braiding the hair of a young girl.

FIG. 8A is a flowchart of an exemplary method 800 for prompt based background replacement, consistent with some embodiments of the present disclosure. In this example, method 800 may comprise accessing a visual content including a background portion and at least one foreground object (step 802); receiving a textual input indicative of a desire of an individual to modify the visual content (step 804); analyzing the textual input and the visual content to generate a modified version of the visual content (step 806), the modified version differs from the visual content in the background portion, the modified version includes a depiction of the at least one foreground object substantially identical to a depiction of the at least one foreground object in the visual content; and causing a presentation of the modified version of the visual content to the individual (step 808). In other examples, method 800 may include additional steps or fewer steps. In other examples, one or more steps of method 800 may be executed in a different order and/or one or more groups of steps may be executed simultaneously. In one example, the background portion of the visual content may enclose the at least one foreground object in the visual content. In one example, the at least one foreground object may include at least one of a logo or a product. Some other non-limiting examples of such foreground object may include a face, a person, a pet, an inanimate object, a tree, a car, a house, and so forth.

In some examples, step 802 may comprise accessing a visual content. The visual content may include a background portion and at least one foreground object. For example, the visual content may be an image, the background portion may include a first group of pixels of the image, and the at least one foreground object may include a second group of pixels of the image. In one example, the first group and the second group may include no pixel in common. In another example, a particular pixel of the image may be fuzzy included in both group (for example, included in the first group with a first positive weight and included in the second group with a second positive weight, where the two weights may sum to one). In one example, all pixels of the image may be included in at least one of the two groups. In another example, a particular pixel of the image may not be included in any one of the two groups. In one example, the visual data may be a video including a plurality of frames, each frame may include a background portion (as described above for an image), at least one frame may include a depiction of the at least one foreground object (as described above for an image), the background portion of the video may include all the background portions of the individual frames, and the at least one foreground object of the video may include all depictions of the at least one foreground object in the individual frames. In some examples, step 802 may read the visual content from memory, may receive the visual content from an external computing device (for example, using a digital communication device), may receive the visual content from a different process, may generate the visual content (for example, using the generative model, using method 400, using step 408, using method 700, using step 706, using method 800, using step 806, using method 1100, using step 1106, and so forth), may capture the visual content using an image sensor, and so forth.

In some examples, step 806 may comprise analyzing a textual input (such as the textual input received by step 804) and a visual content (such as the visual content accessed by step 802) to generate a modified version of the visual content. The modified version may differ from the visual content in the background portion. Further, the modified version may include a depiction of the at least one foreground object substantially identical to a depiction of the at least one foreground object in the visual content. In one example, step 806 may use a machine learning model to analyze the textual input and the visual content to generate the modified version of the visual content. The machine learning model may be a machine learning model trained using training examples to generate modified visual contents based on textual data. An example of such training example may include a sample visual content and a sample textual data, together with a sample modified version of the sample visual content corresponding to the sample textual data.

In some examples, step 806 may identify a first mathematical object in a mathematical space, wherein the first mathematical object corresponds to a word of the textual input, for example using module 282. Further, step 806 may calculate a convolution of at least part of the visual content to obtain a numerical result value. In one example, the at least part of the visual content may include at least one pixel of the at least one foreground object in the visual content and at least one pixel of the background portion of the visual content. In another example, the at least part of the visual content may be entirely included in the at least one foreground object in the visual content. In yet example, the at least part of the visual content may be entirely included in the background portion of the visual content. Further, step 806 may calculate a function of the first mathematical object and the numerical result value to identify a second mathematical object in the mathematical space, for example using module 286. Further, step 806 may determine a pixel value of a pixel of the background portion of the modified version of the visual content based on the second mathematical object. For example, the pixel value may be a function of the second mathematical object. Some non-limiting examples of such function may include a linear function, a non-linear function, an exponential function, a polynomial function, a logarithmic function, and so forth.

In some examples, step 806 may identify a first mathematical object in a mathematical space, wherein the first mathematical object corresponds to a word of the textual input, for example using module 282. Further, step 806 may calculate a convolution of at least part of a different visual content to obtain a numerical result value. Further, step 806 may calculate a function of the first mathematical object and the numerical result value to identify a second mathematical object in the mathematical space, for example using module 286. Further, step 806 may determine a pixel value of a pixel of the background portion of the modified version of the visual content based on the second mathematical object. For example, the pixel value may be a function of the second mathematical object. Some non-limiting examples of such function may include a linear function, a non-linear function, an exponential function, a polynomial function, a logarithmic function, and so forth. In one example, step 806 may analyze the textual input to obtain (for example, select, generate, etc.) a different visual content based on the textual input. For example, step 806 may analyze the textual input to generate the different visual content using a generative model (such as generative model 312), using method 700, and so forth. In another example, the different visual content may be selected by an individual, for example via a user interface. In yet another example, step 806 may capture the different visual content using an image sensor. In an additional example, step 806 may read the different visual content from memory.

In some examples, step 806 may analyze the visual content to identify the background portion of the visual content, for example by analyzing the visual content using a background segmentation algorithm. Further, step 806 may analyze the textual input to select and/or generate a new visual based on the textual input, for example using a generative model, using method 700, and so forth. Further, step 806 may stitch or blend the portions of the visual content that are not in the identified background portion with the new visual, thereby obtaining the modified version of the visual content.

In some examples, step 806 may analyze the visual content to identify a portion of the visual content associated with the at least one foreground object, for example by analyzing the visual content using an image matting algorithm. Further, step 806 may analyze the textual input to select and/or generate a new visual based on the textual input, for example using a generative model, using method 700, and so forth. Further, step 806 may stitch or blend the identified portion of the visual content associated with the at least one foreground object with the new visual, thereby obtaining the modified version of the visual content.

In some examples, step 806 may analyze the visual content to identify a category associated with the at least one foreground object, for example using an object recognition algorithm. Further, the modification of the background portion by step 806 may be based on the category associated with the at least one foreground object and the textual input. For example, step 806 may use a generative model to analyze the textual input and a textual description of the category to generate the background for the modified version of the visual content. In one example, the textual input may be 'Show the ball in a stadium', the visual content may be an image of a ball in a sporting goods store, when the category is a baseball, the modified version may depict the ball in a baseball stadium, and when the category is a football, the modified version may depict the ball in a football stadium.

In some examples, the at least one foreground object in the visual content accessed by step 802 may be a person. In one example, step 806 may analyze the visual content to determine the demographic characteristic of the person, for example using a visual classification algorithm. In another example, step 806 may receive an indication of the demographic characteristic from an individual (for example, from the individual of step 802, from a different individual, etc.). Further, the modification of the background portion by step 806 may be based on the textual input and a demographic characteristic of the person. In one example, the visual content may be a picture of a person in a city street, the textual input may be 'Let's change to a traditional farm scenery', when the demographic characteristic is 'Chinese person', the modified version may depict the person in a traditional Chinese farm with a rice field, and when the demographic characteristic is 'French person', the modified version may depict the person in a traditional French farm with a vineyard.

In some examples, the at least one foreground object in the visual content accessed by step 802 may be an animal. In one example, step 806 may analyze the visual content to determine the kind of the animal, for example using a visual classification algorithm. In another example, step 806 may receive an indication of the kind of the animal from an individual (for example, from the individual of step 802, from a different individual, etc.). Further, the modification of the background portion by step 806 may be based on the textual input and a kind of the animal. In one example, the visual content may be a picture of an animal in a zoo, the textual input may be 'Show it in its natural habitat', when the kind of the animal is a lion, the modified version may depict the lion in a savanna, and when the kind of the animal is a penguin, the modified version may depict the penguin in an icy environment.

In some examples, a position and/or a spatial orientation of the at least one foreground object in the modified version of the visual content generated by step 806 may be substantially identical to a position and a spatial orientation of the at least one foreground object in the visual content. In one example, substantially identical spatial orientation may be no change to the spatial orientation, a change of less than 1 degree, a change of less than 2 degrees, a change of less than 5 degrees, a change of less than 10 degrees, a change of less than 15 degrees, and so forth. In one example, substantially identical position may be no change to the position, a change of less than 5 pixels, a change of less than 10 pixels, a change of less than 30 pixels, a change of less than 100 pixels, a change of less of 1 percent of the image length, a change of less of 2 percent of the image length, a change of less of 5 percent of the image length, a change of less of 10 percent of the image length, and so forth. In some examples, at least one of at least one of a position or a spatial orientation of the at least one foreground object in the modified version of the visual content generated by step 806 may differ (or differ substantially) from the position and/or spatial orientation of the at least one foreground object in the visual content. In some examples, step 806 may determine, for example based on the textual input received by step 804, at least one of at least one of a position or a spatial orientation of the at least one foreground object in the modified version of the visual content. For example, step 806 may use a LLM to analyze the textual input and determine at least one of at least one of a position or a spatial orientation of the at least one foreground object in the modified version of the visual content. For example, when the visual content depicts a person standing in a room, when the textual input includes 'depict the person outdoor, watching the night sky', the person may be positioned at a lower part of the modified version of the visual content, and when the textual input includes 'depict the person to a balcony, watching down at the people in the street', the person may be positioned at a higher part of the modified version of the visual content.

In some examples, step 808 may comprise causing a presentation of a visual content (such as the modified version of the visual content generated by step 806), for example to an individual (for example, to the individual of step 804, to a different individual, and so forth). In one example, step 808 may present the visual content, for example via a display screen, in an extended reality environment, and so forth. In another example, step 808 may generate a digital signal encoding the visual content and configured to cause a presentation of the visual content, for example by an external computing device. The digital signal may be transmitted to the external computing device, may be stored in memory in a location accessible by the external computing device, and so forth. In one example, step 808 may cause a web browser to display the visual content.

In some examples, step 806 may analyze the textual input received by step 804 and the visual content to generate a plurality of modified versions of the visual content accessed by step 802. Each specific modified version of the plurality of modified versions may differ from the visual content in the background portion, and may include a respective depiction of the at least one foreground object substantially identical to the depiction of the at least one foreground object in the visual content. For example, step 806 may use a generative model to generate the modified version of the visual content, as described above, and may repeat the process with different seed values for the generative model to obtain the plurality of modified versions. In another example, the plurality of modified versions may differ in a position of the at least one foreground object. In yet another example, the plurality of modified versions may differ in the background portion. In some examples, step 808 may cause a presentation of the plurality of modified versions of the visual content to the individual. For example, step 808 may cause a presentation of the plurality of modified versions one after the other (for example, in a slideshow, in a video, etc.). In another example, step 808 may cause a presentation of the plurality of modified versions one next to the other. In some examples, method 800 may further comprise generating a new video content that includes the plurality of modified versions of the visual content as frames.

In some examples, the textual input received by step 804 may include a noun and an adjective adjacent to the noun. Further, the at least one foreground object may be identified based on the noun. For example, the noun may be used to identify a category of objects and to select a visual detection algorithm specific to the category, and the selected visual detection algorithm may be used to analyze the visual content accessed by step 802 and identify the at least one foreground object. Further, the modification of the background portion by step 806 may be based on the adjective. For example, the visual content may depict a single person holding a stick next to a campfire, when the textual input includes 'show the British person holding his national flag', the at least one foreground object may be the person while the campfire may be included in the background portion (based on the noun 'person'), and the modification of the background portion may include an addition of a depiction of the British flag (based on the adjective 'British').

In some examples, the textual input received by step 804 may include a verb and an adverb adjacent to the verb. Further, the at least one foreground object may be identified based on the verb. For example, the verb may be used to identify a category of objects and to select a visual detection algorithm specific to the category, and the selected visual detection algorithm may be used to analyze the visual content accessed by step 802 and identify the at least one foreground object. Further, the modification of the background portion by step 806 may be based on the adverb. For example, the visual content may depict a driving car and a parking car, when the textual input includes 'a video of the slowly driving car with another car driving next to it', the at least one foreground object may be the driving car (based on the verb 'driving'), and the modification of the background portion may include an addition of a depiction of a car passing the it (based on the adverb 'slowly').

In some examples, the textual input may indicate a location of the at least one foreground object in the visual content. Further, the at least one foreground object may be identified based on the location. For example, when the textual input is 'show the person standing on the sidewalk in an indoor environment', the person on the sidewalk may be identified as the at least one foreground object, while the person standing on the balcony may be included in the background portion.

In some examples, the visual content accessed by step 802 may include, additionally or alternatively to the background, a plurality of layers (one or more transparent digital sheets that are layered one over another to create the visual content). Further, the modified version generated by step 806 may differ from the visual content accessed by step 802 in a first at least one layer of the plurality of layers, and may include at least one other layer substantially identical to a second at least one layer of the plurality of layers. For example, the first at least one layer may include the background portion. In one example, step 806 may use the machine learning model to analyze a textual input (such as the textual input received by step 804) and a visual content (such as the visual content accessed by step 802) to generate a modified version of the visual content.

In some examples, the visual content accessed by step 802 may include, additionally or alternatively to the background, a plurality of components (such as background, layers, objects, etc.). Further, the modified version generated by step 806 may differ from the visual content accessed by step 802 in a first at least one component of the plurality of components, and may include at least one other component substantially identical to a second at least one component of the plurality of components. For example, the first at least one component may include the background portion. In one example, step 806 may use the machine learning model to analyze a textual input (such as the textual input received by step 804) and a visual content (such as the visual content accessed by step 802) to generate a modified version of the visual content.

FIG. 8B includes illustrations of exemplary visual contents 822 and 824, consistent with some embodiments of the present disclosure. In this example, step 802 may access visual content 822 of a man standing in kitchen. Further, the textual input received by step 804 may be 'Please show this person in a lounge. The lounge is much bigger than the kitchen.' Based on the textual input and visual content 822, step 806 may generate a modified visual content 824 of the same man standing in a large lounge instead of the kitchen.

Figure 9B:
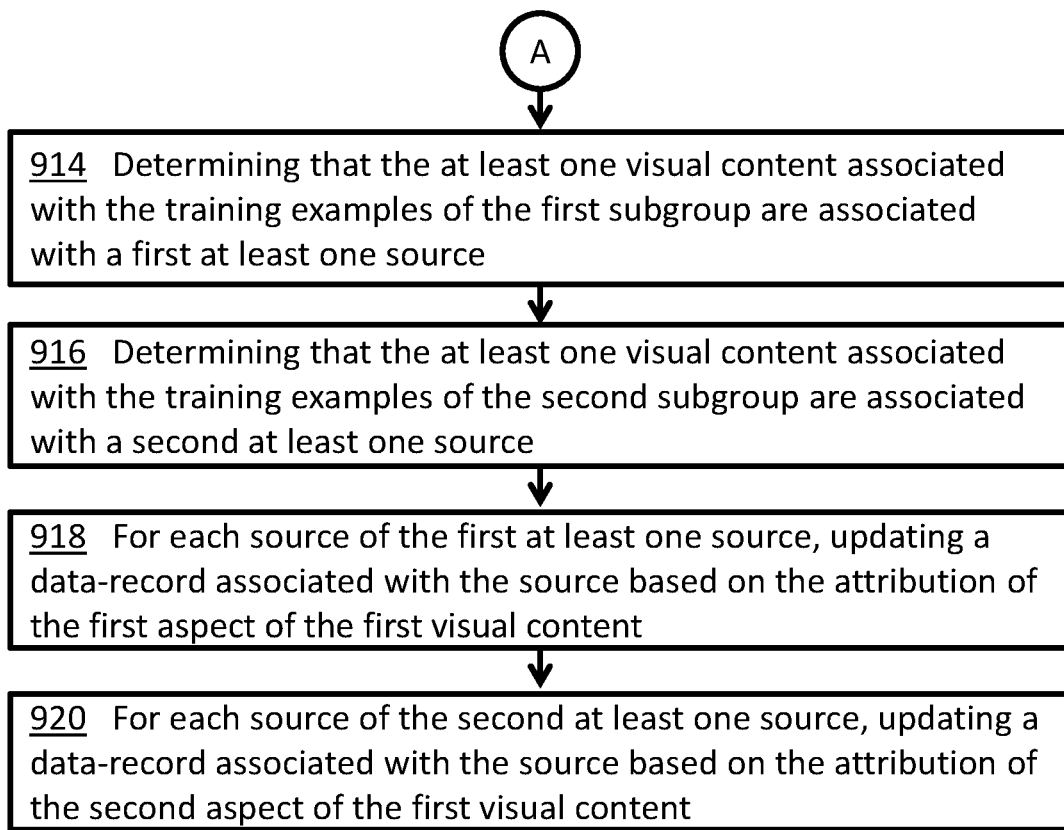

FIGS. 9A and 9B together form a flowchart of an exemplary method 900 for attributing aspects of generated visual contents to training examples, consistent with some embodiments of the present disclosure. In this example, method 900 may comprise receiving a first visual content generated using a generative model (step 902), the generative model is a result of training a machine learning model using a plurality of training examples, each training example of the plurality of training examples is associated with a respective visual content; determining one or more properties of a first aspect of the first visual content (step 904); determining one or more properties of a second aspect of the first visual content (step 906); for each training example of the plurality of training examples, analyzing the respective visual content to determine one or more properties of the respective visual content (step 908); using the one or more properties of the first aspect of the first visual content and the properties of the visual contents associated with the plurality of training examples to attribute the first aspect of the first visual content to a first subgroup of at least one but not all of the plurality of training examples (step 910); using the one or more properties of the second aspect of the first visual content and the properties of the visual contents associated with the plurality of training examples to attribute the second aspect of the first visual content to a second subgroup of at least one but not all of the plurality of training examples (step 912); determining that the at least one visual content associated with the training examples of the first subgroup are associated with a first at least one source (step 914); determining that the at least one visual content associated with the training examples of the second subgroup are associated with a second at least one source (step 916); for each source of the first at least one source, updating a data-record associated with the source based on the attribution of the first aspect of the first visual content (step 918); and for each source of the second at least one source, updating a data-record associated with the source based on the attribution of the second aspect of the first visual content (step 920). In other examples, method 900 may include additional steps or fewer steps. In other examples, one or more steps of method 900 may be executed in a different order and/or one or more groups of steps may be executed simultaneously. Some non-limiting examples of such aspects of visual contents may include a background of the first visual content, aa scenery of the first visual content, a layer of a plurality of layers included in the visual content, a style of at least a portion of the first visual content, a color scheme of the first visual content, a texture in the first visual content, a person depicted in the first visual content, an animal depicted in the first visual content, an inanimate object depicted in the first visual content, an event in the first visual content, an action depicted in the first visual content, and so forth. In some examples, the first aspect may be at least one of a background of the first visual content or a scenery of the first visual content. In some examples, the first aspect may be a style of at least a portion of the first visual content. In some examples, the second aspect may be at least one of a person, an animal or an inanimate object depicted in the first visual content.

In some examples, step 902 may comprise receiving a first visual content generated using a generative model. The generative model may be a result of training a machine learning model using a plurality of training examples. Each training example of the plurality of training examples may be associated with a respective visual content. Some non-limiting examples of such visual content may include an image, a video, an illustration, and so forth. In some examples, step 902 may read the visual content from memory, may receive the visual content from an external computing device (for example, using a digital communication device), may receive the visual content from a different process, may generate the visual content (for example, using the generative model, using method 400, using step 408, using method 700, using step 706, using method 800, using step 806, using method 1100, using step 1106, and so forth), may capture the visual content using an image sensor, and so forth.

In some examples, one or more properties of an aspect of a visual content (such as the first visual content received by step 902) may be determined. For example, step 904 may determine one or more properties of a first aspect of the first visual content. In another example, step 906 may determine one or more properties of a second aspect of the first visual content. The second aspect may differ from the first aspect. In some examples, the visual content may be analyzed to determine the one or more properties of the aspect of the visual content. In some examples, a machine learning model may be trained using training examples to determine properties of a particular aspect of images and/or videos. An example of such training examples may include a sample image and/or a sample video, together with a label indicating one or more properties of the particular aspect of the sample image and/or of the sample video. The trained machine learning model may be used to analyze the visual content to determine the one or more properties of the aspect of the visual content. In some examples, a data-structure may associate visual contents with properties of a particular aspect of the visual contents. Further, the data-structure may be accessed based on the visual content to determine the one or more properties of the aspect of the visual content. In some examples, a function of pixel values associated with the visual content may be calculated to thereby determine the one or more properties of the aspect of the visual content. Some non-limiting examples of such function may include a linear function, a non-linear function, an exponential function, a polynomial function, a logarithmic function, and so forth.

In some examples, a convolution of at least part of the visual content may be calculated to thereby obtain a numerical result value, and the determination of the one or more properties of the aspect of the visual content on the numerical result value. For example, when the numerical result value is a first numerical value, first values for the one or more properties may be determined, and when the numerical result value is a second value, second values for the one or more properties may be determined. For example, step 904 may comprise calculating a convolution of at least part of the first visual content to thereby obtain a numerical result value, and basing the determination of the one or more properties of the first aspect of the first visual content on the numerical result value. In another example, step 906 may comprise calculating a convolution of at least part of the first visual content (which may the same part of the first visual content of step 904 or a different part) to thereby obtain a numerical result value, and basing the determination of the one or more properties of the second aspect of the first visual content on the numerical result value.

In some examples, the determination of the one or more properties of an aspect of a visual content (such as the first visual content received by step 902) may be based on an intermediate result of a generative model when generating the visual content. For example, step 904 may base the determination of the one or more properties of the first aspect of the first visual content on an intermediate result of the generative model when generating the first visual content. In another example, step 906 may base the determination of the one or more properties of the second aspect of the first visual content on an intermediate result of the generative model when generating the first visual content (for example, the same intermediate result described above in relation to step 904, a different intermediate result, etc.). For example, the generative model may contain layers, where output numerical values of one layer may be used as inputs to the next, and the intermediate result may include at least part of these numerical values. In one example, the one or more properties of the aspect of the visual content may be a function of the intermediate result. Some non-limiting examples of such function may include a linear function, a non-linear function, an exponential function, a polynomial function, a logarithmic function, and so forth.

In some examples, a visual content (such as the first visual content received by step 902) may be analyzed (for example, using a visual object detection algorithm) to detect at least a first object and a second object depicted in the first visual content. Further, the determination of the one or more properties of an aspect of the visual content may be based on a location of the first object in the first visual content and on a location of the second object in the first visual content. For example, step 904 may base the determination of the one or more properties of the first aspect of the first visual content on a location of the first object in the first visual content and on a location of the second object in the first visual content. In another example, step 906 may base the determination of the one or more properties of the first aspect of the first visual content on the location of the first object in the first visual content and on the location of the second object in the first visual content. For example, the determination of the one or more properties of the aspect of the visual content may be based on the distance between the objects, on a relative orientation between the objects, and so forth. Some non-limiting examples of such object may include an inanimate object, an animate object, a person, and so forth.

In some examples, a visual content (such as the first visual content received by step 902) may be analyzed (for example, using a visual object recognition algorithm) to determine a type of an object depicted in the visual content. Further, the determination of the one or more properties of an aspect of the visual content may be based on the type of the object. For example, step 904 may base the determination of the one or more properties of the first aspect of the first visual content on the type of the object. In another example, step 906 may base the determination of the one or more properties of the first aspect of the first visual content on the type of the object. For example, when the type of the object is a first type, first values may be determined for the one or more properties, and when the type of the object is a second type, second values may be determined for the one or more properties. The second values may differ from the first values. Some non-limiting examples of such object may include an inanimate object, an animate object, a person, and so forth. In one example, the object may be an inanimate object, and the type of the object may be a category of objects. In another example, the object may be an animal, and the type may be a species (or another taxonomic unit). In yet another example, the object may be a person, the type of object may be a category of people (such as elderly people, work friends, family members, etc.).

In some examples, a visual content (such as the first visual content received by step 902) may be analyzed (for example, using a visual event detection algorithm) to detect an event depicted in the visual content. Further, the determination of the one or more properties of an aspect of the visual content may be based on the event. For example, step 904 may base the determination of the one or more properties of the first aspect of the first visual content on the event. In another example, step 906 may base the determination of the one or more properties of the first aspect of the first visual content on the event. For example, when the event is detected, first values may be determined for the one or more properties, and when no event is detected, second values may be determined for the one or more properties. In another example, when the event is detected in a first part of the visual content, first values may be determined for the one or more properties, and when the event is detected in a second part of the visual content, second values may be determined for the one or more properties. The second values may differ from the first values.

In some examples, one or more properties of an aspect of a visual content (such as the first visual content received by step 902) may be based on a temporal relation between an appearance of a first object and an appearance of a second object in the visual content. For example, the one or more properties of the first aspect of the first visual content determined by step 904 may be based on a temporal relation between an appearance of a first object and an appearance of a second object in the first visual content. In another example, the one or more properties of the second aspect of the first visual content determined by step 906 may be based on a temporal relation between an appearance of a first object and an appearance of a second object in the first visual content. For example, when the first object appears before the second object appears, first values may be determined for the one or more properties, and when the first object appears after the second object appears, second values may be determined for the one or more properties. In another example, when the elapsed time between the appearances of the first and second objects is below a selected threshold, first values may be determined for the one or more properties, and when the elapsed time between the appearances of the first and second objects is above the selected threshold, second values may be determined for the one or more properties. The second values may differ from the first values.

In some examples, a visual content (such as the first visual content received by step 902) may include at least a first frame and a second frame. Further, one or more properties of an aspect of the visual content may be based on a change in a spatial relation of two objects appearing in the first visual content from the first frame to the second frame. For example, the one or more properties of the first aspect of the first visual content determined by step 904 may be based on a change in a spatial relation of two objects appearing in the first visual content from the first frame to the second frame. In another example, the one or more properties of the second aspect of the first visual content determined by step 906 may be based on a change in a spatial relation of two objects appearing in the first visual content from the first frame to the second frame. The two objects of step 904 and the two objects of step 906 may be the same objects, may have exactly one object in common, may have no object in common, and so forth. For example, when the two objects move closer together, first values may be determined for the one or more properties, and when the two objects move farther apart from each other, second values may be determined for the one or more properties. The second values may differ from the first values.

In some examples, step 908 may comprise, for each training example of a plurality of training examples (such as the plurality of training examples of step 902), analyzing the respective visual content to determine one or more properties of the respective visual content. In one example, the one or more properties of the respective visual content may include one or more properties of the first aspect (of step 904) of the respective visual content and/or one or more properties of the second aspect (of step 906) of the respective visual content and/or one or more properties of a different aspect of the respective visual content. For example, step 908 may determine the properties as described above in relation to step 904 and/or step 906. For example, step 908 may use the trained machine learning model described above in relation to step 904 and/or step 906 to analyze the respective visual content to determine the one or more properties of at least one aspect of the respective visual content. In another example, step 9087 may access the data-structure described above in relation to step 904 and/or step 906 based on the respective visual content to determine the one or more properties of at least one aspect of the respective visual content. In some examples, step 908 may calculate a function of pixel values associated with the respective visual content to thereby determine the one or more properties of the visual content. Some non-limiting examples of such function may include a linear function, a non-linear function, an exponential function, a polynomial function, a logarithmic function, and so forth.

In some examples, the training of the machine learning model to obtain the generative model of step 902 may include an iterative process. In each iteration of the iterative process, a respective training example of the plurality of training examples may be analyzed and a loss may be updated. Further, the one or more properties of the visual content associated with a particular training example of the plurality of training examples determined by step 908 may be based on the update to the loss in an iteration that includes analysis of the particular training example. For example, when the update increases the loss, step 908 may determine first values for the one or more properties, and when the update decreases the loss, step 908 may determine second values for the one or more properties. The second values may differ from the first values.

In some examples, one or more properties of a particular visual content (such as a particular visual content associated with a particular training example of the plurality of training examples of step 902) may be determined by step 908 based on a convolution of at least part of the particular visual content. For example, the convolution of the at least part of the particular visual content may be calculated to obtain a numerical result value, and step 908 may determine the one or more properties of the particular visual content based on the numerical result value. For example, when the numerical result value is a specific numerical value, step 908 may determine first values for the one or more properties, and when the numerical result value is a different numerical value, step 908 may determine second values for the one or more properties. The second values may differ from the first values.

In some examples, one or more properties of a particular visual content (such as a particular visual content associated with a particular training example of the plurality of training examples of step 902) may be determined by step 908 based on a temporal relation between an appearance of a first object and an appearance of a second object in the particular visual content. For example, step 908 may analyze the particular visual content, for example using a visual object detection algorithm, to determine the temporal relation. For example, when the first object appears before the second object appears, step 908 may determine first values for the one or more properties, and when the first object appears after the second object appears, step 908 may determine second values for the one or more properties. In another example, when the elapsed time between the appearances of the first and second objects is below a selected threshold, step 908 may determine first values for the one or more properties, and when the elapsed time between the appearances of the first and second objects is above the selected threshold, step 908 may determine second values for the one or more properties. The second values may differ from the first values. The second values may differ from the first values.

In some examples, one or more properties of a particular visual content (such as a particular visual content associated with a particular training example of the plurality of training examples of step 902) may be determined by step 908 based on a change in a spatial relation of two objects appearing in the particular visual content from a first frame of the particular visual content to a second frame of the particular visual content. For example, step 908 may analyze the first frame and the second frame to determine the spatial relation in each frame, for example using a visual object detection algorithm, and thereby determine the change in the spatial relation. For example, when the two objects move closer together, step 908 may determine first values for the one or more properties, and when the two objects move farther apart from each other, step 908 may determine second values for the one or more properties. The second values may differ from the first values.

In some examples, one or more properties of an aspect of a visual content (such as the first visual content received by step 902) and properties of the visual contents associated with a plurality of training examples (such as the plurality of training examples of step 902) may be used to attribute the aspect of the visual content to a subgroup of at least one but not all of the plurality of training examples. For example, step 910 may comprise using the one or more properties of the first aspect of the first visual content determined by step 904 and the properties of the visual contents associated with the plurality of training examples determined by step 908 to attribute the first aspect of the first visual content received by step 902 to a first subgroup of at least one but not all of the plurality of training examples of step 902. In another example, step 912 may comprise using the one or more properties of the second aspect of the first visual content determined by step 906 and the properties of the visual contents associated with the plurality of training examples determined by step 908 to attribute the second aspect of the first visual content received by step 902 to a second subgroup of at least one but not all of the plurality of training examples of step 902. In some examples, for each training example in the plurality of training examples, similarity between the one or more properties of the aspect of the visual content and the one or more properties of the visual content associated with the training example may be determined, for example using a similarity function, and it may be determined whether to include the training example in the subgroup based on the determined similarity. For example, when the similarity is higher than a selected threshold, the training example may be included in the subgroup, and/or when the similarity is lower than a selected threshold, the training examples may be excluded from the subgroup.

Some non-limiting examples of such similarity function may include a similarity function based on distance, a similarity function based on correlation, a linear similarity function, a non-linear similarity function, an exponential similarity function, and so forth. In some examples, a classification machine learning model may be trained using training examples to classify training examples as attributed to an aspect of a visual content or not based on the properties. An example of such training example may include sample properties of a sample aspect of a first sample visual content and sample properties of a second sample visual content, together with a label indicating whether the sample aspect of the first sample visual content is attributed to a training example associated with the second sample visual content. The trained classification machine learning model may be used to determine, for each training example in the plurality of training examples, whether to include the training example in the subgroup.

In some examples, the training of the machine learning model to obtain the generative model of step 902 may include a first training step and a second training step. The first training step may use a third subgroup of the plurality of training examples of step 902 to obtain an intermediate model. The second training step may use a fourth subgroup of the plurality of training examples of step 902 and uses the intermediate model for initialization to obtain the generative model. The fourth subgroup may differ from the third subgroup. Further, a result associated with the first visual content and the intermediate model may be compared with a result associated with the first visual content and the generative model. In one example, step 910 may, for each training example of the fourth subgroup, determine whether to attribute the first aspect of the first visual content to the respective training example based on a result of the comparison. In another example, step 912 may, for each training example of the fourth subgroup, determine whether to attribute the second aspect of the first visual content to the respective training example based on a result of the comparison. For example, when the comparison shows small to no difference with regard to the respective aspect, including the respective training example in the respective subgroup may be avoided.

In some examples, it may be determined at least one visual content (such as, at least one visual content associated with the training examples of a selected subgroup) are associated with at least one source, for example as described above in relation to step 510. For example, step 914 may comprise determining that the at least one visual content associated with the training examples of the first subgroup are associated with a first at least one source. In another example, step 916 may comprise determining that the at least one visual content associated with the training examples of the second subgroup are associated with a second at least one source.

In some examples, a data-record associated with a source may be updated based on an attribution of an aspect of a visual content. For example, step 918 may comprise, for each source of the first at least one source of step 914, updating a data-record associated with the source based on the attribution of the first aspect of the first visual content by step 910. In another example, step 920 may comprise, for each source of the second at least one source of step 916, updating a data-record associated with the source based on the attribution of the second aspect of the first visual content by step 912. In one example, the data-records associated with the first at least one source and the data-records associated with the second at least one source may have an identical structure. In another example, the data-records associated with the first at least one source and the data-records associated with the second at least one source may have a different structure. In some examples, the data-record may be updated in a memory, in a database, via an external computing device (for example, using a digital communication device), and so forth. In some examples, a data-structure associating training examples with amounts may be accessed, for example as described above in relation to step 548. Further, the data-structure may be used to determine that the training examples of the first subgroup are associated with a first total amount (for example, by calculating a function of the amounts associated with the training examples of the first subgroup) and/or that the training examples of the second subgroup are associated with a second total amount (for example, by calculating a function of the amounts associated with the training examples of the second subgroup). Further, for each source of the first at least one source, step 918 may further base the updating to the data-record associated with the source on the first total amount. Further, for each source of the second at least one source, step 920 may further base the updating the data-record associated with the source on the second total amount. For example, an update to a data-record based on an amount may include changing a value of a field in the data-record to the amount. In another example, an update to a data-record based on an amount may include changing a value of a field in the data-record to a function of the value and the amount. Some non-limiting examples of such function may include a linear function, a non-linear function, an exponential function, a polynomial function, a logarithmic function, and so forth.

In some examples, one or more properties of an aspect of a visual content (such as the first visual content received by step 902) and the properties of the visual contents associated with a group of training examples may be used to determine, for each training example of the group, a degree of attribution of the aspect of the visual content to the respective training example. For example, step 910 may use the one or more properties of the first aspect of the first visual content (determined by step 904) and the properties of the visual contents associated with the first subgroup of step 910 (determined by step 908) to determine, for each training example of the first subgroup, a degree of attribution of the first aspect of the first visual content to the respective training example. In another example, step 912 may use the one or more properties of the second aspect of the first visual content (determined by step 906) and the properties of the visual contents associated with the second subgroup of step 912 (determined by step 908) to determine, for each training example of the second subgroup, a degree of attribution of the first aspect of the first visual content to the respective training example. For example, a regression machine learning model may be trained using training examples to determine degree of attributions of aspects of visual contents to training examples based on the properties. An example of such training example may include sample properties of a sample aspect of a first sample visual content and sample properties of a second sample visual content, together with a label indicating a degree of attribution of the sample aspect of the first sample visual content to a training example associated with the second sample visual content. The trained regression machine learning model may be used to analyze, for each training example of the group, the properties associated of the aspect of the visual content and the properties of the visual content associated with the training example to determine a degree of attribution of the aspect of the visual content to the respective training example. Further, for each source of a group of at least one source, the update to the data-record associated with a source may be based on at least one of the determined degrees. For example, step 918 may, for each source of the first at least one source of step 914, further basing the update to the data-record associated with the source on at least one of the degrees determined by step 910. In another example, step 920 may, for each source of the second at least one source of step 916, further basing the update to the data-record associated with the source on at least one of the degrees determined by step 912.

In some examples, a second visual content generated using the generative model of step 902 may be received, for example as described above in relation to the first visual content and step 902. Further, one or more properties of the second visual content may be determined, for example as described above in relation to step 904 and/or step 906 and/or step 908. In one example, the one or more properties of the second visual content may be or include at least one of one or more properties of the first aspect of the second visual content determined as described above in relation to step 904, one or more properties of the second aspect of the second visual content determined as described above in relation to step 906, or one or more properties of other aspects of the second visual content. Further, the one or more properties of the second visual content and the properties of the visual contents associated with the plurality of training examples determined by step 908 may be used to attribute the second visual content to a third subgroup of at least one but not all of the plurality of training examples, for example as described above in relation to step 910 and/or step 912. The third subgroup may include at least one training example not included in any one of the first subgroup of step 910 or the second subgroup of step 912. Further, it may be determined that the at least one visual content associated with the training examples of the third subgroup are associated with a third at least one source, for example as described above in relation to step 914 and/or step 916. The third at least one source may include one or more sources not included in any one of the first at least one source of step 914 or the second at least one source of step 916. Further, based on the third at least one source, usage of the second visual content may be avoided. Further, usage of the first visual content received by step 902 may be initiated. In one example, initiating usage of the first visual content may comprise using the first visual content (for example, for presentation, for publication, for processing, etc.), may comprise producing digital data and/or signal configured to cause the usage of the first visual content, may comprise transmitting the first visual content, and so forth. In one example, avoiding usage of the second visual content may comprise avoiding at least one of the above.

In some examples, one or more properties of an aspect of a visual content (such as the first visual content received by step 902) may be used to embed the visual content in a mathematical space, for example using module 282. For example, the one or more properties of the first aspect of the first visual content determined by step 904 and/or the one or more properties of the second aspect of the first visual content determined by step 906 may be used to embed the first visual content in a mathematical space. Further, for each training example of the plurality of training examples of step 902, the one or more properties of the respective visual content determined by step 908 may be used to embed the respective visual content in the mathematical space, for example using module 282. Further, the mathematical space and/or the embedding of the different visual contents in the mathematical space may be used to select a subgroup of at least one but not all of the plurality of training examples. For example, step 910 may use the mathematical space and/or the embedding of the different visual contents in the mathematical space to select the first subgroup of at least one but not all of the plurality of training examples. In another example, step 912 may use the mathematical space and/or the embedding of the different visual contents in the mathematical space to select the second subgroup of at least one but not all of the plurality of training examples. For example, the embedding of the first visual content may be used to identify a region of the mathematical space (such as a sphere or a box that includes the embedded first visual content), and the subgroup may include all training examples corresponding (based on the embedding of the associated visual contents) to mathematical objects in the identified region.

In some examples, a parameter of the generative model of step 902 and the properties of the visual contents associated with the plurality of training examples determined by step 908 may be used to attribute the parameter of the generative model to a third subgroup of at least one but not all of the plurality of training examples. For example, a classification machine learning model may be trained using training examples to classify parameters of generative models as attributed to a visual content or not based on the properties of the visual content. An example of such training example may include a sample value of a sample parameter of a sample generative model and sample properties of a sample visual content, together with a label indicating whether the sample parameter is attributed to a training example associated with the sample visual content. The trained classification machine learning model may be used to determine, for each training example of the plurality of training examples of step 902, whether to include the training example in the third subgroup. Further, it may be determined that the at least one visual content associated with the training examples of the third subgroup are associated with a third at least one source, for example as described above in relation to step 914 and/or step 916. Further, for each source of the third at least one source, a data-record associated with the source may be updated based on the attribution of the parameter of the generative model, for example as described above in relation to step 918 and/or step 920.

FIG. 10 is a flowchart of an exemplary method 1000 for attributing generated audio contents to training examples, consistent with some embodiments of the present disclosure. In this example, method 1000 may comprise receiving a first audio content generated using a generative model (step 1002), the generative model is a result of training a machine learning model using a plurality of training examples, each training example of the plurality of training examples is associated with a respective audio content; determining one or more properties of the first audio content (step 1004); for each training example of the plurality of training examples, analyzing the respective audio content to determine one or more properties of the respective audio content (step 1006); using the one or more properties of the first audio content and the properties of the audio contents associated with the plurality of training examples to attribute the first audio content to a first subgroup of at least one but not all of the plurality of training examples (step 1008); determining that the training examples of the first subgroup are associated with a first at least one source (step 510); and for each source of the first at least one source, updating a respective data-record associated with the source based on the attribution (step 512). In other examples, method 1000 may include additional steps or fewer steps. In other examples, one or more steps of method 1000 may be executed in a different order and/or one or more groups of steps may be executed simultaneously.

In some examples, step 1002 may comprise receiving a first audio content generated using a generative model. The generative model may be a result of training a machine learning model using a plurality of training examples. Each training example of the plurality of training examples may be associated with a respective audio content. For example, step 1002 may read the first audio content from memory, may receive the first audio content from an external computing device (for example, using a digital communication device), may receive the first audio content from a different process, may generate the first audio content (for example, using the generative model), may capture the first audio content using an audio sensor, and so forth.

In some examples, one or more properties of an audio content may be determined. For example, the audio content may be analyzed to determine the one or more properties of an audio content. For example, step 1004 may comprise determining one or more properties of an audio content (for example, of the first audio content received by step 1002). In another example, step 1006 may comprise, for each training example of a plurality of training examples (such as the plurality of training examples of step 1002), analyzing the respective audio content to determine one or more properties of the respective audio content. In some examples, a machine learning model may be trained using training examples to determine properties of audio contents. An example of such training examples may include a sample audio content, together with a label indicating one or more properties of the sample audio content. In one example, Step 1004 may use the trained machine learning model to analyze the audio content to determine the one or more properties of the audio content. In one example, step 1006 may, for each training example of the plurality of training examples, use the trained machine learning model to analyze the respective audio content to determine one or more properties of the respective audio content. In some examples, a data-structure may associate audio contents with properties of the audio contents. Further, the data-structure may be accessed based on the audio content to determine the one or more properties of the audio content. In some examples, a function of audio sample values included in the audio content may be calculated to thereby determine the one or more properties of the aspect of the audio content. Some non-limiting examples of such function may include a linear function, a non-linear function, an exponential function, a polynomial function, a logarithmic function, and so forth. In some examples, a convolution of at least part of the audio content may be calculated to thereby obtain a numerical result value, and the determination of the one or more properties of the audio content may be based on the numerical result value. For example, step 1004 may calculate a convolution of at least part of the first audio content received by step 1002 to thereby obtain a numerical result value, and may base the determination of the one or more properties of the first audio content on the numerical result value. In another examples, step 1006 may calculate a convolution of at least part of a particular audio content associated with a particular training example of the plurality of training examples of step 1002 to thereby obtain a numerical result value, and may base the determination of the one or more properties of the particular audio content on the numerical result value. For example, the one or more properties of a particular audio content associated with a particular training example of the plurality of training examples are determined based on a convolution of at least part of the particular audio content. In one example, the one or more properties of the audio content may be a function of the numerical result value. Some non-limiting examples of such function may include a linear function, a non-linear function, an exponential function, a polynomial function, a logarithmic function, and so forth.

In some examples, the audio content may be analyzed to detect at least a first utterance and a second utterance included in the audio content, for example using a voice recognition algorithm to obtain a transcript of the audio content and an NLP algorithm to identify the utterances in the transcript, for example using a voice recognition algorithm, and the determination of the one or more properties of the audio content may be based on a location of the first utterance in the audio content and on a location of the second utterance in the audio content. For example, step 1004 may analyze the first audio content received by step 1002 to detect at least a first utterance and a second utterance included in the first audio content, and may base the determination of the one or more properties of the first audio content on a location of the first utterance in the first audio content and on a location of the second utterance in the first audio content. In another example, step 1006 may analyze a particular audio content associated with a particular training example of the plurality of training examples of step 1002 to detect at least a first utterance and a second utterance included in the particular audio content, and may base the determination of the one or more properties of the particular audio content on a location of the first utterance in the particular audio content and on a location of the second utterance in the particular audio content. In one example, the one or more properties of the audio content may be a function of the locations. Some non-limiting examples of such function may include a linear function, a non-linear function, an exponential function, a polynomial function, a logarithmic function, and so forth. In another example, when the first utterance is located before the second utterance in the audio content, first values may be determined for the one or more properties of the audio content, and when the first utterance is located after the second utterance in the audio content, second values may be determined for the one or more properties of the audio content. In yet another example, when the first and second utterances are located adjacent to each other, first values may be determined for the one or more properties of the audio content, and when the first and second utterances are not located adjacent to each other, second values may be determined for the one or more properties of the audio content. The second values may differ from the first values.

In some examples, an audio content may be analyzed to identify an utterance included in the audio content, for example using a voice recognition algorithm to obtain a transcript of the audio content and an NLP algorithm to identify the utterance in the transcript, and the determination of the one or more properties of the audio content may be based on the type of the utterance. For example, step 1004 may analyze the first audio content received by step 1002 to identify an utterance included in the first audio content, and may base the determination of the one or more properties of the first audio content on the type of the utterance. In another example, step 1006 may analyze a particular audio content associated with a particular training example of the plurality of training examples of step 1002 to identify an utterance included in the particular audio content, and may base the determination of the one or more properties of the particular audio content on the type of the utterance. For example, when the utterance is of a first category of utterances, first values may be determined for the one or more properties of the audio content, and when the utterance is of a second category of utterances, second values may be determined for the one or more properties of the audio content. The second values may differ from the first values. For example, utterances may be categorized by length, by function, by form and/or structure, by tense and/or aspect, by voice (that is, active voice or passive voice), by mood, by items included in the utterance (such as syllables, words, phrases, etc.), and so forth.

In some examples, an audio content may be analyzed to determine a ratio between an intensity associated with a first portion of the audio content and an intensity associated with a second portion of the audio content, and the determination of the one or more properties of the audio content may be based on the ratio. For example, step 1004 may analyze the first audio content received by step 1002 to analyze the first audio content to determine a ratio between an intensity associated with a first portion of the first audio content and an intensity associated with a second portion of the first audio content, and may base the determination of the one or more properties of the first audio content on the ratio. In another example, step 1006 may analyze a particular audio content associated with a particular training example of the plurality of training examples of step 1002 to determine a ratio between an intensity associated with a first portion of the particular audio content and an intensity associated with a second portion of the particular audio content, and may base the determination of the one or more properties of the particular audio content on the ratio. In one example, the one or more properties of the audio content may be a function of the ratio. Some non-limiting examples of such function may include a linear function, a non-linear function, an exponential function, a polynomial function, a logarithmic function, and so forth.

In some examples, the determination of the one or more properties of the first audio content by step 1004 may be based on an intermediate result of the generative model when generating the first audio content received by step 1002. For example, the generative model may contain layers, where output numerical values of one layer may be used as inputs to the next, and the intermediate result may include at least part of these numerical values. In one example, the one or more properties of the first audio content may be a function of the intermediate result. Some non-limiting examples of such function may include a linear function, a non-linear function, an exponential function, a polynomial function, a logarithmic function, and so forth.

In some examples, the training of the machine learning model to obtain the generative model of step 1002 may include an iterative process. In each iteration of the iterative process a respective training example of the plurality of training examples of step 1002 may be analyzed and a loss function may be updated. The one or more properties of the audio content associated with a particular training example determined by step 1006 may be based on the update to the loss function in a particular iteration of the iterative process that includes the analysis of the particular training example. For example, the one or more properties of the audio content associated with the particular training example may be a function of the update to the loss. Some non-limiting examples of such function may include a linear function, a non-linear function, an exponential function, a polynomial function, a logarithmic function, and so forth.

In some examples, step 1008 may comprise using the one or more properties of the first audio content determined by step 1004 and the properties of the audio contents associated with the plurality of training examples determined by step 1006 to attribute the first audio content to a first subgroup of at least one but not all of the plurality of training examples of step 1002. In one example, step 1008 may analyze the properties of the first audio content and the properties of audio contents included in the plurality of training examples to attribute the first audio content to the first subgroup. For example, step 1008 may use a second machine learning model to analyze the properties of the first audio content and the properties of audio contents included in the plurality of training examples to determine whether to attribute the first audio content to the particular training example and/or a degree of the attribution. The second machine learning model may be a machine learning model trained using a set of training examples to determine whether to attribute audio contents to training examples and/or the degree of the attribution based on properties of audio contents. An example of such training example of the set of training examples may include properties of a first sample audio content and properties of a second sample audio content associated with a sample training example, together with a label indicative of whether the first sample audio content is attributed to the sample training example and/or a sample degree of the attribution of the first sample audio content to the sample training example.

In some examples, step 1008 may, for each training example of the first subgroup, use the one or more properties of the first audio content determined by step 1004 and the one or more properties of the respective audio content determined by step 1006 to determine a degree of attribution of the first audio content received by step 1002 to the respective training example, for example using the second machine learning model as described above. Further, for each source of the first at least one source, step 512 may further base the update to the respective data-record associated with the source on at least one of the determined degrees, for example as described above.

In some examples, the one or more properties of the first audio content determined by step 1004 may be used to embed the first audio content in a mathematical space, for example using module 282. Further, for each training example of the plurality of training examples, the one or more properties of the respective audio content determined by step 1006 may be used to embed the respective audio content associated with the training example in the mathematical space, for example using module 282. Further, step 1008 may use the mathematical space and/or the embedding of the different audio contents in the mathematical space to select the first subgroup of at least one but not all of the plurality of training examples of step 1002. For example, the embedding of the first audio content may be used to identify a region of the mathematical space (such as a sphere or a box that includes the embedded first audio content), and the first subgroup may include all training examples corresponding (based on the embedding of the associated audio contents) to mathematical objects in the identified region.

In some examples, the training of the machine learning model to obtain the generative model of step 1002 may include a first training step and a second training step. The first training step may use a second subgroup of the plurality of training examples to obtain an intermediate model. The second training step may use a third subgroup of the plurality of training examples to obtain the generative model and may use the intermediate model for initialization. The second subgroup may differ from the third subgroup. Further, a result associated with the first audio content received by step 1002 and the intermediate model may be compared with a result associated with the first audio content and the generative model. Further, step 1008 may, for each training example of the third subgroup, determining whether to attribute the first audio content received by step 1002 to the respective training example based on a result of the comparison. For example, when the comparison shows small to no difference with regard to the respective aspect, step 1008 may avoid including the respective training example in the first subgroup.

In some examples, a second audio content generated using the generative model of step 1002 may be received, for example as described above in relation to step 1002. Further, one or more properties of the second audio content may be determined, for example as described above in relation to step 1004 and/or the first audio content. Further, the one or more properties of the second audio content and the properties of the audio contents associated with the plurality of training examples determined by step 1006 may be used to attribute the second audio content to a second subgroup of at least one but not all of the plurality of training examples, for example as described above in relation to step 1008. The second subgroup may include at least one training example not included in the first subgroup of step 1008. Further, it may be determined that the training examples of the second subgroup are associated with a second at least one source, for example as described above in relation to step 510. The second at least one source may include one or more sources not included in the first at least one source of step 510. Further, based on the second at least one source, usage of the second audio content may be avoided. Further, usage of the first audio content received by step 1002 may be initiated. In one example, initiating usage of the first audio content may comprise using the first audio content (for example, for presentation, for publication, for processing, etc.), may comprise producing digital data and/or signal configured to cause the usage of the first audio content, may comprise transmitting the first audio content, and so forth. In one example, avoiding usage of the second audio content may comprise avoiding at least one of the above.

In some examples, a second audio content generated using the generative model of step 1002 may be received, for example as described above in relation to step 1002. Further, one or more properties of the second audio content may be determined, for example as described above in relation to step 1004 and/or the first audio content. Further, the one or more properties of the second audio content and the properties of the audio contents associated with the plurality of training examples determined by step 1006 may be used to attribute the second audio content to a second subgroup of at least one but not all of the plurality of training examples of step 1002, for example as described above in relation to step 1008. The second subgroup may include at least one training example not included in the first subgroup of step 1008. Further, a data-structure associating training examples with amounts may be accessed, for example as described above in relation to step 548. Further, the data-structure may be used to determine that the training examples of the first subgroup are associated with a first total amount, for example by calculating a function of the amounts associated with the training examples of the first subgroup. Further, the data-structure may be used to determine that the training examples of the second subgroup are associated with a second total amount, for example by calculating a function of the amounts associated with the training examples of the second subgroup. Further, based on the first and second total amounts, usage of the second audio content and initiating usage of the first audio content may be avoided, for example as described above. Further, the update to a particular data-record associated with a particular source of the first at least one source may be further based on the first total amount.

In some examples, a parameter of the generative model of step 1002 and the properties of the audio contents associated with the plurality of training examples determined by step 1006 may be used to attribute the parameter of the generative model to a second subgroup of at least one but not all of the plurality of training examples. For example, a classification machine learning model may be trained using training examples to classify parameters of generative models as attributed to an audio content or not based on the properties of the audio content. An example of such training example may include a sample value of a sample parameter of a sample generative model and sample properties of a sample audio content, together with a label indicating whether the sample parameter is attributed to a training example associated with the sample audio content. The trained classification machine learning model may be used to determine, for each training example of the plurality of training examples of step 1002, whether to include the training example in the third subgroup. Further, it may be determined that the training examples of the second subgroup are associated with a second at least one source, for example as described above in relation to step 510. Further, for each source of the second at least one source, a respective data-record associated with the source may be updated based on the attribution of the parameter of the generative model, for example as described above in relation to step 512.

In some examples, the one or more properties of the first audio content determined by step 1004 may be one or more properties of a selected aspect of the first audio content. In some examples, the first audio content received by step 1002 may be analyzed to determine the one or more properties of the aspect of the first audio content. In some examples, a machine learning model may be trained using training examples to determine properties of a particular aspect of audio contents. An example of such training examples may include a sample audio content, together with a label indicating one or more properties of the particular aspect of the sample audio content. The trained machine learning model may be used to analyze the first audio content to determine the one or more properties of the aspect of the first audio content. In some examples, a data-structure may associate audio contents with properties of a particular aspect of the audio contents. Further, the data-structure may be accessed based on the audio content to determine the one or more properties of the aspect of the audio content. In some examples, a function of audio sample values associated with the audio content may be calculated to thereby determine the one or more properties of the aspect of the audio content. Some non-limiting examples of such function may include a linear function, a non-linear function, an exponential function, a polynomial function, a logarithmic function, and so forth. In one example, the selected aspect may be a voice of a speaker speaking in the first audio content. Some non-limiting examples of properties of such voice may include pitch, tone, timbre, intonation, tempo, voice quality, voice modulation, pronunciation, articulation, speaker identity, and so forth. In another example, the selected aspect may be ambient sound included in the first audio content. Some non-limiting examples of properties of such ambient sound may include sound intensity, frequency spectrum, source localization, temporal pattern, duration, onset, and so forth. In yet another example, the selected aspect may be a melody associated with the first audio content. Some non-limiting examples of properties of such melody may include name of melody, artist name, pitch, melodic contour, key signature, rhythm, timing, and so forth. In an additional example, the selected aspect may be a rhythm associated with the first audio content. Some non-limiting examples of properties of such rhythm may include tempo, beat, meter, syncopation, patterns, and so forth.

FIG. 11A is a flowchart of an exemplary method 1100 for generating content using a generative model without relying on selected training examples, consistent with some embodiments of the present disclosure. In this example, method 1100 may comprise receiving an input indicative of a desire to generate a new content using a generative model (step 1102), the generative model is a result of training a machine learning model using a plurality of training examples, each training example of the plurality of training examples is associated with a respective content; obtaining an indication of a particular subgroup of at least one but not all of the plurality of training examples (step 1104); based on the indication, using the input and the generative model to generate the new content, abstaining from basing the generation of the new content on any training example included in the particular subgroup (step 1106); and providing the new content (step 1108). In other examples, method 1100 may include additional steps or fewer steps. In other examples, one or more steps of method 1100 may be executed in a different order and/or one or more groups of steps may be executed simultaneously. In some examples, the new content may be or include at least one of a visual content, an audio content or a textual content. In some examples, the new content may be or include a multimedia content.

In some examples, step 1102 may comprise receiving an input indicative of a desire to generate a new content using a generative model. The generative model may be a result of training a machine learning model using a plurality of training examples. Each training example of the plurality of training examples may be associated with a respective content. For example, step 1102 may read the input from memory; may receive the input from an external computing device (for example, using a digital communication device), may receive the input from a different process, may generate the input (for example, based on other inputs), may capture the input using a sensor, and so forth. In some examples, the input may include a textual input indicative of the desire to generate the new content using the generative model. For example, the textual input may be or include a textual input in a natural language indicative of the desire to generate the new content using the generative model. In another examples, the textual input may be a source code for generating the new content using the generative model. In some examples, the input may include input image data. For example, the desire to generate the new content using the generative model may be or include a desire to modify the input image data using the generative model to thereby obtain the new content. In another example, the input image data may include a gesture indicative of the desire to generate the new content using the generative model. In some examples, the input may include input audio data. For example, the desire to generate the new content using the generative model may be or include a desire to modify the input audio data using the generative model to thereby obtain the new content. In another example, the input audio data may include a voice command associated with the desire to generate the new content using the generative model.

In some examples, step 1104 may comprise obtaining an indication of a particular subgroup of at least one but not all of a plurality of training examples (such as plurality of training examples of step 1102). Step 1104 may read the indication from memory; may receive the indication from an external computing device (for example, using a digital communication device), may receive the indication from a different process, may generate the indication (for example, based on the input received by step 1102, based on other inputs, etc.), may determine the indication using step 508 and/or method 500, may determine the indication using step 910 and/or method 900, may determine the indication using step 1008 and/or method 1000, and so forth. In some examples, step 1104 may comprise selecting the particular subgroup of the plurality of training examples. For example, step 1104 may use a second machine learning model to select the particular subgroup of the plurality of training examples. The second machine learning model may be a machine learning model trained using a set of training examples to determine whether to include training examples in a select subgroup, for example based on the training examples and/or additional information. An example of such training example of the set of training examples may include a sample training example and/or sample additional information, together with a label indicative of whether or not to include the sample training example in the selected subgroup. In some examples, step 1104 may analyze the input received by step 1102 to select the particular subgroup. For example, the second machine learning model may be used with the input as an additional information. For example, the input may be or include a textual input indicative of a desire to exclude one or more training examples, such as 'I want an abstract image of a mother and her baby, but don't base it on any picture by Kandinsky'.

In some examples, step 1104 may calculate a convolution of at least part of the content associated with a particular training example of the plurality of training examples to obtain a numerical result value. Further, step 1104 may determine whether to include the particular training example in the particular subgroup based on the numerical result value. For example, when the numerical result value is a first numerical value, step 1104 may include the particular training example in the particular subgroup. In another example, when the numerical result value is a second numerical value, step 1104 may exclude the particular training example from the particular subgroup.

In some examples, step 1104 may select the particular subgroup based on a geographical region. For example, each training example of the plurality of training example may be associated with a respective geographical region, and the particular subgroup may include only training examples associated with selected one or more geographical regions and/or may include only training examples not associated with selected one or more geographical regions. In another example, step 1104 may select the particular subgroup based on a geographical region of a target audience associated with the new content (for example, based on a regulatory requirement associated with the geographical region, based on common preferences of people in that geographical region, and so forth). Some non-limiting examples of such common preferences may include ethnicity preferences, gender preferences, scenery preferences, preference to certain type of objects, and so forth.

In some examples, step 1104 may select the particular subgroup based on a regulatory requirement. For example, each training example of the plurality of training example may be associated with a respective regulatory requirement (for example, based on a source, on a geographical region of capturing, etc.), and the particular subgroup may include only training examples associated with regulatory requirements that satisfy particular criteria. In another example, the regulatory requirement may be based on a target audience associated with the new content (for example, based on a geographical region associated with the target audience, based on an age group associated with the target audience, and so forth). For example when the age group of the target audience include minors, and the subgroup may include training examples that includes sexually explicit contents.

In some examples, step 1104 may select the particular subgroup based on a source associated with the contents associated with the particular subgroup. For example, based on a budget or contractual consideration, it may be determined that contents associated with one or more sources may be excluded, and thereby the particular subgroup may include training examples of the plurality of training examples that are associated with the one or more sources.

In some examples, the input received by step 1102 may include a textual input indicative of the desire to generate the new content using the generative model, for example as described above in relation to step 1102. In one example, the textual input may include a noun and an adjective adjacent to the noun. Further, for each training example of the particular subgroup of step 1104, the respective content associated with the training example may include a respective object of a category of objects selected based on the noun wherein at least one aspect of the respective object may match the adjective. For example, the textual input may include 'a picture of a vehicle, but not an antique vehicle', the noun may be 'vehicle', the adjective may be 'antique', and each training example of the particular subgroup of step 1104 may include a respective picture of a respective vehicle that is at least 25 years old. In one example, the textual input may include a verb and an adverb adjacent to the verb. Further, for each training example of the particular subgroup, the respective content associated with the training example may include a respective event of a category of events selected based on the verb wherein at least one aspect of the respective event may match the adverb. For example, the textual input may include 'a video of a dancing person, but not skillfully dancing', the verb may be 'dancing', the adverb may be 'skillfully', and each training example of the particular subgroup of step 1104 may include a respective video of a person successfully performing advance dance moves. In one example, the textual input may include a preposition. Further, for each training example of the particular subgroup of step 1104, the respective content associated with the training example may include a respective pair of objects wherein a spatial relation between the pair of objects in the respective content may match the preposition. For example, the textual input may include 'A picture of two people waiting at a pharmacy, but one after other', the preposition may include 'after', and each training example of the particular subgroup of step 1104 may include a respective of people standing one after the other.

In some examples, step 1106 may comprise, based on an indication of a subgroup of at least one training example (such as the indication received by step 1104 of the particular subgroup), using an input (such as the input received by step 1102) and a generative model (such as the generative model of step 1102, generative model 312, etc.) to generate the new content, abstaining from basing the generation of the new content on any training example included in the subgroup (for example, on any training example included in the particular subgroup of step 1104).

In some examples, step 1106 may use the input received by step 1102 and the generative model of step 1102 to generate a plurality of alternative contents. For example, step 1106 may use the generative model with different seed values to generate the plurality of the alternative contents. Further, for each content of the plurality of alternative contents, step 1106 may determine a likelihood that the generation of the content is based on any training example included in the particular subgroup, for example using method 500, using method 900, using method 1000, and so forth. Further, step 1106 may select the new content of the plurality of alternative contents based on the determined likelihoods. For example, the new content may be the alternative content associated with the lowest likelihood of the plurality of alternative contents.

In some examples, step 1106 may use the input and the generative model to generate a preliminary content. Further, step 1106 may, based on the indication, analyzing the preliminary content to modify the preliminary content. For example, the preliminary content may be at least partly based on at least one training example included in the particular subgroup of step 1104, and the modified preliminary content may not be based on any training example included in the particular subgroup of step 1104. For example, the preliminary content may be a preliminary visual content that includes a depiction of a first object and a depiction of a second object. Further, it may be determined that the depiction of the first object is at least partly based on at least one training example included in the particular subgroup and that the depiction of the second object is not be based on any training example included in the particular subgroup, for example using method 900 and on steps 902-912. In one example, in response to the determination, step 1106 may modify the depiction of the first object while maintaining the depiction of the second object. In another example, in response to the determination, step 1106 may remove the depiction of the first object from the preliminary content while maintaining the depiction of the second object in the preliminary content. In one example, it may be determined that a first aspect of the preliminary content is at least partly based on at least one training example included in the particular subgroup and that a second aspect of the preliminary content is not be based on any training example included in the particular subgroup, for example as described above. Further, in response to the determination, step 1106 may modify the first aspect of the preliminary content while maintaining the second aspect of the preliminary content.

In some examples, a generative model (such as the generative model of step 1102) may include a plurality of artificial neurons. For example, the generative model may be or include an artificial neural network. In another example, the generative model may be or include an ensemble of the plurality of artificial neurons. Further, step 1104 may identify a specific subgroup of the plurality of artificial neurons associated with the particular subgroup of at least one but not all of the plurality of training examples of step 1104. For example, an artificial neuron may be a parameter of the generative model, and it may be identified whether it is attributed to a training example as described above, thereby determining whether to include the artificial neuron in the specific subgroup. Further, step 1106 may abstain from basing the generation of the new content on outputs generated by any one of the specific subgroup of the plurality of artificial neurons. For example, the generative model may be or include an artificial neural network, and step 1106 may disregard the artificial neurons included in the specific subgroup (for example, replacing their output with selected values, such as preselected constant values, random values, etc.) when using the input and the generative model to generate the new content. In another example, the generative model may be or include an ensemble of the plurality of artificial neurons, and step 1106 may exclude the artificial neurons included in the specific subgroup from the ensemble when using the input and the generative model to generate the new content.

In some examples, a generative model (such as the generative model of step 1102) may include a plurality of weights. Further, step 1104 may identify a specific subgroup of the plurality of weights associated with the particular subgroup of at least one but not all of the plurality of training examples. For example, a weight may be a parameter of the generative model, and it may be identified whether it is attributed to a training example as described above, thereby determining whether to include the weight in the specific subgroup. Further, step 1106 may abstain from basing the generation of the new content on any one of the specific subgroup of the plurality of weights. For example, step 1106 may replace the weights included in the specific subgroup with selected values (such as preselected constant values, random values, and so forth) when using the input and the generative model to generate the new content.

In some examples, a generative model (such as the generative model of step 1102) may include a memory unit that stores a plurality of patterns. Further, step 1104 may identify a specific subgroup of the plurality of patterns associated with the particular subgroup of at least one but not all of the plurality of training examples. For example, the patterns may include at least some of the contents associated with the plurality of training examples of step 1102 (for example, as support vectors in a support vector machine, as inputs in a k-Nearest Neighbors algorithms, and so forth), and thereby the particular subgroup of step 1104 defines the specific subgroup. In another examples, a pattern may be a parameter of the generative model, and it may be identified whether it is attributed to a training example as described above, thereby determining whether to include the pattern in the specific subgroup. Further, step 1106 may abstain from basing the generation of the new content on any one of the specific subgroup of the plurality of patterns. For example, step 1106 may exclude the patterns included in the specific subgroup from any calculation and/or consideration when using the input and the generative model to generate the new content.

In some examples, step 1104 may, for each training example of the plurality of training examples, analyze the respective content associated with the training example to identify a respective mathematical object corresponding to the respective training example in a mathematical space, for example using module 282. Further, step 1104 may, for example based on the identified mathematical objects, identify a region in the mathematical space. For example, a classification algorithm, such as a Support Vector Machine, may be used to identify the region. In one example, the identified region may include all the mathematical objects corresponding to the training examples of the particular subgroup of step 1104. Further, step 1106 may use the input to select a specific mathematical object in the mathematical space outside the identified region. For example, step 1106 may identify a first mathematical object corresponding to the input in the mathematical space, for example using module 282, and the specific mathematical object may be the closest mathematical object to the first mathematical object outside the identified region. Further, step 1106 may use the specific mathematical object to generate the new content. For example, a mapping may map different mathematical objects to different contents, and step 1106 may use the mapping and the specific mathematical object to obtain the new content. In another example, step 1106 may use the specific mathematical object as a seed value to the generative model when generating the new content.

In some examples, step 1108 may comprise providing the new content. For example, the new content may be or include a new visual content, and step 1108 may cause a presentation of the new visual content, for example as described above in relation to step 708. In another example, the new content may be or include a new media content, and step 1108 may initiate the usage of the new media content, for example as described above in relation to step 532. In yet another example, the new content may be or include a new audio content, and step 1108 may cause an output of the new audio content, for example using an audio speaker. In an additional example, step 1108 may store the new content or an indication of the new content in memory (for example, for access by another process or another computing device), may transmit the new content or an indication of the new content to an external computing device (for example, using a digital communication device), may transmit the new content or an indication of the new content in to a different process, and so forth.

FIGS. 11B and 11C include illustrations of exemplary visual contents, consistent with some embodiments of the present disclosure. FIG. 11B includes illustrations of visual contents 1122, 1124, 1126 and 1128 that may be part of the plurality of training examples of step 1102. In this example, visual content 1122 may include a depiction of a woman playing with a baby, visual content 1124 may include a depiction of a woman in a yoga pose, visual content 1126 may include a depiction of a man, and visual content 1128 may include a depiction of a baby. FIG. 11C includes illustrations of visual contents 1142 and 1144. In one example, the input received by step 1102 may indicate a desire to generate include a picture of a father watching a mother playing with their baby (for example, the input may include the text 'a picture of a father watching a mother playing with their baby'). Further, when the subgroup of step 1104 does not include visual contents 1122 and 1126, step 1106 may generate new visual content 1142 that include a depiction of the man of visual content 1126 watching the woman playing with a baby of visual content 1122, and when the subgroup of step 1104 includes visual content 1122 but does not include visual contents 1124, 1126 and 1128, step 1106 may generate new visual content 1144 that include a depiction of the man of visual content 1126 watching the woman of visual content 1124 and the baby of visual content 1128.

What is claimed is:

1. A non-transitory computer readable medium storing a software program comprising data and computer implementable instructions that when executed by at least one processor cause the at least one processor to perform operations for attributing aspects of generated visual contents to training examples, the operations comprising:
   receiving a first visual content generated using a generative model, the generative model is a result of training a machine learning model using a plurality of training examples, each training example of the plurality of training examples is associated with a respective visual content;
   determining one or more properties of a first aspect of the first visual content;

determining one or more properties of a second aspect of the first visual content;

for each training example of the plurality of training examples, analyzing the respective visual content to determine one or more properties of the respective visual content;

using the one or more properties of the first aspect of the first visual content and the properties of the visual contents associated with the plurality of training examples to attribute the first aspect of the first visual content to a first subgroup of at least one but not all of the plurality of training examples;

using the one or more properties of the second aspect of the first visual content and the properties of the visual contents associated with the plurality of training examples to attribute the second aspect of the first visual content to a second subgroup of at least one but not all of the plurality of training examples;

determining that the at least one visual content associated with the training examples of the first subgroup are associated with a first at least one source;

determining that the at least one visual content associated with the training examples of the second subgroup are associated with a second at least one source;

for each source of the first at least one source, updating a data-record associated with the source based on the attribution of the first aspect of the first visual content; and for each source of the second at least one source, updating a data-record associated with the source based on the attribution of the second aspect of the first visual content, wherein the training of the machine learning model to obtain the generative model includes a first training step and a second training step, the first training step uses a third subgroup of the plurality of training examples to obtain an intermediate model, the second training step uses a fourth subgroup of the plurality of training examples and uses the intermediate model for initialization to obtain the generative model, the fourth subgroup differs from the third subgroup, and wherein the operations further comprise:

comparing a result associated with the first visual content and the intermediate model with a result associated with the first visual content and the generative model; and for each training example of the fourth subgroup, determining whether to attribute the first aspect of the first visual content to the respective training example based on a result of the comparison.

2. The non-transitory computer readable medium of claim 1, wherein the first aspect is at least one of a background of the first visual content or a scenery of the first visual content.

3. The non-transitory computer readable medium of claim 1, wherein the first aspect is a style of at least a portion of the first visual content.

4. The non-transitory computer readable medium of claim 1, wherein the second aspect is at least one of a person, an animal or an inanimate object depicted in the first visual content.

5. The non-transitory computer readable medium of claim 1, wherein the operations further comprise:

using the one or more properties of the first aspect of the first visual content and the properties of the visual contents associated with the first subgroup to determine, for each training example of the first subgroup, a degree of attribution of the first aspect of the first visual content to the respective training example; and for each source of the first at least one source, further basing the update to the data-record associated with the source on at least one of the determined degrees.

6. The non-transitory computer readable medium of claim 1, wherein the determination of the one or more properties of the first aspect of the first visual content is based on an intermediate result of the generative model when generating the first visual content.

7. The non-transitory computer readable medium of claim 1, wherein the operations further comprise:

calculating a convolution of at least part of the first visual content to thereby obtain a numerical result value; and basing the determination of the one or more properties of the first aspect of the first visual content on the numerical result value.

8. The non-transitory computer readable medium of claim 1, wherein the operations further comprise:

analyzing the first visual content to detect at least a first object and a second object depicted in the first visual content; and basing the determination of the one or more properties of the first aspect of the first visual content on a location of the first object in the first visual content and on a location of the second object in the first visual content.

9. The non-transitory computer readable medium of claim 1, wherein the operations further comprise:

analyzing the first visual content to determine a type of an object depicted in the first visual content; and basing the determination of the one or more properties of the first aspect of the first visual content on the type of the object.

10. The non-transitory computer readable medium of claim 1, wherein the operations further comprise:

analyzing the first visual content to detect an event depicted in the first visual content; and basing the determination of the one or more properties of the first aspect of the first visual content on the event.

11. The non-transitory computer readable medium of claim 1, wherein the one or more properties of the first aspect of the first visual content are based on a temporal relation between an appearance of a first object and an appearance of a second object in the first visual content.

12. The non-transitory computer readable medium of claim 1, wherein the first visual content includes at least a first frame and a second frame, and wherein the one or more properties of the first aspect of the first visual content are based on a change in a spatial relation of two objects appearing in the first visual content from the first frame to the second frame.

13. The non-transitory computer readable medium of claim 1, wherein the training of the machine learning model to obtain the generative model includes an iterative process, wherein in each iteration of the iterative process a respective training example of the plurality of training examples is analyzed and a loss is updated, and wherein the one or more properties of the visual content associated with a particular training example of the plurality of training examples are based on the update to the loss in an iteration that includes analysis of the particular training example.

14. The non-transitory computer readable medium of claim 1, wherein the operations further comprise:

receiving a second visual content generated using the generative model;

determining one or more properties of the second visual content;

using the one or more properties of the second visual content and the properties of the visual contents associated with the plurality of training examples to attribute the second visual content to a third subgroup of at least one but not all of the plurality of training examples, the third subgroup includes at least one training example not included in any one of the first subgroup or the second subgroup;

determining that the at least one visual content associated with the training examples of the third subgroup are associated with a third at least one source, the third at least one source includes one or more sources not included in any one of the first at least one source or the second at least one source;

based on the third at least one source, avoiding usage of the second visual content; and initiating usage of the first visual content.

15. The non-transitory computer readable medium of claim 1, wherein the operations further comprise:

accessing a data-structure associating training examples with amounts;

using the data-structure to determine that the training examples of the first subgroup are associated with a first total amount;

using the data-structure to determine that the training examples of the second subgroup are associated with a second total amount;

for each source of the first at least one source, further basing the updating to the data-record associated with the source on the first total amount; and for each source of the second at least one source, further basing the updating the data-record associated with the source on the second total amount.

16. The non-transitory computer readable medium of claim 1, wherein the operations further comprise:

using the one or more properties of the first aspect of the first visual content to embed the first visual content in a mathematical space;

for each training example of the plurality of training examples, using the one or more properties of the respective visual content to embed the respective visual content in the mathematical space; and using the mathematical space to select the first subgroup of at least one but not all of the plurality of training examples.

17. The non-transitory computer readable medium of claim 1, wherein the operations further comprise:

using a parameter of the generative model and the properties of the visual contents associated with the plurality of training examples to attribute the parameter of the generative model to a third subgroup of at least one but not all of the plurality of training examples;

determining that the at least one visual content associated with the training examples of the third subgroup are associated with a third at least one source; and for each source of the third at least one source, updating a data-record associated with the source based on the attribution of the parameter of the generative model.

18. A system for attributing aspects of generated visual contents to training examples, the system comprising:

at least one processor configured to perform the operations of:

receiving a first visual content generated using a generative model, the generative model is a result of training a machine learning model using a plurality of training examples, each training example of the plurality of training examples is associated with a respective visual content;

determining one or more properties of a first aspect of the first visual content;

determining one or more properties of a second aspect of the first visual content;

for each training example of the plurality of training examples, analyzing the respective visual content to determine one or more properties of the respective visual content;

using the one or more properties of the first aspect of the first visual content and the properties of the visual contents associated with the plurality of training examples to attribute the first aspect of the first visual content to a first subgroup of at least one but not all of the plurality of training examples;

using the one or more properties of the second aspect of the first visual content and the properties of the visual contents associated with the plurality of training examples to attribute the second aspect of the first visual content to a second subgroup of at least one but not all of the plurality of training examples;

determining that the at least one visual content associated with the training examples of the first subgroup are associated with a first at least one source;

determining that the at least one visual content associated with the training examples of the second subgroup are associated with a second at least one source;

for each source of the first at least one source, updating a data-record associated with the source based on the attribution of the first aspect of the first visual content; and for each source of the second at least one source, updating a data-record associated with the source based on the attribution of the second aspect of the first visual content, wherein the training of the machine learning model to obtain the generative model includes a first training step and a second training step, the first training step uses a third subgroup of the plurality of training examples to obtain an intermediate model, the second training step uses a fourth subgroup of the plurality of training examples and uses the intermediate model for initialization to obtain the generative model, the fourth subgroup differs from the third subgroup, and wherein the operations further comprise:

comparing a result associated with the first visual content and the intermediate model with a result associated with the first visual content and the generative model; and for each training example of the fourth subgroup, determining whether to attribute the first aspect of the first visual content to the respective training example based on a result of the comparison.

19. A method for attributing aspects of generated visual contents to training examples, the method comprising:

receiving a first visual content generated using a generative model, the generative model is a result of training a machine learning model using a plurality of training examples, each training example of the plurality of training examples is associated with a respective visual content;

determining one or more properties of a first aspect of the first visual content;

determining one or more properties of a second aspect of the first visual content;

for each training example of the plurality of training examples, analyzing the respective visual content to determine one or more properties of the respective visual content;

using the one or more properties of the first aspect of the first visual content and the properties of the visual contents associated with the plurality of training examples to attribute the first aspect of the first visual content to a first subgroup of at least one but not all of the plurality of training examples;

using the one or more properties of the second aspect of the first visual content and the properties of the visual contents associated with the plurality of training examples to attribute the second aspect of the first visual content to a second subgroup of at least one but not all of the plurality of training examples;

determining that the at least one visual content associated with the training examples of the first subgroup are associated with a first at least one source;

determining that the at least one visual content associated with the training examples of the second subgroup are associated with a second at least one source;

for each source of the first at least one source, updating a data-record associated with the source based on the attribution of the first aspect of the first visual content; and for each source of the second at least one source, updating a data-record associated with the source based on the attribution of the second aspect of the first visual content, wherein the training of the machine learning model to obtain the generative model includes a first training step and a second training step, the first training step uses a third subgroup of the plurality of training examples to obtain an intermediate model, the second training step uses a fourth subgroup of the plurality of training examples and uses the intermediate model for initialization to obtain the generative model, the fourth subgroup differs from the third subgroup, and wherein the operations further comprise:

comparing a result associated with the first visual content and the intermediate model with a result associated with the first visual content and the generative model; and for each training example of the fourth subgroup, determining whether to attribute the first aspect of the first visual content to the respective training example based on a result of the comparison.

\* \* \* \* \*